United States Patent
Holmes et al.

(10) Patent No.: US 11,519,237 B2
(45) Date of Patent: Dec. 6, 2022

(54) HIGH PRESSURE BLOWOUT PREVENTER SYSTEM

(71) Applicant: Hydril USA Distribution LLC, Houston, TX (US)

(72) Inventors: John Steven Holmes, Houston, TX (US); Douglas Milliman, Houston, TX (US); Luis E. Huerta, Houston, TX (US); Eric Dale Larson, Houston, TX (US); Gregory Ronald Gillette, Houston, TX (US); Robert Arnold Judge, Houston, TX (US); Viral Shah, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 0 days.

(21) Appl. No.: 17/134,950

(22) Filed: Dec. 28, 2020

(65) Prior Publication Data
US 2021/0262312 A1    Aug. 26, 2021

Related U.S. Application Data

(63) Continuation of application No. 15/706,360, filed on Sep. 15, 2017, now Pat. No. 10,876,369, which is a continuation-in-part of application No. 14/884,563, filed on Oct. 15, 2015, now Pat. No. 10,048,673, and a continuation-in-part of application No. 14/870,249, filed on Sep. 30, 2015, now Pat. No. 9,803,448, and a continuation-in-part of application No. 15/160,073, filed on May 20, 2016, now Pat. No. 10,012,049.

(60) Provisional application No. 62/065,431, filed on Oct. 17, 2014, provisional application No. 62/067,829, filed on Oct. 23, 2014, provisional application No. 62/078,236, filed on Nov. 11, 2014, provisional (Continued)

(51) Int. Cl.
| | | |
|---|---|---|
| *E21B 33/064* | (2006.01) | |
| *G05B 9/03* | (2006.01) | |
| *F15B 1/02* | (2006.01) | |
| *E21B 33/06* | (2006.01) | |
| *E21B 34/16* | (2006.01) | |

(52) U.S. Cl.
CPC .......... *E21B 33/064* (2013.01); *E21B 33/063* (2013.01); *E21B 34/16* (2013.01); *F15B 1/02* (2013.01); *G05B 9/03* (2013.01)

(58) Field of Classification Search
CPC ...... E21B 33/063; E21B 33/064; E21B 34/16; F15B 1/02; G05B 9/03
See application file for complete search history.

(56) References Cited

U.S. PATENT DOCUMENTS 10,876,369 B2 * 12/2020 Holmes .................. E21B 34/16
2020/0408058 A1 * 12/2020 Pedersen ............. E21B 33/0355

* cited by examiner

*Primary Examiner* — James G Sayre
(74) *Attorney, Agent, or Firm* — Hogan Lovells US LLP

(57) ABSTRACT

A blowout preventer system including a lower blowout preventer stack comprising a number of hydraulic components, and a lower marine riser package comprising a first control pod and a second control pod adapted to provide, during use, redundant control of hydraulic components of the lower blowout preventer stack where the first and the second control pods are adapted to being connected, during use, to a surface control system and to be controlled, during use, by the surface control system. The blowout preventer system further including at least one additional control pod connected to at least one additional surface control system and to be controlled, during use, by the additional surface control system.

20 Claims, 20 Drawing Sheets

Related U.S. Application Data application No. 62/091,160, filed on Dec. 12, 2014, provisional application No. 62/092,973, filed on Dec. 17, 2014, provisional application No. 62/093,051, filed on Dec. 17, 2014, provisional application No. 62/093,083, filed on Dec. 17, 2014, provisional application No. 62/093,200, filed on Dec. 17, 2014, provisional application No. 62/093,029, filed on Dec. 17, 2014, provisional application No. 62/097,845, filed on Dec. 30, 2014, provisional application No. 62/103,817, filed on Jan. 15, 2015, provisional application No. 62/105,445, filed on Jan. 20, 2015, provisional application No. 62/105,379, filed on Jan. 20, 2015, provisional application No. 62/147,210, filed on Apr. 14, 2015, provisional application No. 62/155,671, filed on May 1, 2015, provisional application No. 62/158,364, filed on May 7, 2015, provisional application No. 62/164,086, filed on May 20, 2015, provisional application No. 62/057,586, filed on Sep. 30, 2014.

HIGH PRESSURE BLOWOUT PREVENTER SYSTEM

CROSS-REFERENCE TO RELATED APPLICATIONS

This application is a continuation of U.S. patent application Ser. No. 15/706,360, which was filed on Sep. 15, 2017, which is a continuation-in-part of U.S. patent application Ser. No. 14/884,563, which was filed on Oct. 15, 2015, and which claims priority to U.S. Provisional Patent Appln. Nos. 62/065,431, which was filed on Oct. 17, 2014, 62/067,829, which was filed on Oct. 23, 2014, 62/078,236, filed Nov. 11, 2014, 62/091,160, filed Dec. 12, 2014, 62/092,973, filed Dec. 17, 2014, 62/093,051, filed Dec. 17, 2014, 62/093,083, filed Dec. 17, 2014, 62/093,200, filed Dec. 17, 2014, 62/093,029, filed Dec. 17, 2014, 62/097,845, filed Dec. 30, 2014, 62/103,817, filed Jan. 15, 2015, 62/105,445, filed Jan. 20, 2015, 62/105,379, filed Jan. 20, 2015, 62/147,210, filed Apr. 14, 2015, 62/155,671, filed May 1, 2015, 62/158,364, filed May 7, 2015, and 62/164,086, filed May 20, 2015, the full disclosures of which are hereby incorporated herein by reference in their entirety.

This application is a continuation of U.S. patent application Ser. No. 15/706,360, which was filed on Sep. 15, 2017, which is a continuation-in-part of U.S. patent application Ser. No. 14/870,249, which was filed on Sep. 30, 2015, which claims priority to U.S. Provisional Patent Appln. No. 62/057,586, which was filed on Sep. 30, 2014, and U.S. Provisional Patent Appln. No. 62/067,829, which was filed on Oct. 23, 2014, the full disclosures of which are hereby incorporated herein by reference in their entirety.

This application is a continuation of U.S. patent application Ser. No. 15/706,360, which was filed on Sep. 15, 2017, is also a continuation-in-part of U.S. patent application Ser. No. 15/160,073, which was filed on May 20, 2016, and which claims priority to U.S. Provisional Patent Appln. No. 62/164,086, which was filed on May 20, 2015, the full disclosures of which are hereby incorporated herein by reference in their entirety.

BACKGROUND OF THE INVENTION

1. Field of the Invention

Embodiments disclosed herein relate generally to subsea oil and gas drilling systems. In particular, embodiments disclosed herein are related to subsea oil and gas drilling systems in high pressure environments.

2. Brief Description of Related Art

Subsea drilling for oil and gas typically involves the use of a vessel, which can be, for example, a drill ship or a platform, on the surface of the sea, with a riser extending to near the sea floor. The bottom end of the riser is attached to a lower marine riser package, which contains, among other things, control pods intended to control components of the drilling system near the sea floor. Below the riser is typically positioned a stack, which includes a lower marine riser package and a lower stack. The lower stack includes a blowout preventer (BOP) mounted to a wellhead. The drilling pipe extends from the vessel at the sea surface, through the riser to the bottom of the sea, through the BOP, and through the wellhead into a wellbore to the oil producing formation.

As subsea drilling extends into deeper formations, pressures and temperatures increase. With higher pressures, there are greater potential safety and environmental consequences if a well leaks. For decades, limitations of known drilling technology have prevented the oil and gas industry from drilling wells having pressures greater than approximately 15,000 pounds per square inch, resulting in lost benefits to the countries who own the associated oil reserves, the oil and gas industry, and consumers.

In addition, Subsea drilling for oil and gas typically involves the use of a vessel, which can be, for example, a drill ship or a platform, on the surface of the sea, with a riser extending to near the sea floor. The bottom end of the riser is attached to a lower marine riser package, which contains, among other things, control pods intended to control components of the drilling system near the sea floor. Below the riser is typically positioned a lower stack, which includes a blowout preventer (BOP) mounted to a wellhead. The drilling pipe extends from the vessel at the sea surface, through the riser to the bottom of the sea, through the BOP, and through the wellhead into a wellbore to the oil producing formation.

One purpose of the BOP is to act as a failsafe mechanism to prevent oil and gas from escaping from the wellbore into the environment. To accomplish this task, the BOP typically includes a plurality of rams. Some rams have elastomeric seals and are designed to close around the drill pipe if needed to seal the annulus around the pipe. That way, if an unexpected pressure surge tries to force oil and gas from the wellbore through the annulus, the BOP can close to prevent a spill. Other rams are known as shearing rams, including blind shear rams, and are designed to cut through drill pipe and other items extending into the wellbore to completely seal the wellbore from the surrounding environment.

Because of the safety functions played by the BOP in a subsea drilling operation, it is necessary to ensure that all BOP control systems and components are functioning properly, and to provide redundant backup systems in case of a failure. Accordingly, added redundancy and monitoring capability, such as in the form of a safety instrumented system, is beneficial.

In addition, as subsea drilling extends into deeper waters, pressures at the sea floor, where the BOP is located, increase. With higher pressures, there are greater consequences if a well leaks, and the BOPs themselves require design modifications to ensure safety. Accordingly, new safety instrumented systems for backing up the BOP control system, as well monitoring its function, are needed.

Furthermore, BOP systems are hydraulic systems used to prevent blowouts from subsea oil and gas wells. BOP equipment typically includes a set of two or more redundant control systems with separate hydraulic pathways to operate a specified BOP function. The redundant control systems are commonly referred to as blue and yellow control pods. In known systems, a communications and power cable sends information and electrical power to an actuator with a specific address. The actuator in turn moves a hydraulic valve, thereby opening fluid to a series of other valves/piping to control a portion of the BOP.

Many BOP systems are required to be safety integrity level (SIL) compliant. In addition, most modern BOP systems are expected to remain subsea for up to 12 months at a time. In order to decrease the probability of failure on demand, BOP control valves need to be tested while they are subsea without requiring extra opening and closing cycles of the BOP or requiring additional high pressure hydraulic cycles to close the bonnets solely for testing purposes.

Various types of control systems can be safety rated against a family of different standards. These standards may be, for example, IEC61511 or IEC61508. Safety standards typically rate the effectiveness of a system by using a safety integrity level. The SIL level of a system defines how much improvement in the probability to perform on demand the system exhibits over a similar control system without the SIL rated functions. For example, a system rated as SIL 2 would improve the probability to perform on demand over a basic system by a factor of greater than or equal to 100 times and less than 1000 times.

One issue with attaining a safety integrity level rating for subsea hydraulic equipment is lack of ability to test each valve in the system and ascertain its functionality without retrieving the valve from the sea floor. BOP systems often utilize several valves working together to activate a function in a single circuit. While some have suggested placing diagnostics on each and every valve in a BOP system, such a solution is impractical and difficult to execute in practice.

SUMMARY OF THE INVENTION

One aspect of the present technology provides a blowout preventer (BOP) system for use in a high pressure subsea environment. The BOP system includes a BOP stack including a lower marine riser package and a lower stack portion, the lower stack portion having a plurality of BOP rams attached to a subsea wellhead, and a riser subsystem extending from a drilling vessel to the BOP stack and providing fluid communication therebetween. In addition, the BOP system includes a ship board subsystem electronically, mechanically, and hydraulically connected to the BOP stack and the riser subsystem to control the functions of the BOP stack and the riser subsystem, as well as a safety instrumented system having a surface logic solver and at least one subsea logic solver, the safety instrumented system in communication with at least a portion of the BOP rams to act as a redundant control system in case of failure of the ship board subsystem.

An alternate aspect of the present technology provides a BOP system for use in a high pressure subsea environment that includes a BOP stack connected to a drilling vessel, the BOP stack including a lower marine riser package and a lower stack portion, the lower stack portion having a plurality of BOP rams attached to a subsea wellhead. In addition, the BOP system includes an auxiliary stack test system for connection to the BOP stack to test the BOP stack prior to deployment in order to ensure compliance of the BOP stack with predetermined standards, the auxiliary stack test system having testing hardware and software designed to mimic control system software and hardware to be used during drilling operations in order to effectively test the BOP stack, the auxiliary stack test system comprising a safety integrity level rated system cabinet configured to test a safety instrumented system of the BOP system.

An alternate aspect of the present technology provides a blowout preventer (BOP) system for use in a high pressure subsea environment that includes a BOP stack including a lower marine riser package and a lower stack portion, the lower stack portion having a plurality of BOP rams attachable to a subsea wellhead, and a ship board subsystem electronically, mechanically, and hydraulically connectable to the BOP stack and a riser subsystem to control the functions of the BOP stack and the riser subsystem, wherein the riser subsystem extends from the drilling vessel to the BOP stack and provides fluid communication therebetween, the BOP system operable with a well having a pressure of up to at least approximately 20,000 pounds per square inch.

An alternate aspect of the present technology provides a blowout preventer (BOP) system for use in a high pressure subsea environment that includes a BOP stack including a lower marine riser package and a lower stack portion, the lower stack portion having a plurality of BOP rams attachable to a subsea wellhead, and a ship board subsystem electronically, mechanically, and hydraulically connectable to the BOP stack and a riser subsystem to control the functions of the BOP stack and the riser subsystem, wherein the riser subsystem extends from the drilling vessel to the BOP stack and provides fluid communication therebetween, the BOP system operable at internal fluid temperatures (i.e. fluids exiting the well and entering the BOP) of up to at least approximately 350 degrees Fahrenheit.

Yet another aspect of the present technology provides a method of drilling for oil and gas in a high pressure subsea environment. The method includes the steps of attaching a BOP stack to a wellhead at the sea floor, the wellhead capping a well having a pressure of up to at least approximately 20,000 pounds per square inch, and connecting the BOP stack to a drill ship using a subsea riser subsystem. The method further includes controlling functions of the BOP stack with a ship board subsystem that is electronically, mechanically, and hydraulically connected to components of the BOP stack, and connecting logic solvers associated with a safety instrumented system, and separate from the ship board subsystem, to components of the BOP stack to act as a redundant control system for the BOP stack.

One aspect of the present invention provides a control system for a subsea blowout preventer (BOP) positioned in a lower stack, the lower stack releasably engaged with a lower marine riser package (LMRP). The control system includes a surface logic solver positioned at or adjacent the surface of the sea that generates commands for operating the subsea BOP, a first subsea logic solver attached to the LMRP and in communication with the surface logic solver so that the first subsea logic solver receives the commands from the surface logic solver, and a second subsea logic solver attached to a hydraulic control unit in the lower stack. The second subsea logic solver is in hydraulic communication with the subsea BOP, and the first subsea logic solver so that the second subsea logic solver receives the commands from the first subsea logic solver and implements the commands by activating the hydraulic control unit to operate the BOP.

In some embodiments, the lower stack can be attached to the LMRP by a hydraulic connector, and the hydraulic control unit can control the hydraulic connector. In other embodiments, the lower stack can be attached to the LMRP by a hydraulic connector, and the hydraulic connector can be powered by an accumulator.

In certain embodiments, the surface logic solver, the first subsea logic solver, and the second subsea logic solver, can each comprise a central processing unit (CPU). In other embodiments, the surface logic solver can comprise a central processing unit (CPU), and the first subsea logic solver or the second subsea logic solver, or both, can comprise an extended input/output (I/O) card.

In some embodiments, the surface logic solver can be connected to the first subsea logic solver by a cable having high voltage wires and optical communication lines, and the first subsea logic solver can be connected to the second subsea logic solver by a cable having low voltage wires and no optical communication lines. In addition, the system can further include an acoustic pod in communication with and controllable by the second subsea logic solver.

In alternate embodiments, the system can further include a human machine interface panel connected to the surface logic solver, and an automatic controller in communication with the surface logic solver that automatically issues commands to the surface logic solver based on predetermined conditions detected by the surface logic solver. In such an embodiment, the system can also have a key switch having a first position and a second position, the first position opening communication between the surface logic solver and the human machine interface panel, and the second position opening communication between the surface logic solver and the automatic controller.

Another aspect of the present invention provides a redundant control system for a subsea BOP positioned in a lower stack, the lower stack removably engaged with an LMRP, and the LMRP having first and second control pods, each in hydraulic communication with the BOP to control the BOP. The system includes a surface logic solver positioned at or adjacent the surface of the sea that generates commands for operating the subsea BOP, and a first subsea logic solver attached to the first control pod and in communication with the surface logic solver, the first subsea logic solver in communication with the first control pod so that the first subsea logic solver is capable of receiving commands from the surface logic solver and implementing the commands by activating the first control pod to operate the BOP. In addition, the system includes a second subsea logic solver attached to the second control pod and in communication with the surface logic solver, the second subsea logic solver in communication with the second control pod so that the second subsea logic solver is capable of receiving commands from the surface logic solver and implementing the commands by activating the second control pod to operate the BOP.

In some embodiments, the lower stack can be attached to the LMRP by a hydraulic connector, and the hydraulic connector can be in communication with the first subsea logic controller and the second subsea logic controller. In other embodiments, the lower stack can be attached to the LMRP by a hydraulic connector, and the hydraulic connector can be powered by an accumulator.

In certain embodiments, the surface logic solver, the first subsea logic solver, and the second subsea logic solver, can each comprise a CPU. In other embodiments, the surface logic solver can comprise a CPU, and the first subsea logic solver or the second subsea logic solver, or both, can comprise an extended I/O card. In addition, control system can further include an acoustic pod in communication with and controllable by the first subsea logic solver and the second subsea logic solver.

In alternate embodiments, the system can further include a human machine interface panel connected to the surface logic solver, and an automatic controller in communication with the surface logic solver that automatically issues commands to the surface logic solver based on predetermined conditions detected by the surface logic solver. In such an embodiment, the system can also have a key switch having a first position and a second position, the first position opening communication between the surface logic solver and the human machine interface panel, and the second position opening communication between the surface logic solver and the automatic controller.

Yet another aspect of the present technology provides a method for controlling a subsea blowout preventer (BOP). The method includes the steps of generating a command signal in a surface logic solver located at or adjacent the surface of the sea, transmitting the command signal to a first subsea logic solver attached to a lower marine riser package, transmitting the command signal to a second subsea logic solver attached to a hydraulic control unit in a lower stack, the hydraulic control unit in communication with the subsea BOP, operating the subsea BOP with the hydraulic control unit in accordance with the command signal.

In some embodiments, the first transmitting step between the surface logic solver and the first subsea logic solver can be carried out via an optical cable between the surface logic solver and the first subsea logic solver. Similarly, the second transmitting step between the first logic solver and the second logic solver can be is carried out via a copper wire between the first subsea logic solver and the second subsea logic solver. In some embodiments, the first subsea logic solver can convert the command signal from an optical signal to a copper signal.

Embodiments of the invention utilize back pressure and a reduced number of sensors to carry out a proof test in a BOP system. Therefore, disclosed is a blowout preventer (BOP) safety system for testing the integrity of hydraulic safety valves at the sea floor. The system includes a BOP stack including a BOP, the BOP comprising a BOP shear ram; a first hydraulic circuit, the first hydraulic circuit in fluid communication with the BOP shear ram and having an open side and a close side; and a manifold, wherein the manifold is disposed proximate to and in fluid communication with a dump valve, a first sensor, and a supply valve. The system further includes a first safety valve disposed between and in fluid communication with the manifold and the BOP on the close side, wherein the dump valve is operable to allow flow from the BOP to the manifold through the safety valve, and wherein the first sensor is operable to detect the flow from the BOP to the manifold.

Additionally disclosed is a method for testing the integrity of safety valves on a blowout preventer (BOP) at the sea floor. The method includes the steps of pressurizing a manifold to increase pressure in the manifold; detecting a first pressure increase in the manifold; decreasing the pressure in the manifold to less than the pressure in a BOP bonnet fluidly coupled to the manifold; opening a valve disposed between the BOP bonnet fluidly coupled to the manifold and the manifold to allow flow from the BOP bonnet to the manifold; detecting a second pressure increase in the manifold; closing the valve; re-pressurizing the manifold; and presenting a pass or fail test message for the integrity of the valve.

Further disclosed is a BOP safety characterization system to enhance safety and reliability testing of BOP's in a subsea application. The system includes a BOP stack, in electrical communication with a surface computing unit and a processing unit disposed within the surface computing unit, including a processor, operable to receive an electrical signal from the BOP stack. The processing unit is in communication with and includes non-transitory, tangible memory medium in communication with the processor having a set of stored instructions, the set of stored instructions being executable by the processor and including the steps of: performing pressure testing on the BOP stack and maintaining pressure in one or more BOP's of the BOP stack; pressurizing a manifold; detecting a first pressure increase in the manifold; releasing pressure in the manifold via a valve to de-pressurize the manifold to about atmospheric pressure responsive to detecting the first pressure increase in the manifold; allowing fluid flow between one or more BOP's of the BOP stack and the manifold; detecting a second pressure increase in the manifold; and displaying a test pass or test fail message to a display readable by a user responsive to detecting the first and second pressure increases in the manifold.

One alternate aspect of the present technology provides a blowout preventer system including a lower blowout preventer stack comprising a number of hydraulic components, and a lower marine riser package comprising a first control pod and a second control pod adapted to provide, during use, redundant control of hydraulic components of the lower blowout preventer stack where the first and the second control pods are adapted to being connected, during use, to a surface control system and to be controlled, during use, by the surface control system. The blowout preventer system further includes at least one additional control pod connected to at least one additional surface control system and to be controlled, during use, by the additional surface control system.

Another aspect of the present technology provides a lower blowout preventer stack comprising a number of hydraulic components, and at least one additional control pod adapted to be connected, during use, to an additional surface control system. Some embodiments provide an additional control pod arranged to receive information of one or more input signals provided to a first and/or a second control pod, and to monitor whether an action is executed and completed by the first and/or second control pod and/or a lower blowout preventer stack and/or a lower marine riser package.

Yet another embodiment of the present technology provides a blowout preventer system wherein the units, systems, and/or functionality related to an additional subsea control unit and/or an additional surface control system, including the additional subsea control unit and/or the additional surface control system, is/are certified according to a predetermined safety requirement, rating, or standard, e.g. according to a safety integrity level rating or standard.

BRIEF DESCRIPTION OF THE DRAWINGS

The present technology can be better understood on reading the following detailed description of nonlimiting embodiments thereof, and on examining the accompanying drawings, in which.

DETAILED DESCRIPTION OF THE PREFERRED EMBODIMENT

Figure 1:
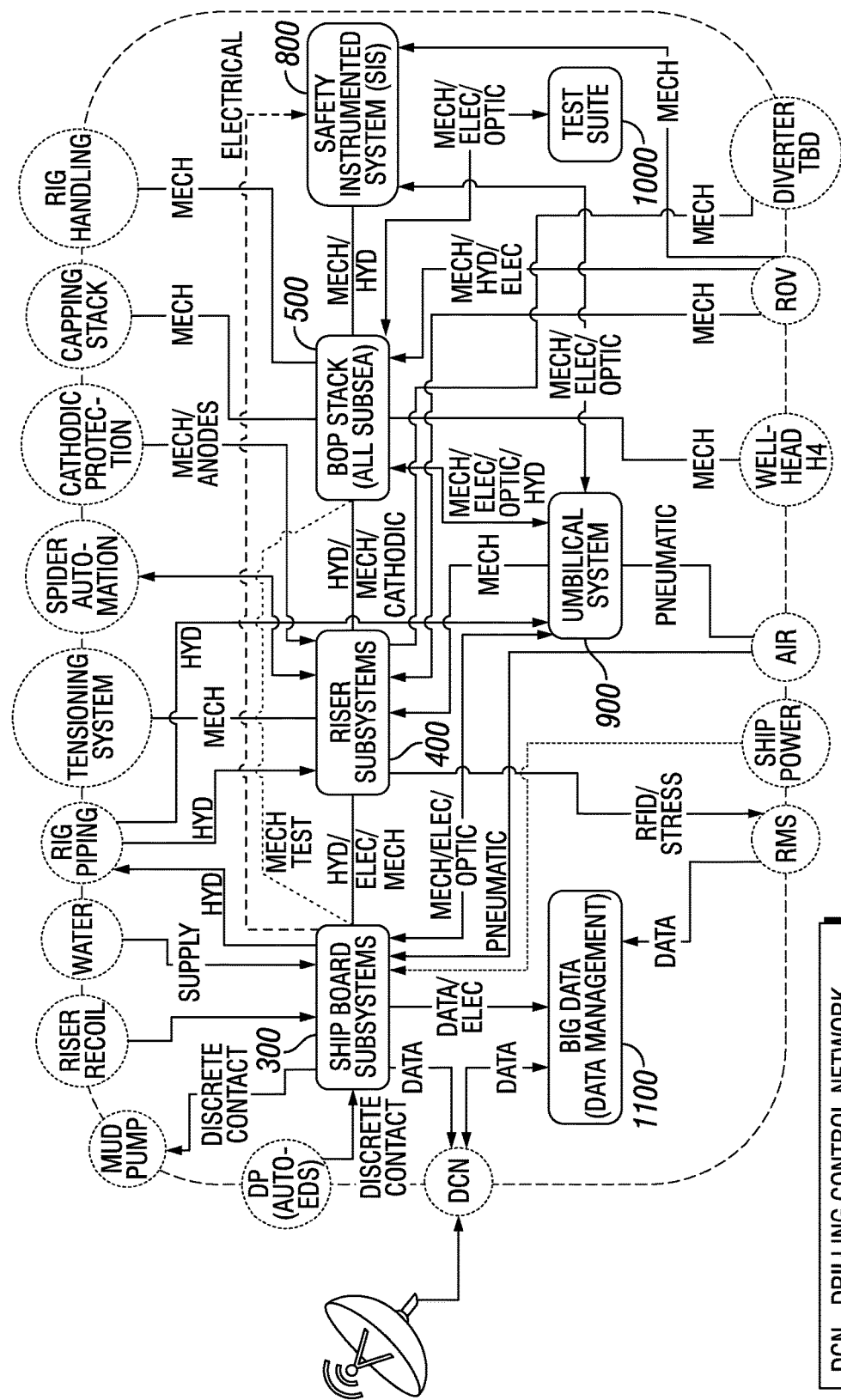
FIG. 1 shows a context diagram of a BOP system according to an embodiment of the present technology.

The foregoing aspects, features, and advantages of the present technology can be further appreciated when considered with reference to the following description of preferred embodiments and accompanying drawings, wherein like reference numerals represent like elements. The following is directed to various exemplary embodiments of the disclosure. The embodiments disclosed should not be interpreted, or otherwise used, as limiting the scope of the disclosure, including the claims. In addition, those having ordinary skill in the art can appreciate that the following description has broad application, and the discussion of any embodiment is meant only to be exemplary of that embodiment, and not intended to suggest that the scope of the disclosure, including the claims, is limited to that embodiment.

High Pressure Blowout Preventer System

The below description provides an overview of the systems of the present technology. In it, the subsystems included in the technology identified, and a high level description of each subsystem is provided. This description also describes system level interfaces between the subsystems, and external components required for proper BOP functionality within the system.

In the application, the acronyms and abbreviations used to describe the present technology can have the following meanings:

ASTS—Auxiliary Stack Test System
BPCS—Basic Process Control System
BOP—Blowout Preventer
BSR—Blind Shear Ram
C&K—Choke and Kill
CBM—Condition Based Maintenance
CCU—Central Control Unit
CP—Cathodic Protection
CSR—Casing Shear RAM
EDS—Emergency Disconnect Sequence
ERA—Electronic Riser Angle
FITA—Field Installable Termination Assembly FRU—Fluid Reservoir Unit
HMI—Human Machine Interface
HPHT—High Pressure High Temperature
HPTU—High Pressure Test Unit
HPU—Hydraulic Power Unit
HVR—Variable ram
I/O—Input/Output
Ksi—Thousands of pounds per square inch
LMRP—Lower Marine Riser Package
MTBR—Mean Time Between Repair
MUX—Multiplex
MWP—Maximum Working Pressure
psia_pounds per square inch absolute
RBOP—Ram Blowout Preventer
ROV—Remotely Operated Vehicle
SEM—Subsea Electronics Module
SIF—Safety Instrumented Function
SIL—Safety Integrity Level
SIS—Safety Instrumented System
SRS—Safety Requirements Specification In the application, the following terms have the following definitions:

Central Control Unit means cabinets that contain the computers which process the data and send control signals to other subsystems such as the subsea POD. The CCU typically have a Blue and Yellow designated cabinet for redundancy purposes.

Drillers Panel means the HMI terminal that is located near the moon pool on a drillship.

Emergency Disconnect Sequence means a programmed sequence of events that operates the functions to leave the stack and controls in a desired state and disconnect the LMRP from the lower stack.

Engineering Work Station means the HMI terminal to view BOP status information. The Engineering Work Station typically contains equipment for data logging.

Fluid Reservoir Unit mixes and stores hydraulic fluid concentrate, glycol and water to produce the hydraulic fluid which is supplied to the HPU for charging accumulator racks and operating hydraulic stack functions.

Hydraulic Pumping Unit supplies hydraulic fluid to charge both the surface and subsea accumulators from precharge pressure to the maximum system operating pressure.

Kick means an influx of formation liquids or gas into the wellbore. Without corrective measures, a kick can result in a blowout.

Lower Marine Riser Package means the portion of the stack where the annular BOPs and the subsea control system (POD) is mounted. The LMRP may disconnect from the lower stack via a hydraulic connector.

Lower Stack means the portion of the stack that sits between the wellhead and the LMRP. Typically this portion of the stack houses the ram BOPs, acoustic backup, and deadman systems.

POD means the subsea component that contains two SEMs, the subsea transformer, and the subsea hydraulic control valves.

Safety Integrity Level refers to the amount of risk reduction required from the safety instrumented system.

Safety Instrumented System is a system engineered to perform specific control functions to failsafe or maintain safe operation of a process when unacceptable or dangerous conditions occur.

Skid refers to the mechanical arrangement for certain subsystems on the ship.

Stack means the assembly that sits between the wellhead and the riser. The blowout prevention system is mounted to the stack. The stack consists of the lower stack and the LMRP.

Toolpushers Panel means an HMI terminal located on the drillship.

During drilling operations, the BOP is typically the secondary method of well control. The primary method of pressure control in a well generally consists of pressure control via weighted drilling mud using counter pressure techniques. Due to the uncertainty of reservoir pressures, however, which are estimated prior to commencing drilling, at times the weight of the drilling mud is insufficient to maintain control of the well. In such a condition, known in the industry as a kick, the BOP can protect the rig and the environment from the effects of the kick.

In the drawings, FIG. 1 depicts the top level subsystems. These include ship board subsystems 300, marine riser subsystems 400, BOP stack subsystem 500, including LMRP 600 (shown in FIG. 6) and lower stack 700 (shown in FIG. 7), SIS subsystem 800, umbilical subsystem 900, test suite 1000, and big data subsystem 1100 (rig to cloud data management subsystem). In addition, some embodiments of the present technology include CBM technology, through which systems of the technology collect, correlate, and process data related to specific components or groups of components, and determine a use-based maintenance schedule more efficient than known time-based maintenance schedules.

As described in further detail below with respect to each subsystem, the shipboard subsystems 300 can include surface controls, a diverter skid and accumulator (designed to support the hydraulic needs of a diverter), an HPU and/or FRU and accumulator (designed to support the hydraulic needs of the HPU), power management components, as well as other components. The marine riser subsystem 400 can include an LMRP riser adapter, riser joints, riser tension rings, riser running tools (which can be hydraulic), manual running tools, and riser lifting tools. The marine riser subsystem can also include an automated riser management control system (RMS) capable of using radio frequency identification (RFID) techniques for each riser section to uniquely identify that section for the purpose of tracking is deployment (time subsea) and position in the riser string.

In addition, and as can be described in further detail below, the BOP stack subsystem 500 can include subsea controls and acoustic sensing housed within the stack frame. In some embodiments, the stack can accommodate the ability to be lifted vertically or horizontally from the ocean floor, and the frame surrounding and supporting the BOPs can provide the ability to mount acoustic sensors and the electronic controls to collect the data for transmission to the surface. The BOP stack subsystem 500 can also be equipped with a C&K subsystem, and can be designed to be ROV friendly by providing panels to allow an ROV the ability to read and/or collect data and actuate valves as a means of independent external control of certain functions.

The SIS subsystem 600 can include a surface and subsea logic solver, as well as SIL rated hydraulic components to actuate the identified BOPs per SRS. The test suite 1000 can include an ASTS for conducting testing of an auxiliary stack on the deck of the ship, as well as an HPTU for testing the hydraulics on the riser string and BOP stack. Furthermore, the test suite 1000 can include a POD test station. In some embodiments, the big data subsystem 1100 can include two distinct levels of functionality. First, portions of the big data subsystem 1100 can reside on the drill ship in the form of a server providing a framework for hosting applications to meet customer needs and provide a portal for transmitting data to a cloud based data management system. Second, the big data subsystem 1100 can utilize cloud based data management services to provide operational data, such as component tracking.

According to certain embodiments of the technology, the top level functionality of the drilling system can include a BOP stack subsystem 500 designed to address 20 Ksi pressure ratings needed for exploring well depths not currently achieved using existing technology. In addition, the marine riser subsystem 400 can provide a connection between the surface drill ship and the BOP stack subsystem 400 components for the drilling equipment to be guided to the wellhead, and support the cabling and hydraulics for controls between surface and subsea sub systems.

In addition, in some embodiments, the BOP control system (surface & subsea) can allow a drilling operator the ability monitor and actuate the BOP stack subsystem 500 functionality. The umbilical subsystem 900 can provide high voltage power, hydraulic lines, and fiber optic communication cables. In addition, the umbilical subsystem 900 can be redundant with a Blue and Yellow designation that corresponds to common terminology in the field.

Furthermore, in some embodiments, the system can include new features to allow external monitoring of the BOP stack subsystem 500 using acoustics, and can also include an SIL rated backup control system to provide enhanced safety. To improve tracking of parts and enhance the ability to identify potential risk, a big data subsystem 1100 can be used. The big data subsystem 1100 can allow tracking of usage to ensure customer service is aware of pending equipment service and failure patterns. This system can identification of patterns to aid in addressing systemic design issues.

In some embodiments of the technology, the system can monitor the following conditions, among others:
FRU fluid levels (high and low)
Temperatures within surface control cabinets
Temperatures within the subsea SEM housing, power bus voltage (both AC and DC)
Solenoid voltage and current (e.g., a small trickle current can be monitored to indicate the solenoid coil isn't open circuit)
Water ingress in the SEM housing (An alarm message can be sent to the surface if the housing loses the 1 ATM pressure and water begins to fill the housing)
Well bore pressure & temperature
Surface accumulator pressure
Subsea manifold regulator pressure
Upper and lower annular regulator pressure
HPU Accumulator, Manifold and pump pressures and filtration (which can provide an indication that a filter is plugged)
Hydraulic flow to subsea components
ERAs on both ends of the riser
BOP Ram position and pressure
Hydraulic leaks and valve actuations in an acoustic detection subsystem.

At least a portion of these conditions can be monitored using pressure and temperature sensors that conform to an electrical interface in the range of about 4 to about 20 milliamps (mA).

Certain embodiments of the present technology can also include up to five or more SIFs. These can include: pipe ram BOP control, CSR BOP control, BSR BOP control, LMRP connector release, and EDS.

The systems of the present technology are advantageous over many known systems because they provide a number of different capabilities. For example, the system described herein is reliable, and can have an MTBR (scheduled or unscheduled) of up to about 365 BOP-days or more for the system of all subsea equipment. This is achieved in part by improving reliability by about 120% or more in some subsystems, including the umbilical subsystem 900, subsea electronic components, subsea hydraulic components, and C&K lines. Reliability improvements to other components are beneficial for improving MTBR. Further, the systems and subsystems of the present technology are designed to comply with applicable government and industry regulations and standards, such as those associated with the Bureau of Safety and Environmental Enforcement (BSEE), and American Petroleum Institute (API), and the International Electrotechnical Commission (IEC).

In addition, systems of the present technology are capable of achieving high levels of drilling availability for each function of the system, and to reduce running time and the time taken for maintenance. This is accomplished by implementing redundancy in strategic portions of the system, as described in further detail below. Furthermore, the systems of the present technology are designed so that the system design maintenance interval can be about 10 years or more.

Figure 2A:
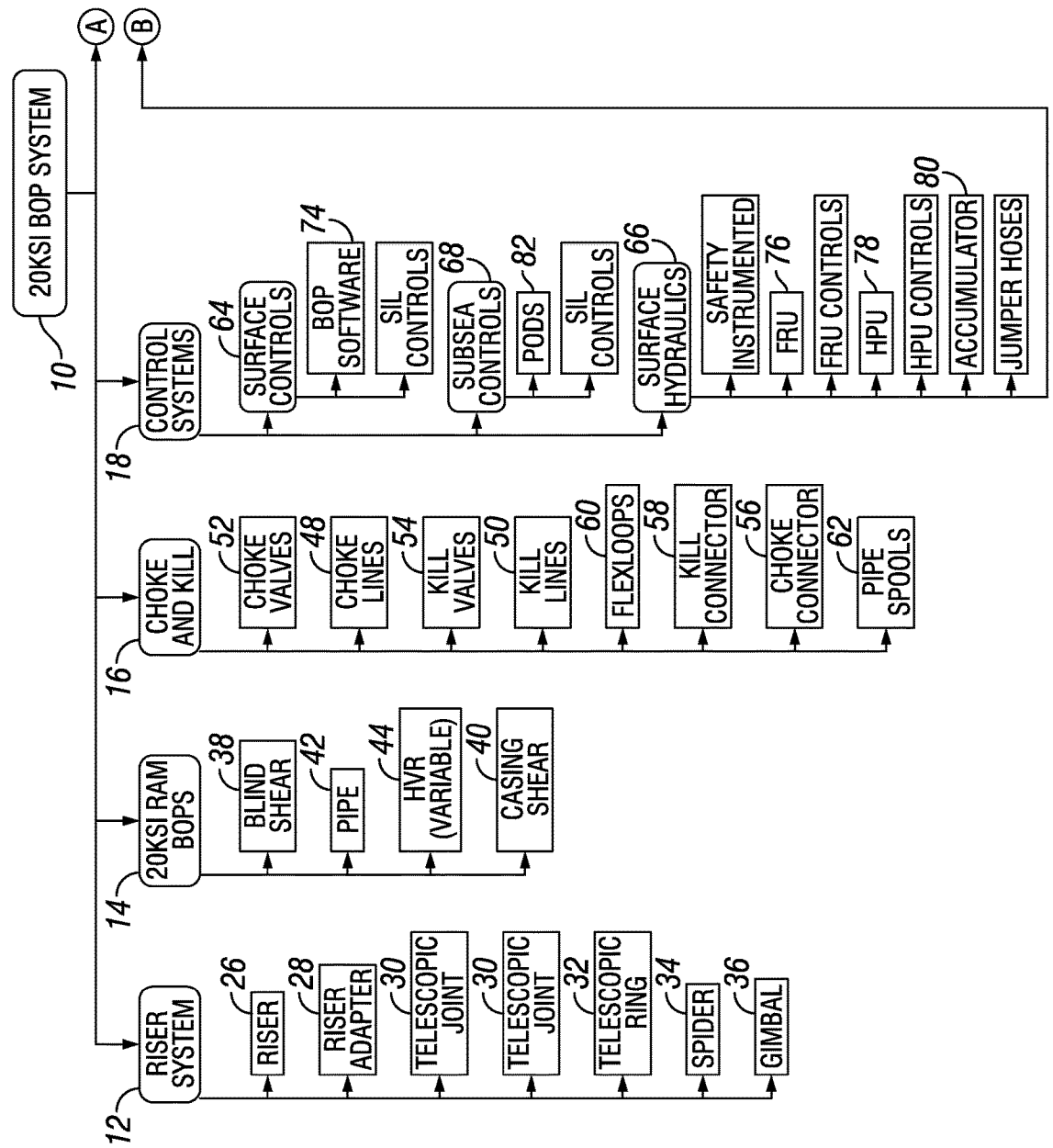
FIGS. 2A and 2B shows product breakdown structure diagrams of the BOP system of the present technology, along with various subsystems.
Figure 2B:
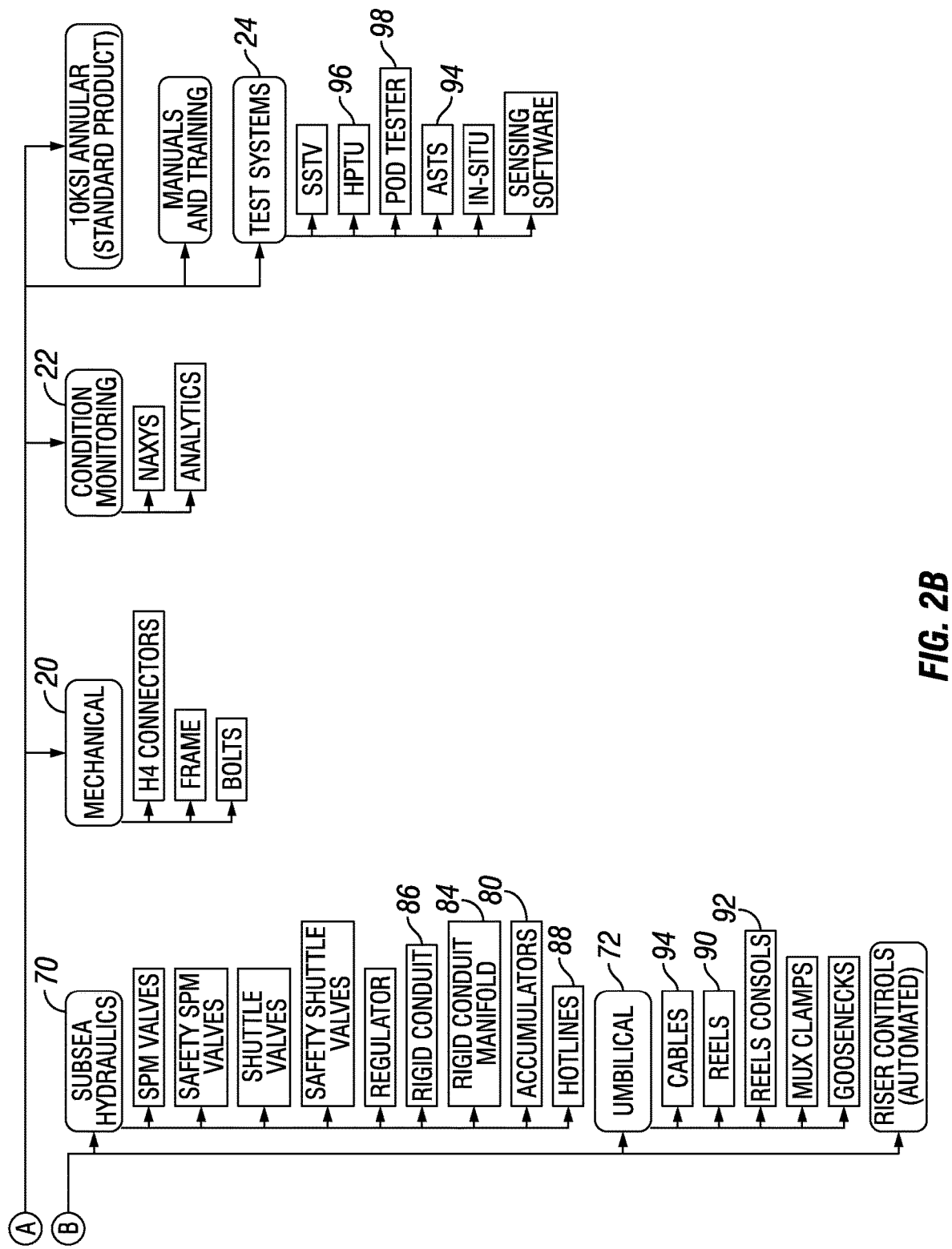

Overall System Architecture—FIGS. 2A and 2B

The BOP system 10 comprises numerous subsystems as identified in FIGS. 2A and 2B. For example, the BOP system 10 can consist of a riser components 12, multiple ram type BOPs 14, annular BOPs 602 (shown in FIG. 6), C&K components 16, a control system 18, and a subsea SIL solver with SIL rated valves. The BOP system 10 can be connected to the surface through a riser, two umbilical cables (containing fiber & copper), two rigid conduits, and a hot line. Subsea blue and yellow redundant pods are cross connected using a FITA device to provide redundant paths for communications & power. The BOP system 10 can contain electrical and hydraulic controls sufficient to close any of the ram BOPs or the annular BOPs on-demand. The BOP system 10 also includes mechanical components 20, condition monitoring components 22, and test components 24.

The riser components 12 provide the primary conduit between the surface and the wellhead equipment for drilling mud and drilled matter. Additionally, the riser components 12 support the weight of the BOP and LMRP during deployment and retrieval of these components, and can have a tension rating of up to about 4.5 million lbs. or more. The riser components 12 extend from the LMRP up to a diverter, and consist of the following: a riser 26, riser adapter 28, riser joints 30 (which can be slick and buoyant, and can be about 90 inches in length), various pup joints, C&K lines, a boost line, hydraulic lines (which can be duplex), a gas handler with a gas diversion line, telescopic joint interfacing, telescopic rings 32, a split tension ring, a termination ring, a spider 34, and a gimbal 36, as well as various running, handling, and maintenance tools.

In certain embodiments, the riser main tube can have a minimum inside diameter of about 19.25 inches below the telescopic joints. In addition, in many embodiments, the riser connection coupling make-up and disconnect does not require manual interface and can be completely automated for running and retrieval.

The ram type BOPs 14 can consist of one dual annular and a flex joint (which can have up to about a 6,000 lb. rating) at the top of the stack and supported by the LMRP frame. In some embodiments, there can be about eight ram type BOPs 14, which can comprise the BOP stack on the lower frame.

The rams can include two or more BSRs 38, one or more CSR 40, and at least one pipe ram 42. In some cases, there may also be included an HVR 44.

The C&K components 16 are designed to allow a driller to circulate out a kick that is contained in the wellbore by a closed BOP. Once a kick has been detected, the mud weight must be increased to prevent further influx into the wellbore. At the same time, any influx of gas already in the well must be safely circulated out. A choke line 48 directs fluid out of the wellbore to what is known as a choke and kill manifold, located on the surface of the drilling vessel. There can be a variable choke valve on the surface that is controlled to maintain a safe circulation of any influx out of the well. A kill line 50 is used circulate fluid into the wellbore below a closed BOP. Using the kill line 50, a driller can add higher weight mud into the wellbore to stop any further influx from occurring.

Each cavity in the BOP can have an outlet for attaching either a choke line 48 or a kill line 50, depending on the BOP stack configuration, below the closed ram for that cavity. These choke lines 48 and kill lines 50 are isolated from the wellbore using what are known in the industry as C&K valves 52, 54, respectively. The C&K valves 52, 54 can be assembled on the BOP stack 14 and used to isolate the wellbore from the C&K lines 48, 50 during normal operations. In a kick scenario, two of these valves can be opened to allow flow into and out of the wellbore. In some embodiment, the valves can be a 3 1/16" bi-directional double master C&K gate valves with a failsafe closed actuator and a failsafe open actuator. These valves are typically mounted to a 3 1/16" or 4 1/16" flange. The actuator can be powered by the same control system that controls the other functions on the BOP stack 14, utilizing the same operating fluid.

On the BOP stack, the C&K components 16 also consist of C&K connectors 56, 58, respectively, flexloop 60, and pipe spools 62. The C&K connectors 56, 58 are typically hydraulically extendable connections between the C&K lines 48, 50 on the LMRP and the lower stack. Since the LMRP is separately retrievable from the lower stack, a connector is required to enable the separation. The flexloop 60 provides a flexible conduit for connecting the C&K lines 48, 50 from the top of the fixed BOP stack to the riser adapter, which is allowed to move. Because the BOP stack is anchored to the seafloor, but the vessel is free to move on the surface, motion in the riser 26 must be allowed relative to the BOP stack 14. The flexloop 60 is used to allow this motion, which typically allows up to about 10 degrees of motion between the BOP stack 14 and the riser 26 in any direction. The flexloop 60 line is typically either rigid pipe bent into a loop or reinforced elastomeric hoses. The pipe spools 62 can be straight tubular members with flanges on each end to connect to the flexloop 60, C&K valves 52, 54, BOP stack 14, C&K connectors 56, 58, etc.

The control system 18 of the BOP system 10 can be broken into distinct pieces, including surface controls 64, surface hydraulic controls 66, subsea controls 68, subsea hydraulic controls 70, and umbilical controls 72.

The surface controls 64 can include software 74, developed using software modeling tools specific to generate executables targeting the known controllers and IO frameworks. The dual redundant CCUs (Blue & Yellow), discussed in greater detail below, are the focal point for the system control communication in the surface controls 64, and act as two of several HMIs. All data, including function commands from any surface control HMI, the associated responses from targeted system components, and system status updates, pass to the CCU, which in turn directs the data to the appropriate system components, as well as an engineering workstation for historical recordation.

The Engineering Work Station (EWS) (not shown) is the primary interface to the control systems 18 software. The cabinet mounted processor is capable of monitoring and printing alarms, errors, and events generated by the control system software as well as maintenance/diagnostics, system set up, and administrative capabilities.

The HPU interface panel (not shown) operates the hydraulic fluid mixing skid, controls up to three quintuplex pumps on the pumping skid, monitors surface accumulator and manifold pressures and controls electric actuators, which operate the open/close functions for the surface accumulator isolator valve, the blue and yellow hot line valves, and the rigid conduit valve.

The diverter control system interface panel (not shown) allows the diverter to be operated remotely from the CCU, driller's panel, or toolpusher's panel, and allows for communication between the system controllers and the diverter interface panel remote inputs and outputs.

The electrical distribution subsystem (not shown) includes redundant (Blue & Yellow) CCUs, and an uninterruptible power supplies (UPS) (not shown), a power distribution panels (PDPs) (not shown). The UPS isolates filters and regulates impure and erratic input power, as well as produces a reliable, consistent, pure sine wave output. The UPS can provide power to the control system 18 for a minimum of at least about two hours if loss of input power occurs. The PDPs provide power selectivity, protection, and coordination for the surface controls 64. Each PDP can receive power on two independent buses from two separate UPS sources, and can coordinate distribution to individual control sub-systems.

Some embodiments of the present technology can include a SIS panel, which can be a surface based logic controller that provides safety system control communication to the control systems 18. The SIS panel can have pushbutton functionality, and can provide illuminated indication to the operator for SIS events. Data, including function safety commands to subsea components, can originate from this panel. In addition, the associated responses from targeted system components, and system status updates, can be passed back to this panel.

In some embodiments, the remote display panel (not shown) can serve as the primary operator's station for the control systems 18. The remote display panel can be rated for use in hazardous areas, and can consist of a touchscreen driven by a board computer therein. The remote display panel can serve as several HMI options for controlling the control systems 18.

The surface hydraulic controls 66 can be responsible for filtering, mixing, pressurizing, storing, and distributing the control fluid that is used subsea and elsewhere on the rig for BOP operation and testing. The rig supplies potable water, concentrate, and glycol for use in the control fluid. The potable water can pass through a series of filtration and UV cleaning system components to bring the water to the concentrate manufacturer's recommended cleanliness prior to supplying the water to an FRU 76.

The FRU 76 mixes and stores hydraulic fluid concentrate, glycol, and water to produce the hydraulic fluid the supplies an HPU 78. The mix ratio of the fluid can be adjustable to match the manufacturer's recommended mix ratio. The control fluid can be stored in an unpressurized tank that feeds the HPU 78.

The HPU 78 can supply hydraulic fluid to charge both surface and subsea accumulators 80 from precharge pressure to a maximum system operating pressure which, in some embodiments, can be about 5,000 psi. This stored fluid can be used to operate all hydraulic functions in the LMRP and lower BOP stack.

The accumulators 80 can be charged with BOP control fluid by the HPU 78 from pre-charged pressure up to the system's operating pressure. The control fluid can then be discharged to the subsea hydraulic controls 66 via the rigid conduits on the riser and/or the hotline of the umbilical subsystem.

The subsea controls 68 can include electronic/electric and hydraulic controls for the purpose of monitoring and controlling the BOP stack 14. The subsea controls 68 can provide a reliable means to control the activation of the C&K valves and the BOPs (including rams and annulars), as well as other loads.

In addition, the subsea electronics can communicate with the surface controls 64 via fiber optic cables. Using fiber to communicate allows higher transmission rates required for the continuous monitoring subsystem, as well as greater immunity to electromagnetic interference. Control communications can be made independent of non-critical communications by routing the control communications through separate fibers.

The SEM and the subsea hydraulic controls can be major subsystems of the subsea POD 82. The SEMs can provide the ability to collect and transmit data (e.g., pressure, temperature, flow rate, and ram position) to the surface control subsystem, as well as the electric actuation of pilot valves through solenoids. There can be two fully redundant SEM units within each POD 82. In addition, subsea hydraulic controls can include pilot valves, shuttle valves, lines, SPM valves, and accumulator bottles. The accumulator bottles can provide the hydraulic fluid/pressure necessary to actuate a BOP.

The architecture of the subsea controls 68 can also include a new concept of encapsulating the power and communications into a common hub to serve as a source decoupled from the SEMs. This embodiment can deploy redundant hubs, including two on the LMRP and two the lower stack. This design can be advantageous because it can reduce (or eliminate) future redesigns of the SEM POD 82 if the need arises for additional power or communications. The subsea controls 68 design can also incorporate the functionality and interfaces of the FITA to allow cross coupling of both power and communications between the two PODs.

In some embodiments, the subsea controls 68 design (as well as the surface controls 64 design) can include an independent subsea logic solver (and/or IO extension) as part of the overall SIS to provide additional subsea safety controls.

The subsea hydraulic controls 70 are at least partially responsible for receiving control fluid from the surface hydraulic controls 66, and distributing that fluid to the hydraulic functions on the LMRP and Lower Stack. The subsea hydraulic controls 70 can include a rigid conduit manifold supplied with control fluid from rigid conduits 86 (blue and yellow) and/or the hotlines 88. Rigid conduit manifold regulators (not shown) can regulate (as necessary), and distribute the control fluid to the appropriate pod and to the subsea accumulators 80. The rigid conduit manifold 84 can be piped in such way that either rigid conduit 86 can supply either pod with complete redundancy.

The hydraulic section of the subsea pod typically receives control fluid from the rigid conduit manifold 84, regulates the fluid to the proper pressures, and distributes the fluid to the appropriate functions on the LMRP and Lower Stack. The pods can contain flow meters to measure flow as functions are actuated, as well as pressure transducers to measure the pressures of selected functions and sources.

The subsea accumulators 80 can supply pressurized control fluid for the subsea backup systems, e.g. autoshear/deadman, acoustic pod, ROV intervention, and SIL pod. These accumulators 80 can be supplied pressure from the surface, or can be recharged with an ROV.

The subsea hydraulic controls 70 can contain a deadman/autoshear system (not shown). The deadman/autoshear system is designed to shut in the well in the event that both pods lose all hydraulic supply and electrical communications from the surface. The function of the autoshear is to shut in the well if there is an unplanned separation of the LMRP from the Lower Stack. The deadman/autoshear can close the CSRs 40 and then the BSRs 38 after a delay. These systems are passive, can stay armed once they are armed, and can have read back showing their arm/disarmed state at a given time.

The autoshear system (not shown) is a safety feature that can automatically close one set of shear rams if hydraulic pressure communication between the pod and the receiver manifolds is interrupted when the system is in the armed state. Hydraulic pressure losses can occur, for example, during unplanned LMRP disconnects or pod stab retractions.

The autoshear system can be made up of two hydraulic circuits, including the pod-mounted autoshear circuit, and the stack-mounted autoshear circuit. The stack-mounted autoshear/deadman valve assembly can include a dual SPM valve, consisting of an arm/disarm valve and a trigger valve. The arm/disarm valve can be dual piloted, and have a pilot-operated check valve (POCV) on the arm circuit pilot line to help maintain the valve in the armed (OPEN) position. The valve can also have a so-called "stay put spool" that can make sure the valve stays in its last known position if the POCV were to fail. During normal operation, the trigger valve can be held closed with pilot pressure, and primarily uses springs to fail open upon loss of pilot pressure to close a shear ram in an autoshear/deadman event. This valve, however, has additional redundancy, and can also be designed to fail open in the event both valve springs are damaged. At the input port of each autoshear dual SPM valve, an orifice fitting can be installed to reduce water hammer effects on the system.

Embodiments of the present technology also allow the circuit to function as a "deadman" circuit. If hydraulic pressure and electrical communication is interrupted to both pods, the pod-mounted autoshear circuit can activate the stack-mounted autoshear valves. This can result in the closure of the BSRs if the autoshear/deadman is armed. In addition, according to some embodiments, the acoustic pod backup system can consist of several critical functions that can be controlled remotely using an acoustic package.

In some alternate embodiments, the subsea hydraulic controls 70 can allow for ROV intervention, such as to control critical functions, isolate defined potential leak points, and/or provide visual read backs (e.g., via gauges, position indicators, etc.).

The umbilical controls 72 can provide the ability to deploy dual cables (Blue & Yellow designation) in a synchronized control. In addition, the Umbilical controls 72 can include synchronization of a hydraulic "Hotline" reel. The synchronized controls can allow for automated deployment and retrieval of the umbilical.

The umbilical controls 72 can include controls for cable reels 90. In certain embodiments, each cable reel 90 and frame can be fabricated from carbon steel, and coated with a three-coat protective coating system. The cable reels 90 can be painted in accordance with the Blue and Yellow designations to provide a visual connection to the subsea pod for which they are attached. The cable reels 90 can also include heavy-duty pillow block bearings, an air motor and level wind drive system, a disc brake system, a slip-ring assembly and an interface junction box. Furthermore, the cable reels 90 can be equipped with drum mounted disc brake calipers that are controlled from a reel control console 92. A housing can be included to cover the brake shoes and the stainless steel brake rotor, in order to provide protection from the elements in the environment.

In addition to the above, in some embodiments, a removable level wind system can be included, and can be mounted to the front of the cable reel 90. It can be driven by the rotation of the cable reel 90. The level wind assembly can consist of a stainless steel drive shaft (Archimedes screw) supported by flanged bearings, a manually actuated override clutch for synchronization of the level wind with the cable position, and a traveling carriage. The traveling carriage can be equipped with resilient rollers that control the MUX cable 94 being spooled out from the cable reel 90 and support structure. The traveling carriage can also be self-reversing, and, once installed, can be synchronized with the point of exit/entry of the cable-to-reel drum.

Each reel 90 can be fitted with a heavy-duty slip-ring assembly that is manufactured to explosion proof standards. The slip rings can be red brass with two copper-graphite brushes per ring. Signal transfer through the slip rings can be via two contacts per slip ring, although operation and control can be maintained with only one contact working. The slip-ring housing can be manufactured from stainless steel, and can be flange mounted into the main cable reel 90 shaft. In addition, the cable reel 90 can be equipped with an increased safety junction box for slip ring-to-MUX cable termination. Furthermore, air controls can be housed in a stainless steel cabinet mounted on the cable reel 90 structure. This cabinet can contain air valves that drive the cable reel motor and the disc brake system.

According to some embodiments of the present technology, the test components 24 can use a UPS source. The UPS can be designed to provide power conditioning and a battery powered back-up supply in the event of main power supply failure (drill ship generators). The power distribution unit within the UPS cabinet can distribute power to the following entities: 1) the ASTS 94 CCU cabinet, 2) remote display panels, 3) the pod test junction box, and 4) the HPTU 96.

According to some embodiments of the present technology, the ASTS 94 provides the ability to test all functionality (both electronic & hydraulic) on an auxiliary BOP stack as it resides on the deck of the drill ship. The ASTS 94 can issue commands and monitor all BOP functions to test the spare stack before being deployed subsea. The ASTS 94 can track all usage of identified components (e.g., valves, rams, annulars) to provide the data required for monitor stack usage. The test operator can interface with the ASTS 94 through a multi-purpose HMI. The ASTS 94 can have the ability to test the BOP stack with one or both subsea pods installed.

The hydraulic power for the test can be supplied by the same HPU 78 that supplies the BOP stack 14 during drilling operations. The HPU 78 and associated fluid system can provide adequate barriers and flexibility between the two BOPs (i.e., the test BOP and the BOPs in the stack) to ensure that the primary system is compliant with all relevant regulations and specifications at all times.

In addition to testing the BPCS functionality, the ASTS 94 can also provide testing of the subsea SIS functionality and defined interface between the two subsystems. The logic solver to be used by the ASTS 94 can be at least SIL level 1 capable.

The HPTU 96 can be designed to provide test pressure for the BOP, C&K lines 48, 50, boost line, and rigid conduits 86. The HPTU 96 can be designed to provide high-pressure injection of glycol. The HPTU 96 can also include an HPTU skid, a computerized pump controller, a motor starter panel, a BOP/test storage area remote panel, and a rig floor panel. The system can be designed to be able to supply fluid in a controlled, safe, and properly isolated manner.

In some embodiments, a pod tester 98 can be used with a laptop portable computer that is furnished with the system. The software in the pod tester 98 can allow an operator to test and monitor any function, analog value point, or flow meter reading in the subsea pods of the BOP control system 10 while on a test stand. The software can also monitor analog reference points in the monitored subsea pod. Each regulator may also be operated by increase or decrease commands. The flow meter readings can be displayed, and may be reset with screen buttons on the pod tester 98 screen. In addition, a visual display screen can display the status of each solenoid, and can display the analog values for the analog reference points and flow meter readings. The software of the pod tester 98 can: 1) monitor analog transducers, 2) monitor flow meters, 3) operate regulators, and 4) exercise individual solenoids.

Figure 3A:
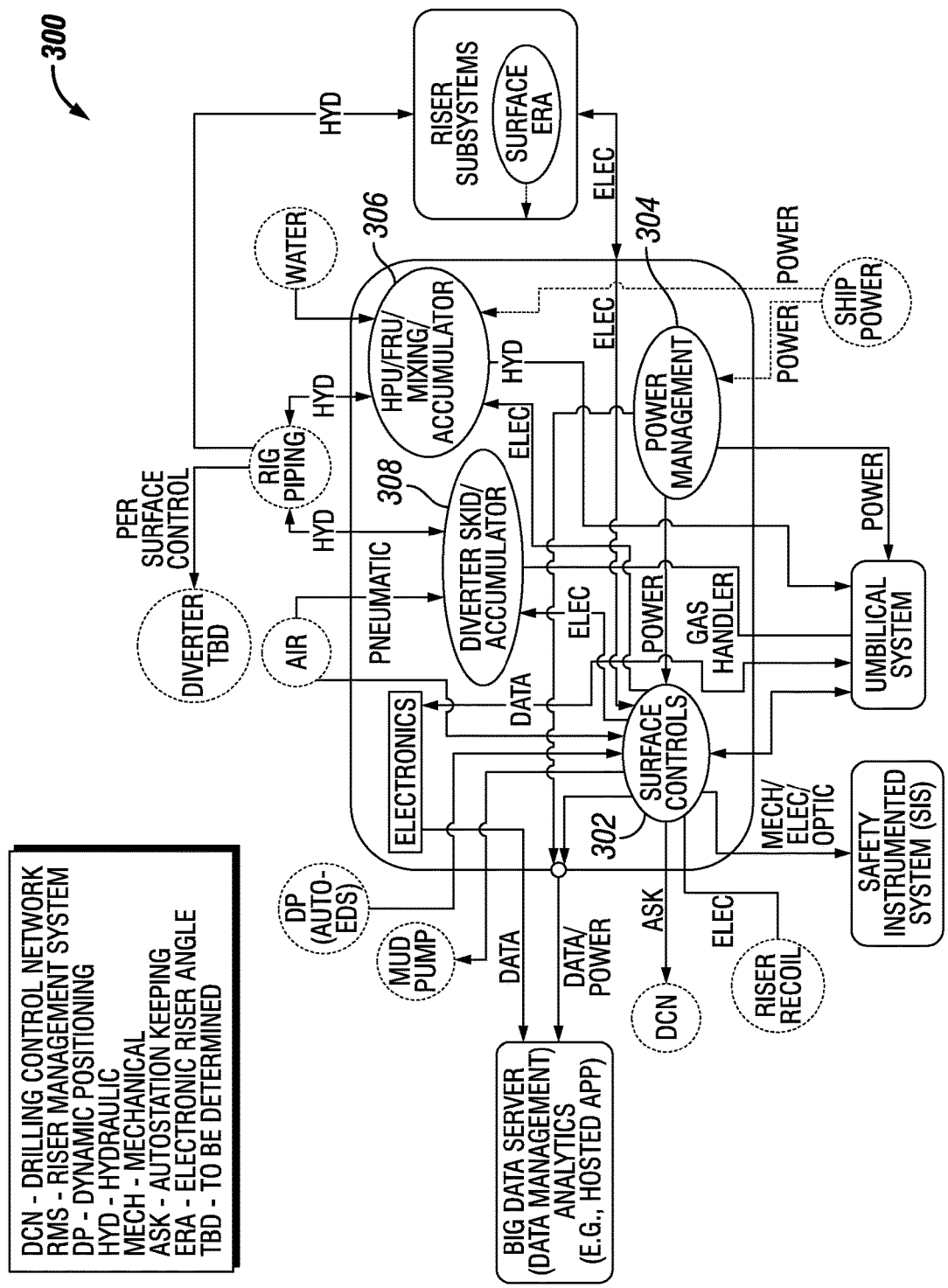
FIG. 3A shows a diagram of the power distribution system.
Figure 3B:
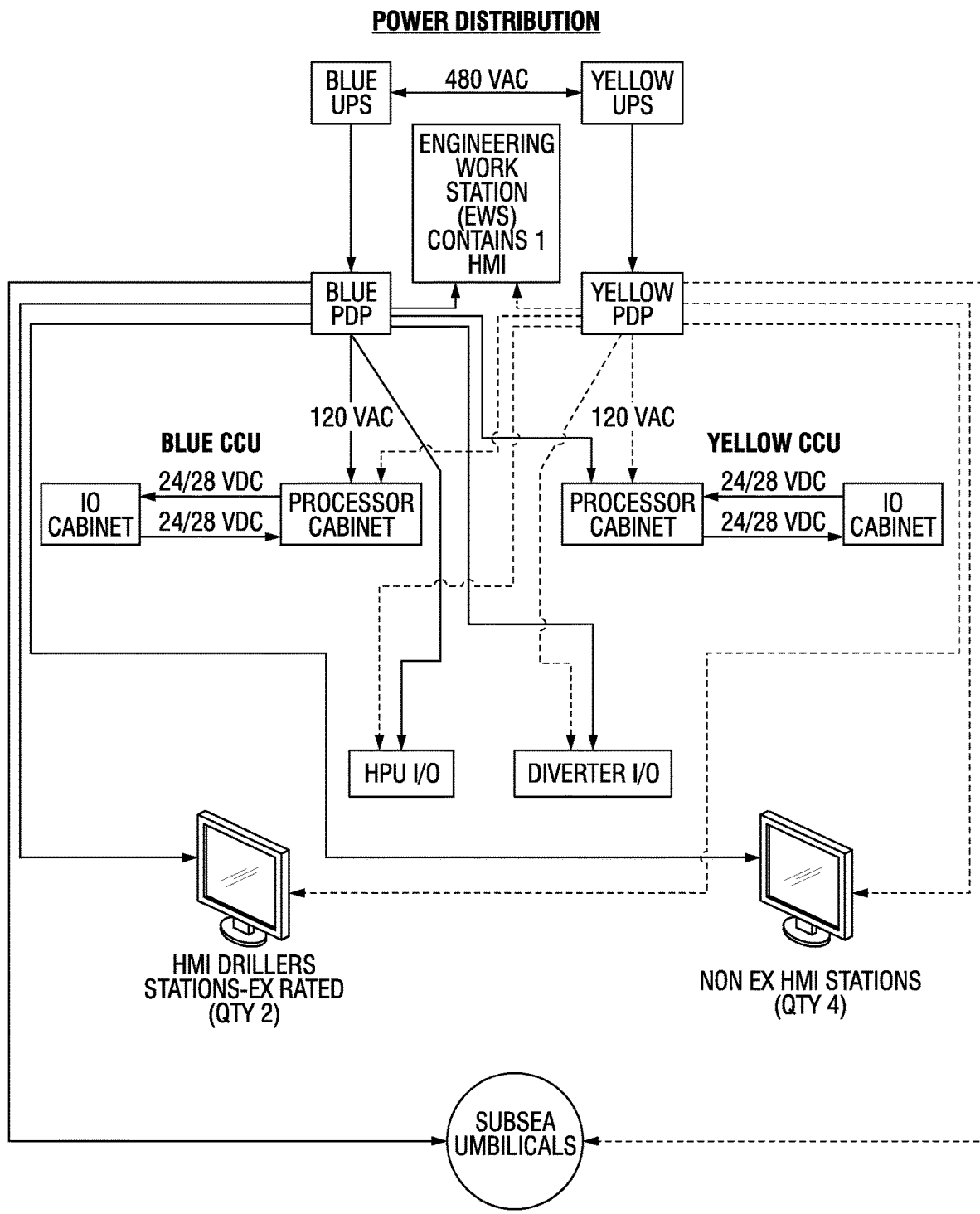
FIG. 3B shows a context diagram of the ship board subsystem according to an embodiment of the present technology.

Ship Board Subsystem—FIGS. 3A and 3B

Referring now to FIG. 3A, there is shown a context diagram of the ship board subsystem 300, including surface electronic controls 302, a power management subsystem 304, an HPU/FRU/Accumulator subsystem 306, and a diverter skid/accumulator subsystem 308. The details of each of these components is discussed in detail below.

The surface electronic controls 302 can include the following hardware:
 A Blue and Yellow designated CCU cabinet
 A Blue and Yellow designated IO cabinet
 Four HMI panel consoles with a dual processor and dual LCD touch screens
 One drillers console HMI with a dual processor and an LCD touch screen
 One HPU I/O interface panel
 One Diverter I/O interface panel
 One EWS
 A Safety Control Cabinet
 One cabinet to function as a server rack (for big data and servers)
 A GPS subsystem with a 2 antenna configuration (2 antenna configuration can provide a heading without movement)

In addition, Ethernet communications external to the cabinet can be carried out via fiber optic cable. Blue and Yellow power can be provided to the control cabinets, HMI panels, HPU interface panel and Diverter interface panel. In some embodiments, the cabinets can have up to 20% spare capacity, and 20% extra space for future extension. Furthermore, in certain embodiments, the HPU interface panel can provide an interface for flow meter data, motor control, pressure switch reading (such as for secondary motor control), FRU control, and isolation valve control.

The power management subsystem 304 is responsible for meeting the power needs of the BOP system. The power management subsystem 304 can accept power from the ship's generator power, convert the raw input into DC power, and then convert the DC power back into AC power per voltages required. The power management subsystem 304 can also provide uninterruptable power for a minimum of 2 hours. In addition, in some embodiments, the power management subsystem 304 can provide notification to the surface electronic controls 302 when the batteries are not being charged, and/or when the batteries are being discharged. An example of one possible configuration for the power distribution system, according to an embodiment of the invention, is shown in FIG. 3A.

Also depicted in FIG. 3A is the HPU/FRU/Accumulator subsystem 306. As indicated by its name, the HPU/FRU/Accumulator subsystem 306 includes an HPU, an FRU, and BOP surface accumulators, and a water filtration system, among other components. Each of these components is discussed in greater detail herein.

According to some embodiments of the invention, the HPU stores hydraulic fluid, and supplies hydraulic fluid to charge both the surface and subsea accumulators from a precharge pressure to a predetermined maximum system operating pressure. This stored fluid can be used to operate all hydraulic functions in the LMRP and Lower BOP stack.

The HPU can include an HPU interface panel that provides device control and data acquisition functions for the hydraulic power system. The HPU can produce alarms that can be communicated to the surface control system, for annunciation to the remote HMI panels and logging of alarms.

The main pumping unit of the HPU can be mounted on a heavy-duty oilfield-type skid. In some embodiments, the skid frame can be constructed of fully seam welded carbon steel coated with a paint system suitable for marine service applications. The skid can also include a stainless steel drip pan with a drain valve. The exposed skid deck can be equipped with fiberglass non-skid grating installed over a skid drip pan. Stainless steel components can be passivated and/or electropolished.

The pump skid unit can be equipped with a filtration system to provide fluid to, for example, the control manifolds, diverter system, and BOP stack. The unit can contain dual, two-inch, micron stainless steel filters with visual clogged filter indicators and internal bypass valves. Further, the filter manifolds can be equipped with differential gauges. The filter housings can use a manifold designed with shut-off isolation valves positioned upstream and downstream to allow isolation and service of an individual filter while maintaining operation of the rest of the system. In addition, bypass equalization valves can be included on all filters and manual isolation valves to equalize pressure before returning to full flow.

In some embodiments, the pumps of the HPU can be electrically driven. The HPU can include up to three electric motors with redundant power supplies (e.g. one can be supplied from the main switchboard and one from the emergency switchboard). Each motor can be coupled with plunger type pumps, and the electric motors can be 480 volt, 3-phase, sixty (60) Hz rated motors. Furthermore, each pump can be driven by multiple "V" belts, so that they require little or no oil bath, yet are able to maintain minimal noise and vibration levels.

The pumps of the HPU can be mounted for ease of service maintenance, and can include, but do not require, top loading, stainless steel suction strainers, relief valves, suction and discharge isolation valves, bleed valves, and appropriately sized pulsation dampeners. In addition, the LP inlet filter to each pump can have a basket type strainer with a removable mesh screen to support the required flow quality and flow rates for the particular drilling operation. In addition, in some embodiments, each pump can have an automatic reset relief valve on the output of the fluid end that is capable of a higher discharge rate than the pump.

The pumps used in the HPU can be independent and redundant in operation with an alarm interface package, and can include the following: low reservoir level alarms, low pressure alarms, automatic motor shut-off, and manual override to run pumps in emergency conditions.

With regard to motors that power the pumps in the HPU, some embodiments of the present technology contemplate an automatic motor starter supplied for each motor. In addition, the HPU can be equipped with a flow meter, such as, for example, an externally mounted stainless steel ultrasonic flow meter, to measure totalized flow in gallons. The subsystem and the flow meter can be designed to minimize the risk of flow meter turbine wash out (if applicable).

In some embodiments, the HPU can include surface system isolation valves operable to provide remote isolation of the following HPU functions: the surface accumulator, isolator blue rigid conduit, a hot line isolator, and a yellow rigid conduit isolator. In addition, panel mounted, dual scale (psi/bar) pressure gauges with snubbing devices can be provided for monitoring the supply pressure at function outputs. Furthermore, a manually operated diverter supply isolation valve with an inline check valve can be provided to supply hydraulic fluid to a diverter control unit. A manually operated test suite isolation valve can also be provided to supply hydraulic fluid to an ASTS/POD test area.

In some embodiments, the piping associated with the HPU can be of 316L stainless steel, socket-weld construction utilizing bolt o-ring flanges. In addition, tubing can be made of annealed, seamless, 316L stainless steel with double ferrule-type connections.

According to some embodiments of the invention, the FRU can consist of a glycol tank, a concentrate fluid tank, and a mixed control fluid tank. The tanks can be made of stainless steel, and can have suitable access hatches, breathers, drain plugs, and baffles installed, as well as a magnetic flag type sight glass. In some embodiments, the FRU can be assembled on a separate skid to be mounted next to the HPU. The reservoir tank can be designed so that it cannot be emptied while charging the system from pre charge pressure to MWP.

According to certain embodiments, the mixing system can be automatic, and can mix the fluid for the BOP control system. The system can mix at a rate sufficient to supply the combined discharge flow rate of the HPU pumps. In addition, an emergency drill water fill up line with a manual isolation valve can be provided that bypasses the rig water directly into the mix tank. If sufficient rig water supply is available, the line size can be large enough to supply the tank with all pumps running. Furthermore, in some embodiments, there can be be a supply line from the glycol tank to the HPTU that can double as a glycol injection pump for the choke manifold.

The FRU has four tanks as part of its fluid containment system, including 1) water, 2) glycol, 3) concentrate, and 4) mixed tank. All four tanks can be equipped with low level alarms which shut off the pumps feeding the mixed tank. In addition, the mixed tank can have a "mix empty" alarm that can shut off the HPU pumps. When the mixed tank fluid is again above the mix empty level, so that the alarm is de-energized, the HPU pumps can then automatically restart. This is advantageous because it can reduce the chance of damage due to pump cavitation. The alarms of the FRU can be visible in the driller's, CCU and "subsea workshop room" panels.

The FRU system can be mounted on a heavy-duty oilfield type skid. The skid frame can be constructed of welded carbon steel coated with a paint system suitable for marine service applications. The skid can also include a stainless steel drip pan with drain valves, and the exposed skid deck can equipped with fiberglass non-skid grating installed over the skid drip pan.

The BOP surface accumulators can have a working pressure of 5,000 psi, and can be rated to about 6,500 psi or more. The surface volume accumulator can be sufficient to allow for closing the annular BOPs, as well as closing pipe and shearing rams, and completing typical emergency disconnect operations such as retracting all stabs and unlatching the LMRP connector.

The accumulator bottles can be arranged on manifolds that allow for isolation of a bank of accumulators for maintenance. In addition, the main accumulator system can be designed such that the loss of an individual accumulator and/or bank cannot result in more than a 25% loss of the total accumulator system capacity. In some embodiments, there can be an extra single bank of accumulator bottles, which can be used for bank isolation, service repair, and backup for single bottle bank removal for recertification cycling.

In addition to the above, in some embodiments, each manifold can be complete with a liquid-filled pressure gauge panel with a block and bleed manifold valve, modified 4-bolt split-flange type ports for the accumulators, and a single relief valve. Furthermore, the accumulator bottles can be of a top loading design, which allows bladder removal and maintenance without removal from the unit. All bottles can be internally coated with a manufacturer-recommended anti-corrosion coating.

Certain embodiments of the HPU/FRU/Accumulator subsystem 306 include water filtration. The water filtration system of embodiments of the present technology can be modular (skid mounted), and can be tailored to operate with a vendor's fluid reservoir system. The water filtration system can provide a control that automatically shuts on and off per water level, and provides an alarm when the flow rate is reduced due to clogged filters or other obstructions.

The water filters of embodiments of the present technology can be capable of being mounted on a skid, can have a 5 horsepower, 460 volt motor, a stainless steel pump, and a filter controller. In addition, the level sensors for controlling the supply side pump can be calibrated so that the pump turns off before the float closes the valve. Alternately, a pressure sensor can be calibrated to turn off the pump in the event that the level sensor fails to turn off the supply side pump.

Yet another component of the HPU/FRU/Accumulator subsystem 306 can be a disinfection unit. In such a disinfection unit, an ultra-violet inline light system can be provided for installation in the water supply line upstream of the FRU unit. The disinfection unit can be designed to reduce organic matter that may be present in the water supply after passing through the water filtration skid.

Referring still to FIG. 3A, there is shown the diverter skid/accumulator subsystem 308. The diverter control system accumulator can be charged with BOP control fluid by the HPU from precharge pressure up to the system's operating pressure. The accumulator bottles working pressure can be about 5,000 psi, and can be rated up to about 6,500 psi or more. The surface volume can allow for closing annular BOP, as well as pipe and/or shearing rams, and completing typical emergency disconnect operations such as retracting all stabs and unlatching the LMRP connector.

According to some embodiments, the accumulator bottles can be arranged on manifolds that allow for isolation of a bank of accumulators for maintenance. Each manifold can be complete with a liquid filled pressure gauge panel with a block and bleed manifold valve, 4-bolt split-flange type ports for the accumulators, and a single relief valve. In addition, accumulator bottles can be of a top loading design, which allows bladder removal and maintenance without removal from the unit. All bottles can be internally coated with a manufacturer-recommended anti-corrosion coating.

For each of the skids identified herein, including skids for the HPU, FRU, accumulators, etc., the skid base can be complete with lifting eyes, and a stainless steel drip pan with drain port and a shut-off valve. In addition, the skid frame can be freestanding and constructed of welded carbon steel coated with a paint system suitable for marine service applications. Stainless steel components can be passivated and/or electropolished.

Figure 4:
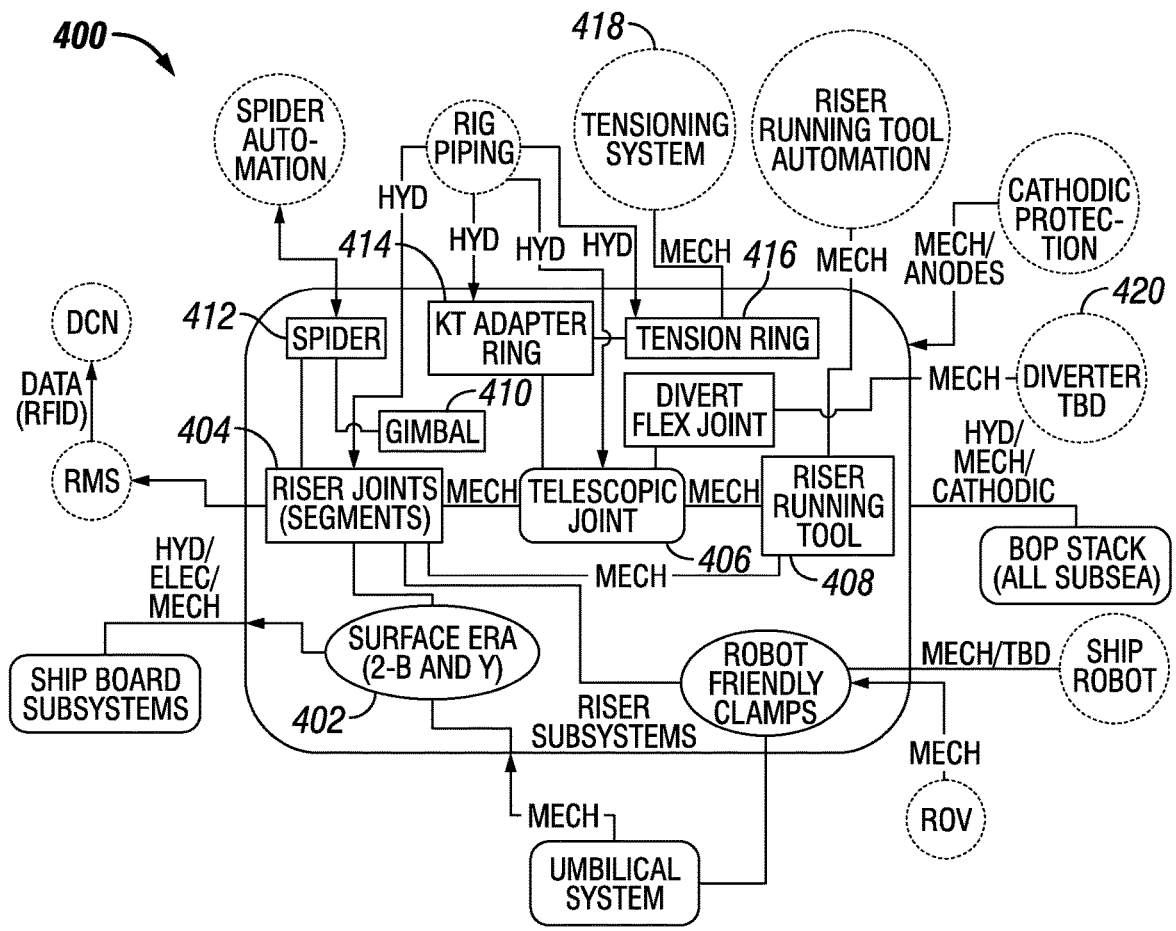
FIG. 4 shows a context diagram of the riser subsystem according to embodiment of the present technology.

Riser Subsystem—FIG. 4

Referring to FIG. 4, there is shown a context diagram depicting internal and external interface connections for the riser subsystem 400. According to an example embodiment, the present technology includes a mechanical/hydraulic interface between an RMS and the gimbal/spider that incorporates 1) hydraulic controls, 2) pressure gauges, 3) valve control, 4) regulator control, and 5) failsafe control/position for operating the Spider arm position with different drilling systems.

Technology related to that shown and described in FIG. 4 includes technology shown and described in U.S. Pat. Nos. 7,337,848; 7,331,395; 7,975,768; 7,963,336; 8,356,672; 7,913,767; 8,312,933; and 8,322,436, the full disclosures of which are each hereby incorporated herein by reference in their entireties.

As shown in FIG. 4, the riser subsystem includes a surface ERA instrument module 402, a gas handler system, riser joints 404, a telescopic joint 406, a riser running tool 408, a gimbal 410, a spider 412, an adapter ring 414, and a tension ring 416. Each of these components is described in detail below.

The ERA instrument module 402 provides an inclinometer to monitor the "X & Y" angles of the flex joint for vertical deviation. The assembly typically attaches to the bottom end (or near) of the riser above the flex joint, with a bracket that bolts on using existing mounting holes on the riser adapter. Whenever the upper portion of the riser deviates from the zero (vertical) reference as it extends from the drill ship/vessel, the inclinometer output changes accordingly. These outputs can be filtered and passed to the ship board control system for processing and display.

The gas handler system is a specialized annular closing device typically positioned below the telescopic joint 406. The gas handler system can add capabilities to the standard diverter system. When the gas handler system receives hydraulic fluid (via a gas handler reel), which acts on the system to close the internal annular packer, the system's gas vent line then opens. The opening of this gas line allows egress of trapped gas within the wellbore fluid away from the riser and over to the C&K manifold located on the rig, where it can be handled as if it were a "kick" being circulated normally from below a closed BOP. Collectively, both systems (the C&K system and the gas handler system) work together to safely divert gas "kicks" away from the drill floor of the rig.

The top of the gas handler system is oriented towards the female riser connector and has six lines. These lines are comprised of two C&K lines, two rigid conduit lines for blue and yellow conduits, one mud boost line, and one gas vent line (this line allows the rising gas to be deliver to the C&K manifold.

The bottom of the gas handler system can be oriented towards a male riser connector, and can have up to five lines. These lines can include two C&K lines, two rigid conduit lines for blue and yellow conduits, and one mud boost line.

One feature typically included in a gas handler system is the main body, which houses the piston and elastomers providing the gas handler with its sealing ability. As the piston rises, the internal annular packer closes and seals against any shape located inside the riser, or defines an open hole. The riser pipes are typically welded to flanges, which in turn are connected to the gas handler body by stud bolts or other appropriate fasteners. The auxiliary lines can be stabbed into the body. In some embodiments, hold down plates can be provided around each line to prevent unstabbing of the periphery lines under high internal pressure. The gas handler system can be rated to handle up to about 2,000 psi (137.9 bar) and about 4.5 million pounds tension.

The riser joints 404 can perform three primary functions, including 1) provide for fluid communication between the drilling vessel and the BOP stack and the well (this can be accomplished a) through the main bore during drilling operation, b) through the C&K lines when the BOP stack is used to control the well, or c) through the auxiliary lines such as hydraulic fluid supply and mud boost lines), 2) guide tools into the well, and 3) serve as a running and retrieving string for the BOP stack. The riser of the present technology can be rated up to about 4.5 million pounds of tension, and can consist of a pipe body with a pin coupling on the lower end and a box coupling on the upper end. Of course, the pin and box ends of the pipe body could be reversed. The couplings can have support plates, which provide support for the choke, kill, and auxiliary lines, and which provide a landing shoulder for supporting the weight of the riser string on the riser spider during installation or retrieval operations. Riser joints can be supplied in various lengths up to about 90 feet.

Auxiliary lines on the riser joints can be supported by clamping bands, which can be spaced out between the support plates, and fastened around the riser pipe. The lines can be terminated with male or female stab subs which are held in alignment by the coupling support plate.

In some embodiments of the present technology, the box coupling of each riser joint 404 can be equipped with dog segments that are driven into a grooved profile on the pin by the movement of a cam ring. This provides a large axial locking force to preload the connection. Cam ring movement is accomplished by the riser spider, discussed in greater detail below. The pin coupling can incorporate an alignment key that mates with a slot in the inside diameter of the box coupling and that can provide about 5 degrees of rotational alignment for stabbing the couplings together. The riser can be fitted with foam buoyancy modules for deep water operations.

According to some embodiments, some features of the riser are as follows:

The cam ring can be driven to lock or unlock the connection by the riser spider, so that no subsea hydraulics are needed.

High preload connection is developed by the locking dogs.

Cam ring detent pins can hold the cam ring in the running position until the spider engages it. Additionally, the pins can hold the cam ring in a maintenance position, thereby giving full access to the dogs for inspection or replacement. The spider does not move the cam ring to the maintenance position; this is typically done with a separate tool or manually.

Dog segments can be fully retained to the box coupling, and can include a spring retraction to assist in disconnecting the riser couplings.

Secondary latch can provide back up to the self-locking taper of the cam ring.

Alignment of the coupling and lines can be accomplished by a key on the pin and slot in the box before engagement of the line stabs.

The running tool profile can be incorporated into the box coupling.

The riser can be fitted with foam buoyancy modules.

The Telescopic Joint 406 is designed to compensate for vertical movement and offset of the drilling vessel. It can also serve as a connection point for the marine riser tensioners (part of the tensioning system 418), and a crossover leading to the diverter system 420. In some embodiments, the telescopic joint can consist of five major subassemblies, including: 1) the crossover with hydraulic latch, 2) the inner barrel, 3) the dual packer housing, 4) the outer barrel, and 5) the fluid assist bearing. Each of these subassemblies is discussed in greater detail below.

The crossover assembly can have a standard riser coupling and a hydraulically actuated latch ring. The riser coupling can connect the riser string to the diverter system, and the hydraulic latch ring can lock the inner barrel to the outer barrel for handling, storage, and hangoff. The hydraulic latch ring can consist of six hydraulic cylinders and support dogs plumbed together, that when latched, can support the full tensile rating of the telescopic joint 406. The crossover can be equipped with a tapered locking nut and special keys to secure and prevent rotation of the mating inner barrel. In some embodiments, the locking nut can have left hand threads, and can be split to facilitate disassembly from the inner barrel. The inner barrel can have a centralizing shoe with fluid relief ports at the lower end, to allow communication between the wellbore and the inner/outer barrel annulus.

According to some embodiments, the dual packer housing can contain two pressure activated seal elements. Pressure can be applied to each packer through ports. An upper seal element can be split, and is generally activated with rig air. Such upper seal can provide primary leakage control during normal drilling operations. A lower seal element can be activated by hydraulic pressure, and provides backup and/or emergency leakage control. The lower seal element can be solid, and replacement typically requires the disassembly of the crossover assembly. A top flange can mate with the hydraulic latch dogs when the joint is fully collapsed. In addition, the top flange can also be equipped with lubrication ports that allow a fluid lubricant to be introduced, which can extend the life of the seal elements.

The outer barrel subassembly can have a primary function of providing a means to apply tension to the marine riser string suspended there below. According to some embodiments, an upper portion of the outer barrel can have a thick-walled section where the fluid assist bearing is attached. At the very top of the outer barrel can be a flange for attachment of the dual packer housing assembly. The lower end of the outer barrel can have a thick-wall section to prevent collapse should the outer barrel contact the hull of the vessel.

The fluid assist bearing can contain an annular chamber, which can be pressurized when making vessel heading changes. This reduces the torsional loads induced into the riser and wellhead from vessel rotation. The rotatable outer housing and fixed stationary piston can be sealed using redundant high performance swivel seals.

The hydraulic riser running tool 408 can be a hydraulic tool that is pressure activated with a standard tool joint box/elevator profile up, and a set of locking dogs down. The locking dogs can mate with a profile inside the riser box coupling. The tool can have a fail-safe rising stem design that is activated by a hydraulic cylinder to latch or unlatch the tool. The tool can also be equipped with a swiveling lifting padeye near the center of gravity, with lift point options and a mechanical lock to keep the tool locked in position if latch pressure is lost during use.

In some embodiments, the gimbal 410, which can be associated with a shock absorber unit, can provide up to about six degrees of gimbal action at mid-stroke, by transferring hydraulic fluid from cylinder to cylinder in a closed system. This allows a load suspended from the riser spider to remain stable and independent of pitch and roll of the drilling vessel within the design limits of the system. The gimbal 410 and shock absorber unit greatly reduces the shock loading on the marine riser system when landing the riser in the spider, by gradually reducing landing velocity and dissipating the energy into the hydraulic system accumulators.

The spider 412 can be designed to handle the marine riser joints 404 and/or telescopic joint 406 when running or retrieving components of the marine riser subsystem 400. The spider 412 sits on top of the gimbal 410 and shock absorber unit, and, for safety and other reasons, can be designed to minimize the intervention of rig floor personnel. In many embodiments, the spider 412 provides three primary functions, including: 1) hang off of the riser string during running or retrieving, 2) automated make up and preload of the riser coupling connection, and 3) to provide a hang off position for change out of the slip joint upper packer.

In some embodiments, the spider 412 consists of two sections, including a lower and an upper section. The lower section typically performs the hang off function by extending six dogs into the bore and hydraulically locking them in place. The upper section can utilize six actuation arms to engage the riser cam ring, and lock or unlock the couplings between riser sections. According to some embodiments of the present technology, the spider 412 can include one or more of the following features:

Minimal intervention required by rig personnel. Functions are operated by the control panel.
Six hang off dogs for supporting the riser during running or retrieving.
Hang off dog hydraulic locks to prevent inadvertent retraction of the hang off dogs.
Position indicators of hang off dog position via the hydraulic locks and indicator bands on the hang off dogs.
The lower section can be split into two halves in case of an emergency via clamping plates.
Work platform with grating and safety rails/doors integrated into the assembly.
Six cam actuation arms for automated make up and preload of the riser coupling. The system can be redundant, and can operate with a minimum of three arms with an adjustment in the actuation pressure.
Individual arm covers can prevent pinch points, but may be pivoted upward or removed in order to perform maintenance on the arm assembly.
Control manifold blocks located at the rear of each cam actuation arm can provide fluid paths, synchronization, and the ability to remove a single arm from service via a removable cover/looping plate.

In addition, the spider 412 can be associated with a control system, including:
A control panel utilizing rig hydraulics for functioning of the spider via joysticks.
A stab plate for makeup of the control system to the spider.
A skid for panel movement and storage.
Hose bundle assemblies.

According to some embodiments of the technology, the adapter ring 414 can interface with the telescopic joint 406 to provide a means to apply tension to the deployed marine riser string, while easily connecting and disconnecting certain marine riser hydraulic functions (e.g., C&K lines, the mud booster line, and/or BOP hydraulic control lines). This can be accomplished with pressure actuated pin stabs for each hydraulic function between the adapter ring 414 and the telescopic joint 406 adapter. In some embodiments, the adapter ring 414 allows the rig tensioner lines to remain connected and properly spaced out during riser deployment and retrieval. In addition, the adapter ring 414 can reduce or eliminate the time associated with attaching and removing the standard telescopic joint auxiliary line goosenecks. Some embodiments include a fluid assist bearing (FAB) in the adapter ring 414 allows the rig to rotate relative to the wellhead without imposing excessive torque on the riser string. The adapter ring 414 ca be designed to attach to the diverter support housing using stow dogs when not in use.

Figure 5:
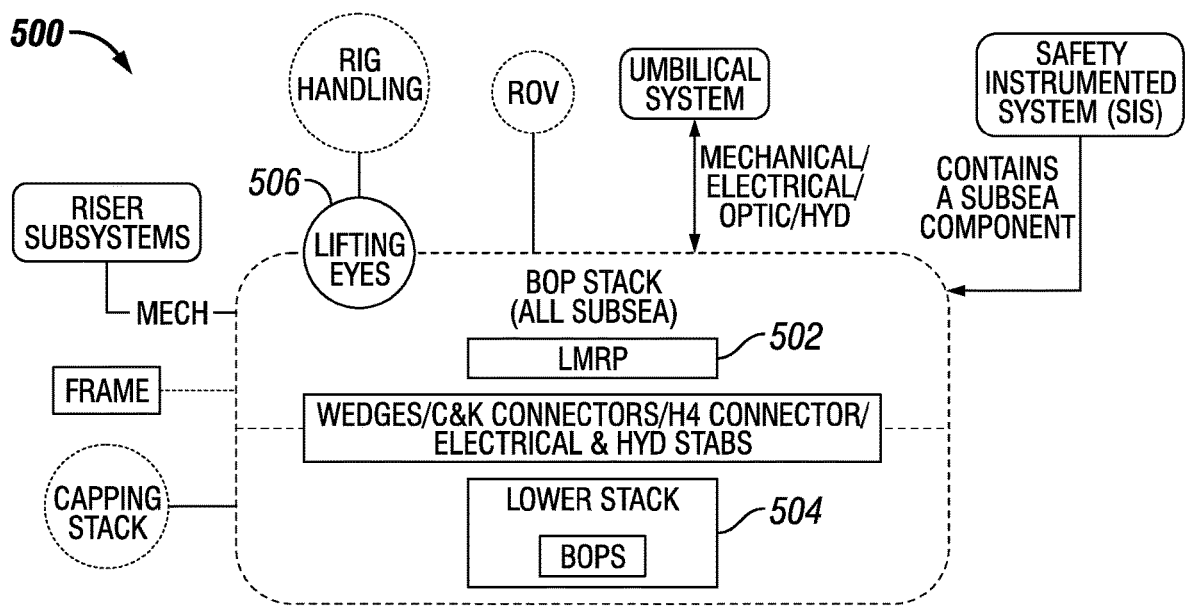
FIG. 5 shows a context diagram of the BOP stack according to embodiment of the present technology.

BOP Stack Subsystem—FIG. 5

FIG. 5 is a contextual diagram depicting the BOP stack subsystem 500, including the LMRP 502 and the lower stack 504. The LMRP 502 can be releasably connected to the lower stack 504 by a hydraulic connector. Also located at the interface between the LMRP 502 and lower stack 504 are components such as wedges, C&K connectors, and electric and hydraulic stabs. These components allow disconnection and then subsequent reconnection components such as the cables, C&K lines, and electric and hydraulic lines for circumstances where the LMRP 502 is released and removed from the lower stack 504 and then reattached. Such a scenario may occur, for example, where a hurricane or other conditions necessitate temporary removal of the LMRP 502 from the lower stack 504 to prevent damage to the system.

According to some embodiments, the BOP stack subsystem can include a frame having lifting eyes 506. The frame can also have two-point lifting capability, which allows the frame have the ability to be split into two parts. In some embodiments, the entire stack can be retrievable from either a horizontal or vertical position, and the frame can have a wellhead connector position indicator to provide easy viewing of the connector operations.

In some embodiments, the BOP stack subsystem has a three-piece frame design, including a one-piece LMRP and a two-piece lower stack including upper and lower portions. Various BOPs are attachable to individual rather than multiple levels of the frame, allowing the stack to be split without removing all the BOPs. Additionally, hydraulic manifolds are provided at each level of the frame; this allows sections of piping to be readily attached to the manifolds when the frame is assembled, simplifying installation and maintenance operations. The three-piece design also facilitates transportation of the BOP stack subsystem components from the site of manufacture to the drill ship or platform.

In some embodiments, the BOP stack subsystem is configurable as a 6, 7, or 8 cavity stack. If desired by the user, the configuration can be modified in the field after initial deployment. The BOP stack design includes modular components which allow double BOPs to be exchanged with single BOPs and vice versa, depending on the needs of the user. Configurability of the stack enables a user to add or subtract BOP cavities based upon the needs of each wellsite, such as for reasons related to weight, the specific subsea wellhead being used (e.g., 15 ksi or 20 ksi), etc. Because the stack is modular and includes strategically placed connections, in order to replace a damaged or worn BOP, a user can swap a portion of the stack, rather than pulling apart the entire stack, thus reducing down time.

LMRP—FIG. 6

Figure 6:
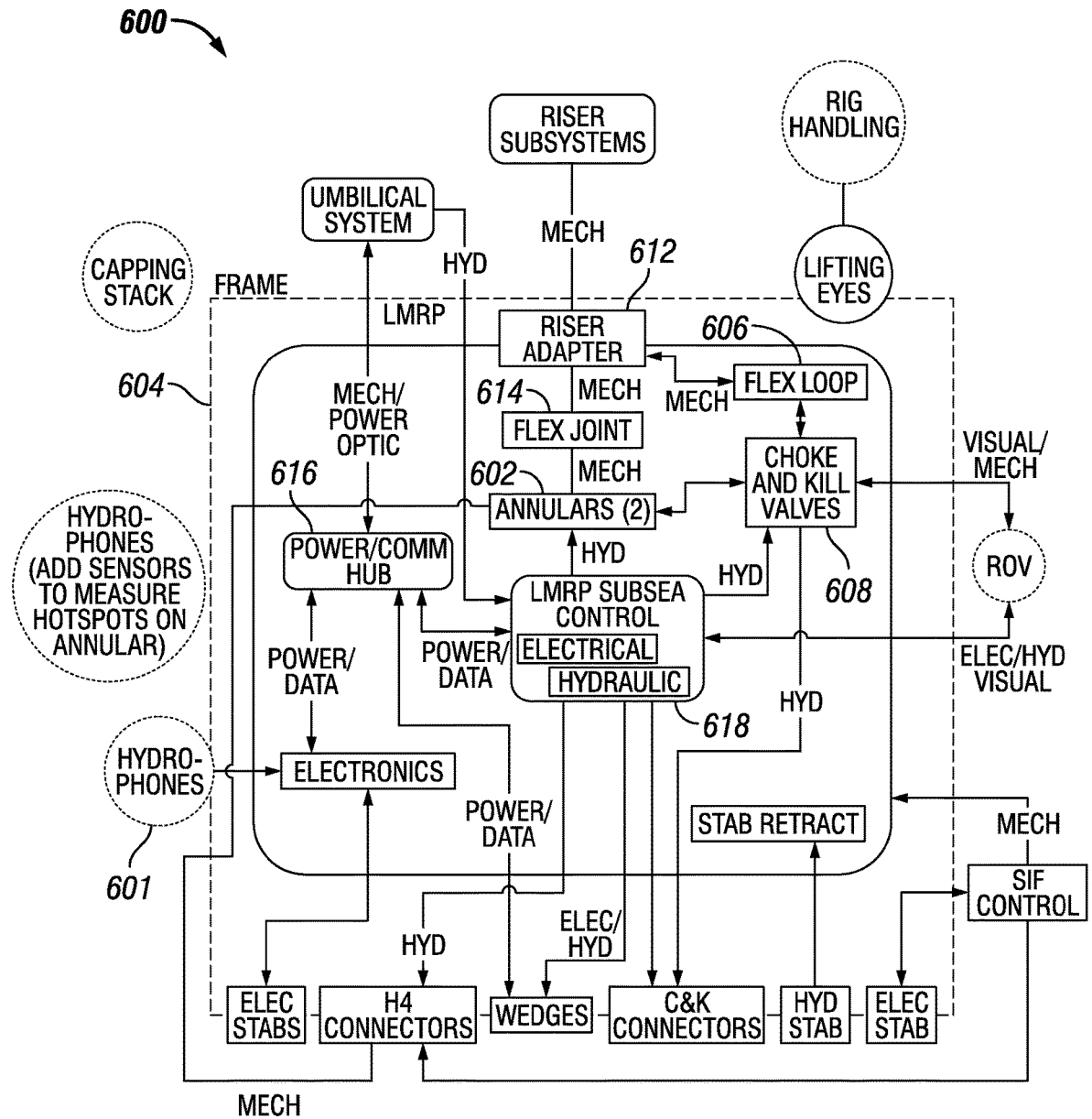
FIG. 6 is a context diagram of the Lower Marine Riser Package (LMRP) of the BOP stack of FIG. 5.

Referring now to FIG. 6, there is shown a context diagram depicting the LMRP 600, including an LMRP frame 604 designed to carry all components of the LMRP 600. In some embodiments, the frame can be a fabricated steel frame painted with a three part epoxy subsea coating. In addition, the frame can include yoke type hangoff beam supports, and one ladder can be included to provide access to the top of the pedestal. In some cases, the pedestal can include padeyes, which can interface with crane lifting blocks. The frame 604 of the LMRP 600 can be designed to support the mounting of acoustic sensors 601 for monitoring the annulars.

According to some embodiments of the technology, the LMRP 600 can include many components, including, for example, an ROV intervention panel, and a C&K subsystem having a C&K flex loop 606, C&K valves 608, a gas bleed valve, and C&K stab connectors. In addition, the LMRP 600 can include an LMRP connector, a riser adapter 612, the annulars 602, a flex joint 614, LMRP HPHT probes, and a power and communication hub 616. The LMRP 600 can further include an LMRP subsea control module 618. Each of these features is discussed in greater detail below.

The ROV intervention panel is designed to allow an ROV to perform multiple functions on the LMRP. Typically, such functions are carried out by an ROV as a backup, if the surface controls are not functioning properly. Through the ROV intervention panel, the ROV can carry out some or all of at least the following functions:
  LMRP connector primary unlock
  LMRP connector secondary unlock
  LMRP connector Glycol Flush
  All stabs retract
  LMRP gasket retract
  Inner and outer bleed valves open
  Riser connector primary and secondary unlock
  Rigid conduit flush isolation valve
  Solenoid pilot dump
  LMRP connector POCV by-pass The ROC intervention panel can be constructed of stainless steel with ROV grab bars, and ROV stabs.

In some embodiments, the C&K subsystem can consist of two independent hydraulic circuits, each substantially similar or identical in construction. If identical in construction, either circuit can function as the "Choke" or "Kill" operation for pumping mud to the well bore or exhausting gas to relieve the pressure in the well bore.

The C&K subsystem can consist of a rigid loop of conduit mounted on the LMRP 600. Valves can be used to isolate the rigid conduit upstream of the LMRP/Lower stack interface (Stab Connector). The C&K hydraulic circuitry can continue on the lower stack, where valves are used to isolate the interfaces to the individual BOPs.

In certain embodiments, the flex loop 606 can be manufactured from pipe having a 5 inch outer diameter and a 3 1/16 inch inner diameter. Such pipe can be rated to about 20,000 psi or more. In addition, the C&K valves can be designed to be failsafe open, and hydraulically operated via subsea control. Some embodiments of the valve have the following specifications: minimum 3 1/16 inch with about a 20,000 psi pressure rating, and a flanged end connection with Inconel 625 lined ring grooves. The valves can be hard pipe, as opposed to flexible hose style, and can be designed and supported to allow full lower flex joint rotation at MWP.

Some embodiments of the technology also include a single gate gas bleed valve to provide gas relief. This valve can also be operated by the subsea control subsystem, and can have the following specifications: dual block, hydraulic operated, gas relief, minimum 3 1/16 inch with about a 20,000 psi pressure rating; a blind pocket target flange included on the end outlet; and ring grooves that are 625 Inconel inlayed.

The C&K stab connector can be hydraulically extendable to the choke or kill line connection between the LMRP 600 and the lower stack. All of the hydraulic mechanisms and the seals can be contained in the female stab connection mounted on the LMRP 600. In some embodiments, the female connector is in the retracted position when the LMRP is landed and mated to the lower stack. According to some embodiments, when the female connector is retracted, there can be a minimum of two inches clearance between the bottom end of the female connector and the top of the male stab.

The male stab connection can be mounted near the top of the lower stack frame to align with female stab connection on the LMRP 600. After landing and locking the LMRP 600 to the lower stack, the connection of the female stab to the male stab can be made by applying hydraulic pressure to the "extend port" on the female stab connection. With the male/female stab connections engaged, hydraulic pressure is not required to maintain the connection. A difference in bore seal diameters provides a bore pressure generated force to maintain the connection.

To disconnect the LMRP 600 from the lower stack, the C&K connector can be first retracted by applying hydraulic pressure to the "Retract Port" on the female stab connection before disconnecting the LMRP connector. However, should the retract function fail to operate before the disconnecting the LMRP 600, the C&K Connector does not prevent the disconnection of the LMRP 600 from the lower stack. In some embodiments, the female stab connection can have a snap ring "detent" to help maintain the female stab in the "Extended" or "Retracted" position when hydraulic pressure or bore pressure is not present.

For some embodiments of the present technology, specifications for the stab connections can be as follows:
  Connector bore size: about 3 1/16-inch (78 mm)
  Rated working pressure: about 20,000 psi (103.4 MPa)
  Top Connection: about 3 1/16 inch—about 20,000 psi pressure rated flange with Inconel 625 ring groove
  Bottom Connection: about 3 1/16 inch—about 20,000 psi pressure rated flange with Inconel 625 ring groove
  Hydrostatic shell test pressure: about 30,000 psi (155.2 MPa)
  Hydraulic ports: 1/2-inch diameter
  Hydraulic working pressure: about 3000 psi (20.7 MPa)
  Normal operating pressure: about 850A0 psi (10.3 MPa)
  Hydraulic hydrostatic test pressure: about 4,500 psi (31 MPa)
  Volume to extend/retract: about 0.52 gal (2 liter)
  Test port connection: about 9/16 inch autoclave According to some embodiments of the present technology, the LMRP connector can have the following specifications:

Top connection: about 18¾ inches, Inconlnel 625 overlay ring groove with a studded top.
Added stack height is about 16 inches
Overall height with low profile heads is about 44 inches
The lower body lead in profile can facilitate up to about 10 degrees offset angle at the BOP mandrel interface.
The assembly can configured with a 30 inch dog kit.

The connector can also have a test port which can allow external pressure testing of the VX/VT seal, and the VX/VT seal profile and cylinder bores can be overlaid with alloy 625 material.

The riser adapter 612 can consists of a main body with upper and lower connections to form a crossover between the marine riser and the LMRP 600. The body can support a set of kick-out subs which connect the auxiliary lines on the marine riser to the auxiliary lines/hoses on the LMRP 600. Provisions for the riser instrumentation, such as the inclinometer and slope indicator, and a main bore wear bushing, may be included. The entry manifold on the booster line with a gate valve for testing provides the capability to inject fluids into the riser bore through the riser adapter 612.

In some embodiments, the riser adapter can include a series of hydraulic cylinders that move a cam ring in order to lock or unlock the connection with a series of dog segments. Manual secondary locks can provide backup to the primary lock, and can be rated to the full unlock load of the hydraulic cylinders at 3000 psi. In addition, the hydraulic circuit can incorporate two depth compensation cylinders to prevent a pressure differential from occurring within the circuit. Two ball valves can also be included for rapid venting of the circuit if required, but remain closed otherwise. Additional control or ROV panels may be included if desired.

The riser adapter 612 can be the termination point for: a mud booster inlet assembly with an upper "box" stab which incorporates a hydraulic isolation gate value; the gate valve can have a "fail closed" operation, can connect to the riser adapter body through a 90 degree elbow, and the 90 degree elbow can mount to the riser adapter body, utilizing a flange mount for the isolation valve. In addition, the riser adapter 612 can be a termination point for 20 k C&K kickouts with about a 3 1/16 inch Inconel 625 Inconel lined ring groove flanges, and 5 k Hydraulic kickouts with about 2 9/16 inch ring grooves.

The annulars 602 can be a dual annular, hydraulically operated annular type BOP. In some embodiments, the annular BOP body can contain two sets of 1½" open and close ports, each equipped with a 4-bolt flange and seal subs to connect the hydraulic lines. In addition, the annular BOP body can also include lift eyes equipped with shackles, each with a safe working load (SWL) rating of 55 tons per shackle minimum, for lifting the annular BOP.

Some embodiments of the present technology include one or more LMRP HPHT probes. The system can use the LMRP HPHT probes to monitor well bore pressure and temperature. The probes can have an operating range of about 0-25,000 psia pressure, −10 to 199 degree C. (14-390 F) temperature. The HPHT probes can have pressure & temperature accuracy of up to about 0.2% over the full scale. In addition, the probes can have an external hydrostatic pressure rating of about 12,500 ft. (3,810 M) of water depth, and can be connected to the power communications hub on the LMRP 600. In some embodiments, the LMRP HPHT probes can be mounted in the choke line.

In some embodiments, the power and communications hub 616 can encapsulate the functionality of the power distribution and Ethernet based communication. One advantage of this design is that it helps to prevent the need for any redesign of the BOP control electronics pod in the event that the power and/or communications needs to be redesign due to unanticipated demand.

Embodiments of the LMRP subsea control module 618 can control up to about 130 hydraulically related functions or more. In addition, the electrical design of the LMRP subsea control module 618 can implement a field bus based I/O to allow expansion. The electrical hardware envelop can be designed to allow expansion of I/O without modification to the housing.

The hydraulic pod section of the LMRP subsea control module 618 can be constructed of corrosion resistant stainless steels. Furthermore, dynamic components can be constructed of corrosion resistant anti-galling stainless steels. In addition, the pod internal subassemblies can be arranged to provide full access to ensure maintenance and service efficiency. Furthermore, a manifold can provide the hydraulic connection with the pod male stab and the upper and lower receptacles through high-pressure packer seals and retainers. High pressure fluid can be delivered via the SPM valve transfer spool to the interface manifold. In turn, the fluid can be distributed to the particular outlet port via the upper receivers or transferred to the lower receivers via porting in the male stab.

In some embodiments, the pod male stab can be equipped with an extend/retract stainless steel hydraulic cylinder and guide rods. A safety pin can be included that can secure the pod male stab in the upper position during installation, removal, or handling of the POD off the stack.

In operation, the pod can receive hydraulic fluid from the rigid conduit manifold or the hotline. Hydraulic supply to the rigid conduit manifold in turn can come from the rigid conduit(s) and the stack accumulator system. The lower valve unit manifolds can be mounted in a horizontal tiered array providing easy access to mounted components for service or maintenance.

In some embodiments, the hydraulic pod section of the LMRP subsea control module 618 can include up to five regulated hydraulic control circuits or more, which can be mounted in each control pod. These regulators can be manufactured from anti-galling and corrosion resistant stainless steel and can be hydraulically piloted. The five regulator functions are: 1) stack connector pressure regulator, 2) upper annular pressure regulator, 3) lower annular pressure regulator, 4) subsea manifold pressure regulator, and 5) ram manifold pressure regulator.

In addition, in some embodiments, modular stainless steel manifolds for regulated and unregulated functions can be provided. The valves can be hydraulically connected with formed and welded 316L stainless steel pipe spools, with modified split flange hubs containing radial o-ring seals. In addition, the SPM valves can interface to the male stabs via 316L stainless steel pipe spools containing modified hubs with seal sub profiles. In some embodiments, the hubs can have double radial o-ring seals and 4-bolt forged stainless steel split flanges.

Also included in the LMRP subsea control module is an LMRP disconnect indicator. In some embodiments of the present technology, the LMRP disconnect indicator can consist of an LMRP disconnect actuator, and an arm operated shear seal valve. Both can be mounted to the lower valve unit of the MUX Pod. When the LMRP 600 is in place on the BOP stack, a spring-loaded pin is in contact with the BOP plate. Upon separation of the LMRP 600, the spring-loaded pin extends, causing a hydraulic signal to be transmitted to a pressure transducer and a pressure switch in the MUX Pod. The MUX Pod electronics can then relay the information to the control system that there has been an LMRP disconnect. The pressure switch can then provide an immediate signal to activate a riser recoil system via a dedicated twisted-pair circuit in the MUX cables. In some embodiments, the valve and actuation pin can be constructed of anti-galling, corrosion resistant stainless steel.

In addition, in some embodiments, the BOP stack vertical orientation "X & Y" angles can be monitored via instrument modules integral to both the Blue and Yellow MUX control pods. The instrumentation, as well as all interface wiring, can be located internal to the pod SEMs.

Figure 7A:
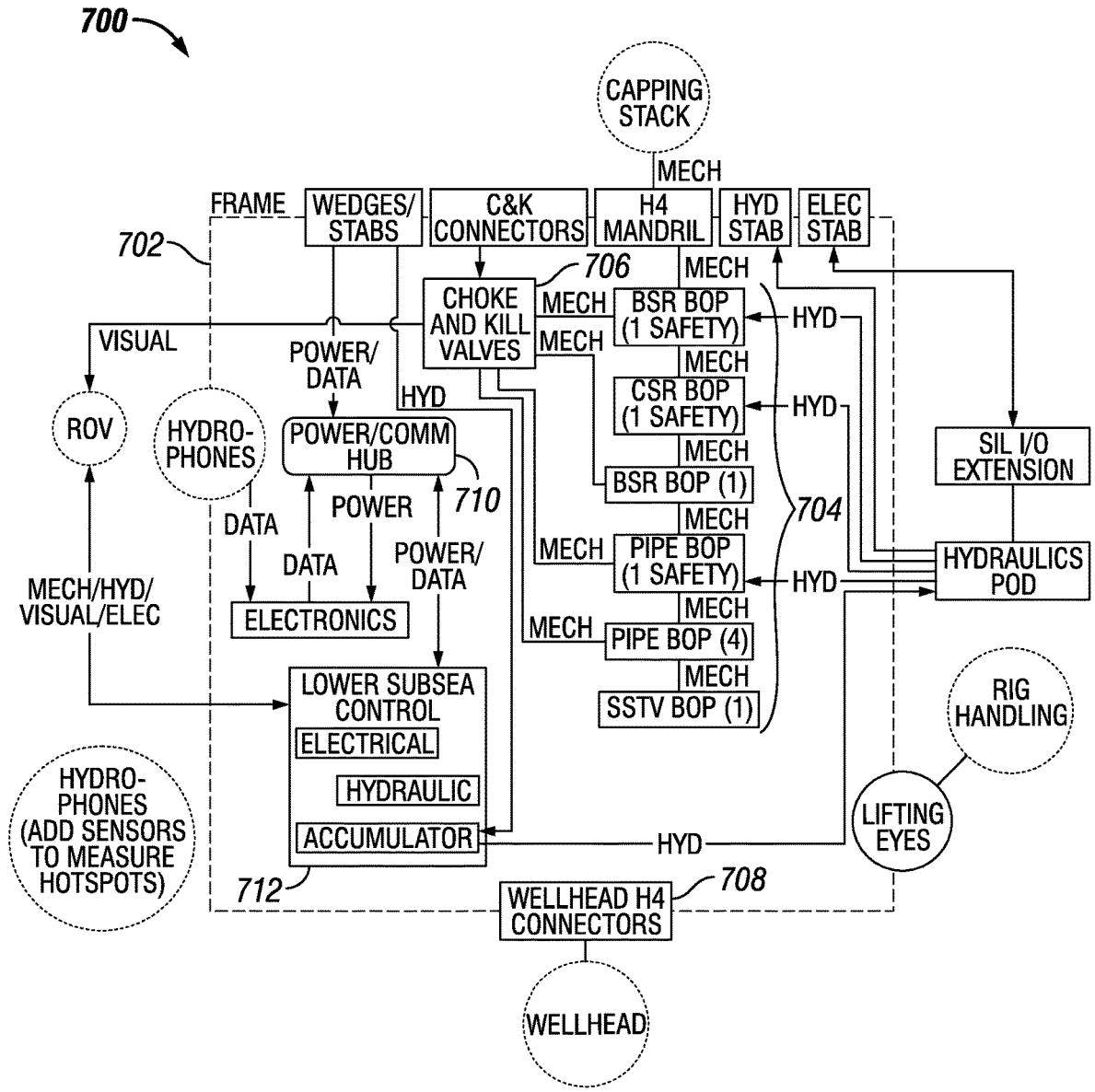
FIG. 7A is a context diagram of the lower stack of the BOP stack of FIG. 5.
Figure 7B:
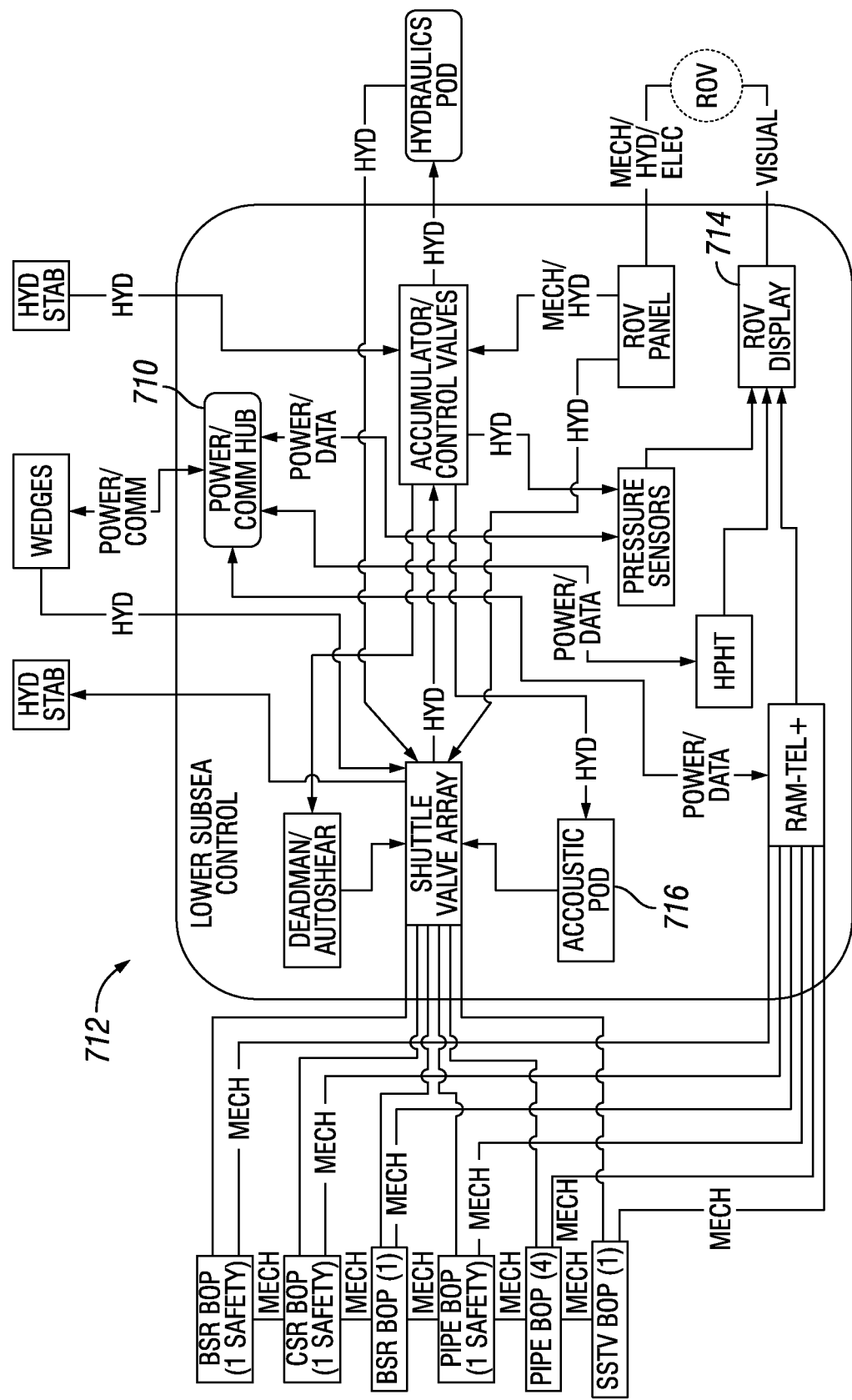
FIG. 7B is a context diagram of the lower subsea control module of the lower stack of FIG. 7A.

Lower Stack—FIGS. 7A, 7B

FIG. 7A is a context diagram of the lower stack 700 of the BOP system of the present technology, including a lower stack frame 702, an ROV intervention panel, BOP rams 704, C&K valves 706, and a wellhead connector 708, and lower stack HPHT probes, a power and communications hub 710, and a lower subsea control module 712. In addition, the lower stack 700 can include a guide funnel, to help provide deep water guidelineless drilling.

The lower stack frame 702 can be designed to carry all components of the lower stack. In some embodiments, the lower stack frame 702 can be composed of fabricated steel, painted with a three part epoxy subsea coating. In addition, it can be manufactured with yoke type hang-off beam supports, and can include retractable padeyes that interface with crane lifting blocks. In some embodiments, the lower stack frame 702 can be designed to support the mounting of acoustic sensors for monitoring the ram BOPs and C&K valves 706.

The ROV intervention panel is designed to allows an ROV to perform the following functions via an access panel mounted to the lower Stack frame 702:

HP upper BSR close
HP CSR close
HP lower BSR close
Middle upper pipe ram close
Middle lower pipe ram close
Lower choke failsafe open
Middle choke failsafe open
Upper choke failsafe open
Lower kill failsafe open
Middle kill failsafe open
Upper kill failsafe open
Wellhead connector primary unlock
Wellhead connector second unlock
Wellhead connector glycol flush
Wellhead connector gasket retract
Autoshear arm In addition, manual ROV isolation valves can be supplied in the ROV intervention panel for the following:

ROV by-pass for wellhead connector
ROV dump subsea accumulator dump
Failsafe accumulators dump isolation valve
Subsea accumulators dump isolation valve
Each individual subsea accumulator bottle
Acoustic supply from subsea accumulator bottles
Auto shear/deadman supply from subsea accumulator bottles In some embodiments, the ROV can have the ability to access and use fluid from the subsea accumulators and/or the 3,000 psi functions on the LMRP or lower stack. Furthermore, the ROV can have the ability to recharge the subsea accumulators.

The lower stack HPHT probes can use a 2-wire device interface to the power and communications hub 710 on the lower stack 700. In some embodiments, one lower stack HPHT probe can be mounted to an unused port on a ram BOP. A second lower stack HPHT probe can be mounted to an unused port on an alternate ram BOP.

In addition to the above, C&K valves 706 on the lower stack 700 can be used control the C&K applications of individual BOPs on the lower stack 700. In some embodiments of the invention, six C&K valves can be used, and the valves can meet the following specifications:

The valves can be dual block design, hydraulically operated.
The valve bores can be about $3\frac{1}{16}$ inch in diameter.
The valve flange can be about $4\frac{1}{16}$ inch in diameter.
The ring grooves can be 625 inconel inlayed.
The valves can be rated for 20,000 psi.
Each can contain one blind pocket target flange, included on the end outlet.
The valves can be controlled by the subsea electronics.
The valves can be visible to an ROV.
The Valves can be rated to handle internal fluid temperature of up to about 350 degrees Fahrenheit and down to about −20 degrees Fahrenheit.

The lower stack 700 can also include a wellhead connector 708, which, in some embodiments, can have the following features:

A top connection having about an $18\frac{3}{4}$ inch diameter, a pressure rating of about 20,000 psi, and a studded top with a VX/VT Inconel ring groove.
A bottom connection with a VX/VT Inconel ring groove.
Added stack height of about 18 inches.
An overall height of about $50\frac{5}{8}$ inches with standard cylinder heads.
An Inconel 718 gasket.
A 30 inch dog kit.

In some embodiments of the present technology, the wellhead connector 708 can be internally ported for hydraulically operated VX/VT retainer pins in four places at 90 degrees, and can have 2 nudge pins at 180 degrees integrated into the VX/VT gasket retainer retract circuit. In addition, the wellhead connector 708 can allow for external pressure testing of the VX/VT gasket, and can have a flush out seal to help protect against hydrates.

Referring now to FIG. 7B, there is shown a contextual diagram depicting details of the lower subsea control module 712. There is included in the lower subsea control module the power and communications hub 710, lower stack pod receivers, and ROV display 714, an APCS 716, and readback pressure switches, among other components.

According to certain embodiments of the present technology, the lower subsea control module 712 accounts for the power and communications needs as applied to the lower stack 700. The design of the lower subsea control module 712 (as well as the stabs connecting the LMRP 600 and lower stack 700) accounts for critical and non-critical functionality to ensure separate circuitry for both the power and communication.

In some embodiments, lower stack pod receivers provide a hydraulic interface to the LMRP from the MUX control pod. These receivers can be constructed of, for example, galling and corrosion resistant stainless steels. Corresponding BOP receivers can be spring-loaded, and can be bolted to a welded companion flange on the bottom of the BOP plate. The receiver can also provide function ports for the BOP hydraulic components.

Certain embodiments of the technology include an ROV display 714 that allows an ROV to read and apply power (e.g., if the battery for the display is dead). Under normal operations, each ram position and pressure can be transmitted to the surface for operator display. The same information can also be displayed on the ROV display 714, which is readable by an ROV. In addition, in some embodiments, a battery backup can be provided to the display in case a loss of power occurs. The battery can deliver power to the ROV display 714 for up to about 30 days or more. In alternate embodiments, the ROV display 714 can provide a wetmate connector that can allow the ROV to power the display. In yet other embodiments, the design can provide an illuminated display only when an ROV is present, in order to preserve energy and battery life.

Another feature of the lower subsea control module is the APCS 716. The APCS 716 can contain a portable emergency system for shutting in the well. This is accomplished through the use of sonic signals sent from the surface (rig floor, lifeboat, or helicopter) to a subsea acoustic control pod that executes critical BOP function commands to shut in the wellhead in the case of the loss of the MUX control system.

The surface and subsurface portions of the APCS 716 communicate via unique sound signals transmitted and received through transceivers connected to acoustic transducers. The APCS 716 consists of the following major components: 1) a surface control unit (SCU), 2) a cable drum and dunking transducer, 3) at least one subsea transceiver/transducer, 4) an acoustic control subsea unit (ACSU), and 5) a subsea acoustic pod. In some embodiments, a pod simulator allows the operator to test and evaluate the control system for proper operation without using the actual subsea acoustic pod.

In practice, in some embodiments, the subsea transducers receive acoustic signals generated by the acoustic command unit through a dunking transducer. The subsea transducers can be mounted, one each, on hydraulically actuated arms that attach to the stack. With the stack on the sea bottom, the arms can be extended to horizontal orientations to receive signals from the surface. The acoustic arms can be of an automatic extend/retract type, and can be designed with the best line of sight between the BOP and the rig in a well control situation to ensure good communication.

The electrical voltages resulting from the subsea signal conversions actuate solenoid operated valves in the acoustic pod. These actuations produce the hydraulic pressures required to shut in the wellhead and other functions. As each actuation occurs, the pod forwards an electrical confirmation signal for conversion and transmission to the SCUs. Each confirmation signal updates the visual display of pod status in the SCUs.

Structurally, the subsea acoustic pod can have an upper cylindrical solenoid housing bolted onto the lower stack hydraulics. The solenoid housing, frame, external plating and some internal parts of the lower box can be made from 316 stainless steel, or any other appropriate material. Internal pod components can include solenoid assemblies, pressure switches, a hydraulic filter, an accumulator, and an SPM valve manifold. The subsea acoustic pod can have an electrical cable interface to the Subsea ACS electronic container. The electrical cable interface can provide commands to the solenoids, and readback from the pressure transducers and pressure switches.

In some embodiments, the APCS 716 can allow for up to 12 different functions (including arm/disarm). These functions include:
HP upper BSR close
HP CSR close
HP lower BSR close
Middle pipe rams close
All stabs retract (if required)
LMRP connector primary unlock
LMRP connector secondary unlock
Back-up system arm (autoshear)
Lower pipe rams close
Acoustic arm
Acoustic reset/disarm
Wellhead connector lock
Acoustic arm—4K supply
Acoustic arm—3K supply
HP upper BSR close
HP CSR close
HP lower BSR close
Middle pipe rams close
All stabs retract (if required)
LMRP connector primary unlock
LMRP connector secondary unlock
Back-up system arm (autoshear)
Lower pipe rams close
Wellhead connector lock
SIS Subsystem—FIGS. 8A-8C

Figure 8A:
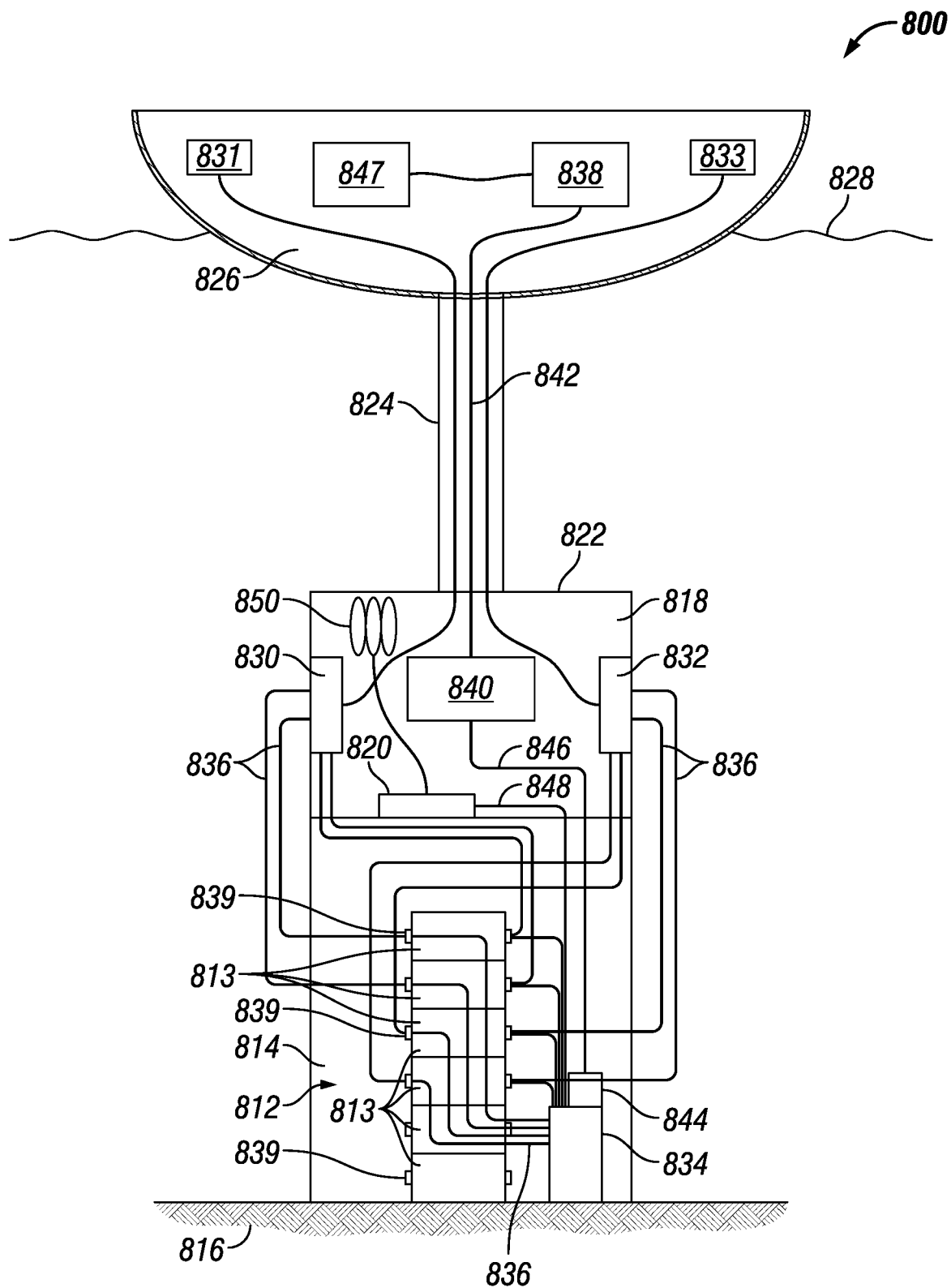
FIG. 8A is a side schematic view of a safety instrumented system (SIS) according to an embodiment of the present technology.

FIG. 8A shows a system 800 for controlling a subsea BOP 812. The subsea BOP 812 is typically housed in a lower stack 814 positioned on the sea floor 816 below an LMRP 818. The subsea BOP 812 is divided into individual BOP rams 813, which can include sealing rams, shear rams, etc. The lower stack 814 and the LMRP 818 can be connected to one another by a hydraulic connector 820, which can be controlled to allow disengagement of the LMRP 818 from the lower stack 814. An upper end 822 of the LMRP 818 is connected to a riser 824 that extends from the upper end 822 of the LMRP 818 to a vessel 826 at the surface 828 of the sea. Also included in the system can be a first control pod 830 (often referred to as the yellow control pod) and a second control pod 832 (often referred to as the blue control pod). In the embodiment shown in FIG. 8A, the first and second control pods 830, 832 are attached to the LMRP 818. The first control pod 830 and second control pod 832 can be controlled by first and second control cabinets 831, 833, located on the vessel 826. The vessel 826 can be any appropriate vessel, including, for example, a drill ship or a platform.

Under normal operations, the subsea BOP rams 813 are hydraulically controlled by the first or second pod 830, 832. Specifically, hydraulic lines 836 run from each of the first and second control pods 830, 832 to individual rams 813 of the BOP 12. Typically one of the two control pods 830, 832 is responsible to hydraulically control the rams 813 through its respective hydraulic lines 836, while the other control pod 830, 832 remains idle. In this way, redundancy is built into the system because if the control pod 830, 832 actually controlling the rams 813 becomes incapacitated, or otherwise requires maintenance or replacement, the other control pod 830, 832 can continue operation of the rams 813.

One embodiment of the present technology includes an SIS for controlling the subsea BOP 812 on a stack wide basis. One purpose of such a system is to provide the appropriate SIFs to confirm and backup the BOP control system, and comply with certain regulatory standards applicable to many systems and sub-systems in the petroleum industry. The SIS includes a surface logic solver 838, or logic controller, located at the vessel 826, and connected to a first subsea logic solver 840 by a first cable 842. The first subsea logic solver 840 is in turn connected to a second subsea logic solver 844 by a second cable 846. As shown in FIG. 8A, the second subsea logic solver 844 can be connected to a hydraulic control unit 34 located in the lower stack 814. In some embodiments, the second subsea logic solver 844 can be connected to a battery, so that the second subsea logic solver 844 can continue to operate after the LMRP 818 has been disconnected from the lower stack 814. The surface logic solver 838 can include an HMI panel 847 to allow an operator to communicate with the surface logic solver 838.

In practice, the surface logic solver 838 can generate commands, which are then transmitted to the first subsea logic solver 840 via the first cable 842. From the first subsea logic solver 840, the commands are then transferred to the second subsea logic solver 844, which communicates with, and may be attached to, the hydraulic control unit 834. The hydraulic control unit 834 is in turn in communication with the subsea BOP rams 813 via hydraulic lines 836. The second subsea logic solver 844 can implement the commands, directing the hydraulic control unit 834 to control the subsea BOP rams 813 as desired by an operator. The logic solvers 838, 844, 846 of any embodiment described herein can be any equipment capable of sending and receiving signals according to the requirements of the technology. For example, in some embodiments, the logic solvers can comprise or include central processing units (CPUs).

In the embodiment shown, each ram 813 can be connected to multiple hydraulic lines 836, each coming from a different control source, including the first control pod 830, the second control pod 832, and the hydraulic control unit 834. As shown, which line controls the BOP ram 813 at any given moment can be controlled by valves 839 attached to the BOP rams 813. In the drawings, hydraulic lines 836 are shown connecting each of the first and second control pods 830, 832 and the hydraulic control unit 834 to some, but not all, of the rams 813. It is to be understood that in a functioning system, each of the control components can be connected to all of the rams 813, and such a configuration is not shown in the drawing only to improve clarity of the figures.

One benefit of the SIS described above is that it provides additional redundancy to the system, and acts as a failsafe to enhance safety and reliability of the BOP. Although two control pods 830, 832 are already provided to create some redundancy in the system, in reality it can be difficult to use the second control pod 832 if the first control pod 830 is out of commission. This is because government regulations and best practice procedures dictate that a backup control system always be in place for the BOP. Thus, if the first control pod 830 is unavailable, the second control pod 832 cannot be used because there would be no redundancy. The SIS herein described helps to alleviate this problem by providing a second redundant control system.

In addition, the SIS of the present technology can serve to augment the capabilities of the overall system 812 by providing additional means to control the BOP rams 813, even when both control pods 830, 832 are functioning properly. For example, the SIS, via the hydraulic control unit 834, can control certain rams 813 at the same time that the control pods 830, 832 are controlling alternate rams 813. Thus, the capacity of the system 812 to control the BOP rams 813 is increased. Furthermore, the system can provide monitoring functions, such as monitoring various states, statuses, parameters, etc., as well as information to determine whether the BOP control system is operating properly. The technology can also be designed to comply with the requirement of high pressure drilling operations, and can be used, for example, with a 20 Ksi BOP system, although it is not limited to such systems, and may be used in other types of systems as well, such as 15 Ksi systems. In addition, the SIS, as described herein, is a different type of control system than the primary control system, thereby providing the additional advantage of increasing the diversity of the control architecture.

Some benefits of the present technology can now be described. In order to understand the benefits, however, it is first important to understand some of the requirements of offshore drilling systems, one of which is to allow disconnection and subsequent reconnection of the LMRP 818 from the lower stack 814. This can be beneficial, for example, when a hurricane or other storm threatens a drilling vessel or platform. To weather such a storm, an operator may wish to disconnect the LMRP 818 from the lower stack 814, and move the LMRP 818, riser 824 and vessel 826 out of harm's way. After the storm passes, it is necessary to then reconnect the LMRP 818 to the lower stack 814 to resume operations. The disconnection and subsequent reconnection of the LMRP 818 to the lower stack 814 can be greatly simplified by reducing the number of connections between these components, and also by controlling the types of connections made.

One way to simplify the reconnection of the LMRP 818 and the lower stack 814 is to provide a pair of subsea logic solvers, as shown in FIG. 8A and described above. This is because the first cable 842, which connects the surface logic solver 838 to the first subsea logic solver 840 must carry power and communications between these two components. Often, the distance between the surface logic solver 838 and the LMRP 818 (and thus the first subsea logic solver 840) through the riser 824 can be very long, such as up to about 2 miles in length or more. Thus, power lines in the cable must be relatively high voltage lines, and the communications are often carried through optical lines (although copper lines may be used).

If the system were equipped with a single subsea logic solver in the lower stack, an operator would need to disconnect and reconnect both higher voltage power lines and fragile optical communications lines between the LMRP 818 and the lower stack 814. Such connections could be dangerous (in the case of the high voltage power lines) and could degrade the quality of the communication signals (in the case of the optical communications lines). Alternatively, if the system were equipped only with a single subsea logic solver on the LMRP 818, multiple hydraulic lines would need to cross from the LMRP 818 to the lower stack 814 to connect to the rams 813. Such a structure could be problematic because of the need to disconnect and reconnect many more lines between these components.

By providing two separate subsea logic solvers 840, 844, including one on the LMRP 818 and one on the lower stack 814, these problems can be alleviated. In practice, according to the present technology, the cable 842 connecting the surface logic solver 838 to the first subsea logic solver 840 can include high voltage power lines and optical communication lines. One function of the first subsea logic solver 840 can be to convert and lower the voltages, and to convert the optical signals to copper, thereby allowing communication between the first subsea logic solver 840 and the second subsea logic solver 44 to be through low voltage copper wires that make up cable 846. Such low voltage copper wire can more easily be disconnected and reconnected as needed at the interface between the LMRP 818 and the lower stack 814.

In some embodiments of the invention, the hydraulic control unit 834 can be connected to the hydraulic connector 820 to disconnect or reconnect the LMRP 818 from the lower stack 814. Since the hydraulic connector 820 is attached to the LMRP 818, a single hydraulic line 848 may need to cross the interface between the LMRP 818 and the lower stack 814 to provide hydraulic communication between the hydraulic control unit 834 and the hydraulic connector 820. Alternatively, use of such a line can be avoided in favor of providing power to the hydraulic connector 820 from an accumulator 850 which, in the embodiment shown, can be attached to the LMRP 818.

For purposes of explanation, the following paragraphs contain explanations of how the SIS can work with other existing BOP systems to operate specific features of the BOP or other components on the LMRP and lower stack. It is to be understood that these explanations are given by way of example only, and do not represent all of the possible ways that that the present technology can be applied in practice.

The first example explains an example of the function of the SIS as it relates to a pipe ram BOP. The pipe ram function may be initiated by any contact closure input, or by an HMI panel. The need to close the ram is determined by the operator, so the initiation of the function is determined by the man-in-the-loop. When the surface logic solver 838 on the vessel 826 recognizes the input, it may monitor a surface flow meter or subsea sensor. If the BOP is not successfully closed by the BPCS, the surface logic solver 838 may transmit a signal to the first subsea logic solver 840. The first subsea logic solver 840 may in turn transmit the signal to the second subsea logic solver 844, which may fire a function that vents the open hydraulic pressure to the pipe ram and applies close pressure to the pipe ram, thus closing the BOP.

The second example explains an example of the function of the SIS as it relates to a BSR. The BSR function may be initiated by a contact closure input, or by an HMI panel. The need to close the ram is determined by the operator, so initiation of the function is determined by the man-in-the-loop. When the surface logic solver 838 on the vessel 826 recognizes the input, it may monitor the surface flow meter or subsea sensor. If the BOP is not successfully closed by the BPCS, the surface logic solver 838 may transmit a signal to the first subsea logic solver 840, which may in turn transmit the signal to the second subsea logic solver 844. The second subsea logic solver 844 may fire a function that vents the open hydraulic pressure to the BSR and applies close pressure to the BSR, thus closing the BOP.

The third example explains an example of the function of the SIS as it relates to a CSR BOP. The CSR function may be initiated by a contact closure input, or by an HMI panel. The need to close the ram is determined by the operator, so initiation of the function is determined by the man-in-the-loop. When the surface logic solver 838 on the vessel 826 recognizes the input, it may monitor the surface flow meter or subsea sensor. If the BOP is not successfully closed by the BPCS, the surface logic solver 838 may transmit a signal to the first subsea logic solver 840, which in turn may transmit a signal to the second subsea logic solver 844. The second subsea logic solver 844 may fire a function that vents the open hydraulic pressure to the CSR and applies close pressure to the CSR, thus closing the BOP.

The fourth example explains an example of the function of the SIS as it relates to the hydraulic connector 820. The hydraulic connector 820 function may be initiated by a contact closure input, or by an HMI panel. The need to release the LMRP is determined by the operator, so initiation of the function is determined by the man-in-the-loop. When the surface logic solver 838 on the vessel 826 recognizes the input, it may monitor the surface flow meter or subsea sensor. If the hydraulic connector 820 is not successfully released by the BPCS, the surface logic solver 838 may transmit a signal to the first subsea logic solver 840, which may in turn transmit a signal to the second subsea logic solver 844. The second subsea logic solver 844 may fire a function that vents the latch hydraulic pressure to the hydraulic connector 820 and applies unlatch pressure to both the primary and secondary unlatch functions.

The fifth example explains an example of the function of the SIS as it relates to an EDS. The EDS function may be initiated by a contact closure input, or by an HMI panel. The need to disconnect is determined by the operator, so initiation of the function is determined by the man-in-the-loop. When the surface logic solver 838 on the vessel 826 recognizes the input, it may monitor the surface flow meter, or other sensors on the stack, for each function sequentially. If the EDS function is not successfully completed by the BPCS, the surface logic solver 838 may transmit a signal to the first subsea logic solver 840, which in turn may transmit a signal to the second subsea logic solver 844. The subsea logic solver may then fire the following, or another similar sequence, of functions:

Vent the open pressure and apply close pressure to the pipe ram function

Vent the open pressure and apply close pressure to the CSR ram function

Vent the open pressure and apply close pressure to the BSR ram function

Vent the extend pressure and apply the retract pressure to the stab function

Vent the latch pressure and apply primary and secondary unlatch pressure to the LMRP connector function.

Figure 8B:
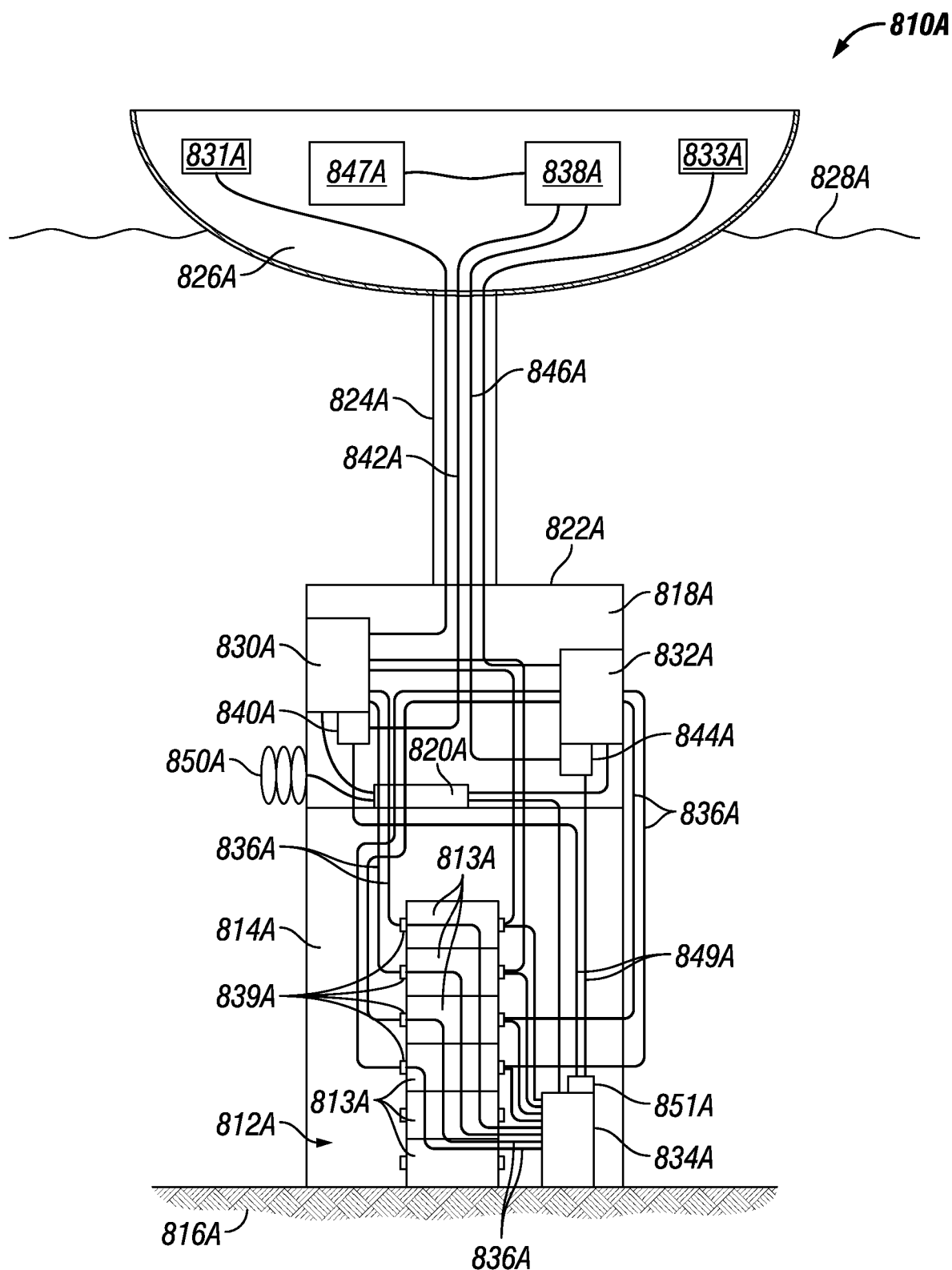
FIG. 8B is a side schematic view of an SIS according to an alternate embodiment of the present technology.

Referring now to FIG. 8B, there is shown an alternate system 810A for controlling a subsea BOP 812A. The subsea BOP 812A is typically housed in a lower stack 814A positioned on the sea floor 816A below an LMRP 818A. The subsea BOP 812A is divided into individual BOP rams 813A, which can include sealing rams, shear rams, etc. The lower stack 814A and the LMRP 818A can be connected to one another by a hydraulic connector 820A, which can be controlled to allow disengagement of the LMRP 818A from the lower stack 814A. An upper end 822A of the LMRP 818A is connected to a riser 824A that extends from the upper end 822A of the LMRP 818A to a vessel 826A at the surface 828A of the sea. Also included in the system can be a first control pod 830A (often referred to as the yellow control pod) and a second control pod 832A (often referred to as the blue control pod), and a hydraulic control unit 834A. In the embodiment shown in FIG. 8B, the first and second control pods 830A, 832A are attached to the LMRP 818A. The first control pod 830A and second control pod 832A can be controlled by first and second control cabinets 831A, 833A, located on the vessel 826A. The vessel 826A can be any appropriate vessel, including, for example, a drill ship or a platform.

Under normal operations, the subsea BOP rams 813A are hydraulically controlled by the first or second pod 830A, 832A. Specifically, hydraulic lines 836A run from each of the first and second control pods 830A, 832A to individual rams 813A of the BOP 812A. Typically one of the two control pods 830A, 832A is responsible to hydraulically control the rams 813A through its respective hydraulic lines 836A, while the other control pod 830A, 832A remains idle. In this way, redundancy is built into the system because if the control pod 830A, 832A actually controlling the rams 813A becomes incapacitated, or otherwise requires maintenance or replacement, the other control pod 830A, 832A can continue operation of the rams 813A.

The embodiment of FIG. 8B is an alternate SIS for controlling the subsea BOP 812A that operates on a pod by pod basis. The SIS includes a surface logic solver 838A, or logic controller, located at the vessel 826A, and connected to a first subsea logic solver 840A by a first cable 842A, and a second subsea logic solver 844A by a second cable 846A. As shown in FIG. 8B, the first subsea logic solver 840A and the second subsea logic solver 844A can each be connected to an extended I/O extension 851A by cables 849A, which I/O extension 851A is in communication with a hydraulic control unit 834A located in the lower stack 814A. The surface logic solver 838A can include HMI panel 847A to allow an operator to communicate with the surface logic solver 838A. In one embodiment, the HMI panel 847A can be a panel with push buttons and lit indicators, while other embodiments can include a touch screen display.

In practice, the surface logic solver 838A can generate commands, which are then transmitted to the first subsea logic solver 840A via the first communications cable 842A, and/or to the second subsea logic solver 844A via the second cable 846A. From the first subsea logic solver 840A and/or the second subsea logic solver 844A, the commands are then transferred to the I/O extension 851A, which communicates with, and may be attached to, the hydraulic control unit 834A. The hydraulic control unit 834A is in turn in communication with the subsea BOP rams 813A via hydraulic lines 836A. The I/O extension 851A can implement the commands, directing the hydraulic control unit 834A to control the subsea BOP rams 813A as desired by an operator.

In the embodiment shown in FIG. 8B, each ram 813A can be connected to multiple hydraulic lines 836A, each coming from a different control source, including the first control pod 830A, the second control pod 832A, and the hydraulic control unit 834A. As shown, which line controls the BOP ram 813A at any given moment can be controlled by valves 139 attached to the BOP rams 813A. In the drawings, hydraulic lines 836A are shown connecting each of the first and second control pods 830A, 832A and the hydraulic control unit 834A to some, but not all, of the rams 813A. It is to be understood that in a functioning system, each of the control components can be connected to all of the rams 813A, and such a configuration is not shown in the drawing only to improve clarity of the figures.

As discussed in more detail above with respect to the embodiment of FIG. 8A, allowing disconnection and subsequent reconnection of the LMRP 818A from the lower stack 814A can be very advantageous, such as to provide the ability to move the vessel 826A, riser 824A, and LMRP 818A out of the path of a storm. The disconnection and subsequent reconnection of the LMRP 18 to the lower stack 814A can be greatly simplified by reducing the number of connections between these components, and also by controlling the types of connections made.

One way to simplify the reconnection of the LMRP 818A and the lower stack 814A is to provide a pair of subsea logic solvers corresponding to the control pods 830A, 832A, and providing an I/O extension 851A, as shown in FIG. 8B and described above. This is because the first and second cables 842A, 846A, which connect the surface logic solver 838A to the first and second subsea logic solvers 840A, 844A, respectively, must carry power and communications between the LMRP 818A and the lower stack 814A. Often, the distance between the surface logic solver 838A and the LMRP 818A (and thus the first and second subsea logic solvers 840A, 844A) through the riser 824A can be very long, such as up to about 2 miles in length or more. Thus, power lines in the cable must be very high voltage lines, and the communications are often carried through optical lines.

If the system were equipped with a subsea logic solver in the lower stack, an operator would need to disconnect and reconnect both high voltage power lines and fragile optical communications lines between the LMRP 818A and the lower stack 814A. Such connections could be dangerous (in the case of the high voltage power lines) and could degrade the quality of the communication signals (in the case of the optical communications lines). Alternatively, if the system were equipped only with single subsea logic solvers on the LMRP 818A, without an I/O extension near the hydraulic control unit 834A, multiple hydraulic lines would need to cross from the LMRP 818A to the lower stack 814A to connect to the rams 813A. Such a structure could be problematic because of the need to disconnect and reconnect many more lines between these components.

By providing subsea logic solvers 840A, 844A on the LMRP 818A and a separate I/O extension 834A on the lower stack 814A, these problems can be alleviated. In practice, according to the present technology, the cables 842A, 846A connecting the surface logic solver 838A to the first and second subsea logic solvers 840A, 846A can include high voltage power lines and optical communication lines. One function of the first and second subsea logic solvers 840A, 846A can be to convert and lower the voltages, and to convert the optical signals to copper, thereby allowing communication between the first and second subsea logic solvers 840A, 846A and the I/O extension 834A to be through low voltage copper wires that make up cables 849A. Such low voltage copper wire can more easily be disconnected and reconnected as needed at the interface between the LMRP 818A and the lower stack 814A.

In some embodiments of the invention, the hydraulic control unit 834A can be connected to the hydraulic connector 820A to disconnect or reconnect the LMRP 818A from the lower stack 814A. Since the hydraulic connector 820A is attached to the LMRP 818A, a single hydraulic line 848A may need to cross the interface between the LMRP 818A and the lower stack 814A to provide hydraulic communication between the hydraulic control unit 834A and the hydraulic connector 820A. Alternatively, use of such a line can be avoided in favor of providing power to the hydraulic connector 820A from an accumulator 850A which, in the embodiment shown, can be attached to the LMRP 818A.

Figure 8C:
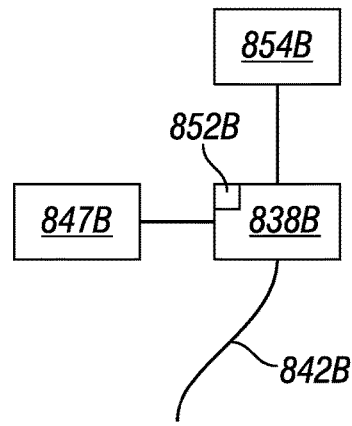
FIG. 8C is a control system, including automatic and man-in-the loop controls, for the SIS of FIGS. 8A and 8B.

FIG. 8C shows another aspect of the present technology, including the ability to alternate between a man-in-the-loop and an automatic configuration for controlling the surface logic solver 838B, and hence the SIS for controlling a subsea BOP described above. More particularly, the present technology provides a surface logic controller 838B, which, among other things, can monitor the basic processes and controls of the BOP system, including the performance of the subsea logic solvers, the operation of the BOP rams, the operation of shuttle valves, pressure sensors, temperature sensors, and other components of the subsea system. To monitor the operation of the BOP rams, the surface logic controller 838B can monitor the operation of the control pods.

According to the embodiment of FIG. 8C, the surface logic controller can be equipped with a key switch 852B capable of alternating between a man-in-the-loop state and an automatic state. The key switch can be a physical switch or can be software code integrated into the code of the logic solver.

When the key switch 852B is in the man-in-the-loop state, the surface logic solver 838B, and hence the SIS for controlling the subsea BOP, can be controlled by an operator who issues commands to the surface logic solver 838B through an HMI panel 847B or by other appropriate means. Thus, the operator can have full control over whether to initiate action using the SIS or not to initiate action.

Alternatively, when the key switch 852B is in the automatic state, an automatic controller 854B can used to control the subsea BOP through the SIS described above. The automatic controller can act without prompting by the operator.

Figure 9:
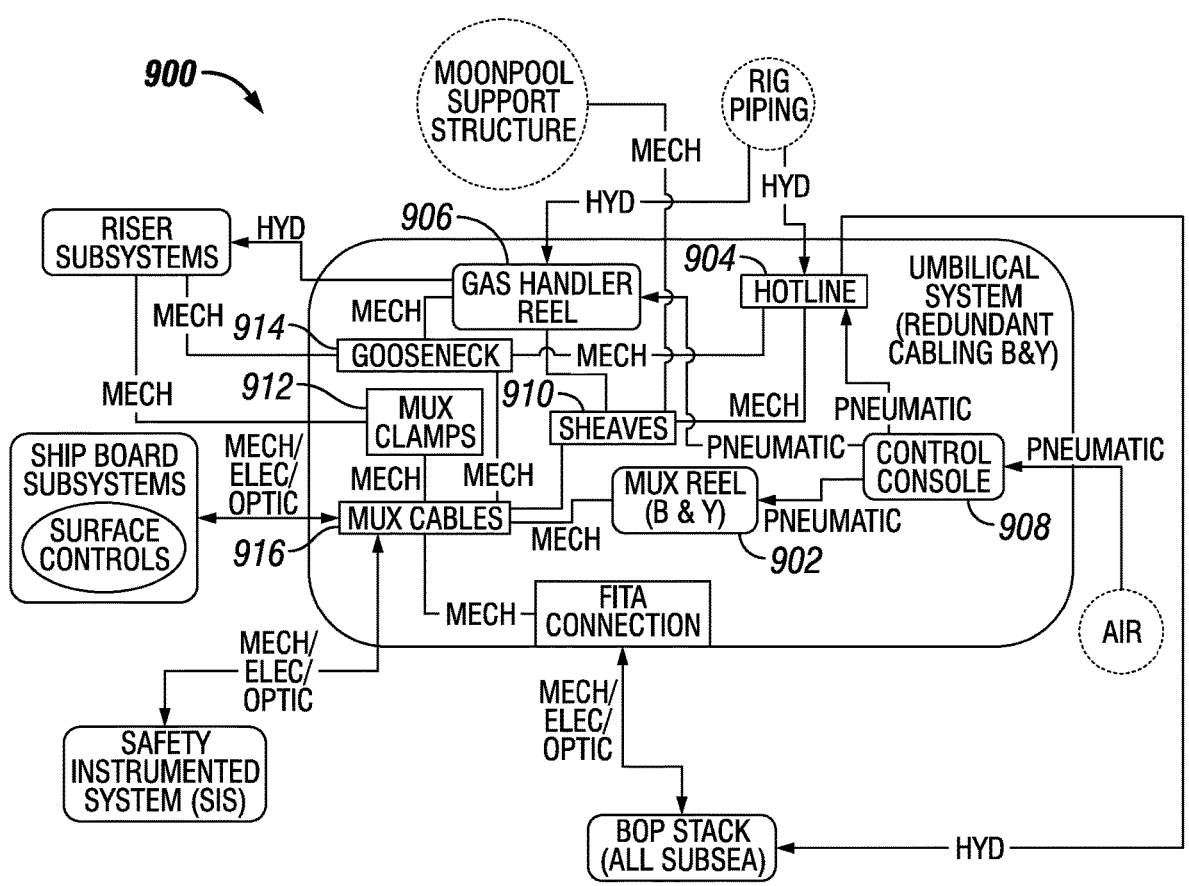
FIG. 9 is a context diagram of the umbilical subsystem according to an embodiment of the present technology.

Umbilical Subsystem—FIG. 9

FIG. 9 depicts the umbilical subsystem 900 according to one embodiment of the present technology, including cable reels 902, a hotline reel 904, and a gas handler reel 906, hose sheaves 910, MUX clamps 912, and a gooseneck 914 with gooseneck clamps. Each of the reels can be controlled from a control console 908, which can be a remote control console. The control console can provide for the following positions for each reel: 1) reel in, 2) brake, and 3) reel out. In addition, in some embodiments, the control console 308 can be provided with filtered regulated air from the ship's air supply.

In some embodiments, the gas handler reel 906 can be designed to accommodate up to about one thousand feet (1,000 ft) of 2.6 inch outside diameter hose at 75% capacity, giving the reel a total capacity of 1,333 ft of hose. Of course, a different sized reel and/or hose can be used, depending on the needs of a particular operation. The hose can be a bundle of two lines encased in a polyurethane jacket, and the hose bundle can have a minimum bend radius of about 15 inches.

The reels can be mounted on a fully seam-welded, carbon steel oilfield type skid with overhead headache rack and four point pad eyes for normal offshore crane handling. The frame can be fabricated from carbon steel, and coated with a three-coat protective coating system. In some embodiments, the gas handler reel 906 (as well as the other reels, discussed below) can have a reel drive system, a level-wind system, a hydraulic swivel designed for specified working pressure, and/or air controls to drive the motor. In addition, the reel drive system can include a pneumatic operated drive system for both the reel drum and level-wind drives, and the brake system.

The level-wind system can be mounted to a removable sub-frame on the reel frame, and can be driven by the rotation of the reel's main shaft. The level-wind system can be pitched and synchronized to the specific size of the hose. In some embodiments, the level-wind system can consist of an Archimedes or diamond screw, with a traveling carriage supported by pillow block bearings (with grease fittings), and mounted to a sub-frame. The level-wind screw can have an adjustment assembly for manually adjusting the position of the traveling carriage to correct slight deviations in timing with the reel drum. The traveling carriage can be self-reversing, and can be synchronized with the point of exit/entry of the hose to the reel drum. The traveling carriage carries resilient rollers, which control and contain the hose being spooled out from the reel.

In certain embodiments, the MUX cable reels 902 can be designed to accommodate up to about twelve thousand five hundred feet (12,500') of armored MUX cable 916 at eighty-five percent (85%) of spool capacity, thereby giving the reel drum a capacity of approximately sixteen thousand feet (16,000'). Each cable reel 902 can be furnished with about 11,500 ft of BOP MUX control cable 916, although the length of the cable 916 can vary depending on the well. The cable reels 902 can be designed to allow control from a remote location and provide an override for manual control.

The MUX cable 916 can be constructed using any appropriate wire (such as, e.g., #7 AWG conductor wire) for power. Single mode optical fiber (Primary and Secondary communication) can be used for Ethernet based communications. In some embodiments, the cable can be constructed with an overall high density polyurethane cover and contra-helical, double-wound armor sheath. There can be two lengths of 11,500 feet of cable supplied (one designated for the blue spool and one designated for the yellow spool), each would on a separate reel.

The hose sheaves 910, which can be used, for example, with the MUX cable reels 902 and the hotline reels 904, can be half-moon type sheaves, that are appropriately sized to the cable/hose outside diameter and minimum bend radius.

According to some embodiments, MUX clamps 912 can be supplied for attaching MUX cable 916/hotline hose and MUX cable 916/gas handler hose to the riser sections. In addition, a gooseneck assembly, including a gooseneck 914 and gooseneck clamps, can be mounted to the riser via a three piece segmented clamp, or by any other appropriate means. In some embodiments, two goosenecks 914 sized to the appropriate bend radius of the MUX cable 916 and hotline hose can be installed on the segmented clamp, in which case both goosenecks 914 can have a double clamp to hold a MUX cable 916 and hotline hose. The goosenecks 914 can be mounted via a double pin hinge arrangement to position the goosenecks 914 in several positions as needed.

Figure 10:
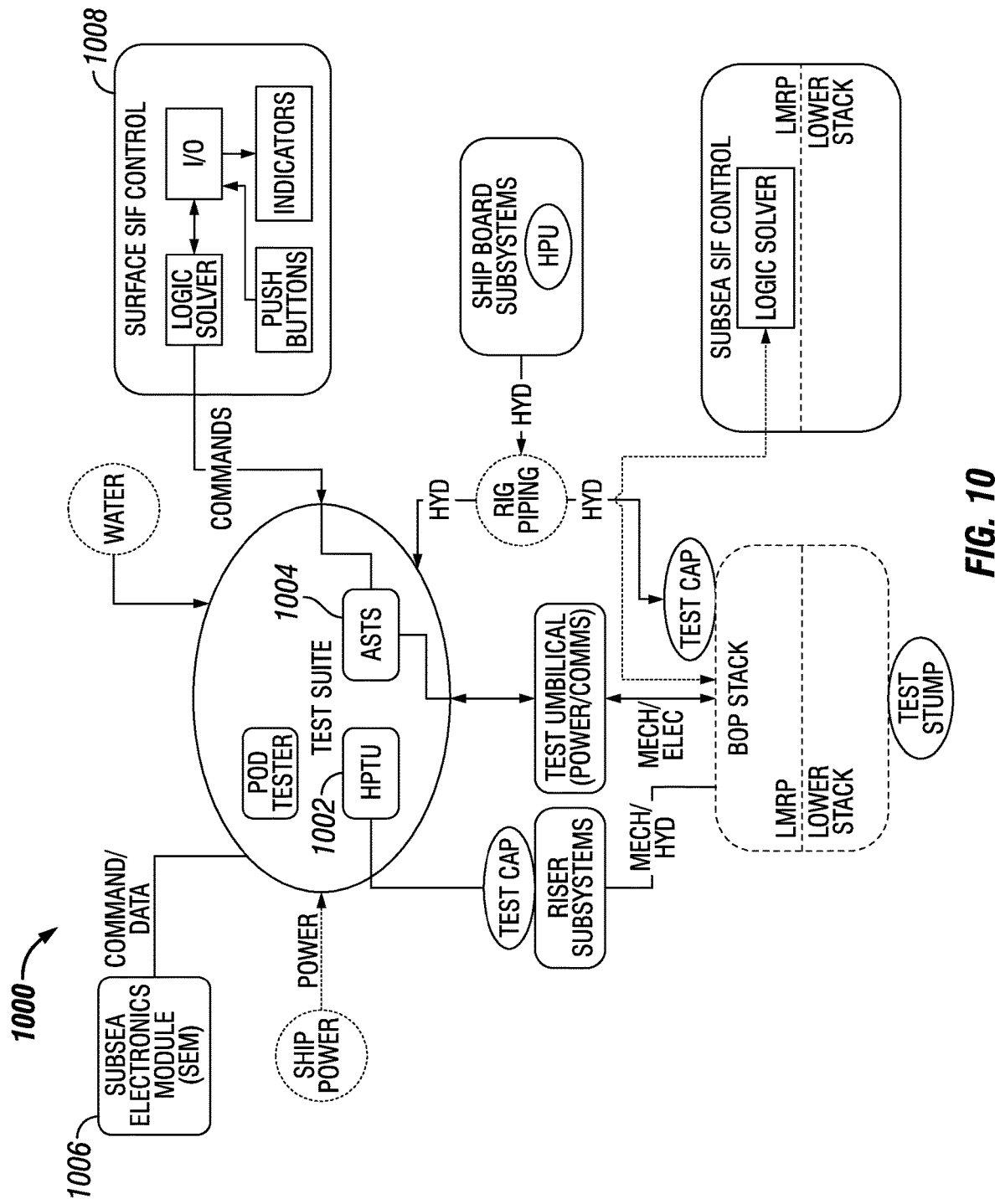
FIG. 10 is a context diagram of the auxiliary stack test subsystem according to an embodiment of the present technology.

Test Suite—FIG. 10

There is shown in FIG. 10 a test suite 1000, that includes an HPTU 1002 and an ASTS 1004. The HPTU 1002 and ASTS 1004 serve as the primary pieces of test equipment for testing the BOP stack.

The ASTS 1004 can provide the ability to command BOP functionality through the SEM controller 1006. The testing can provide the ability to confirm the secondary stack is fully functional, and help meet the requirements of government regulators for periodic testing prior to drilling deployment.

Figure 11:
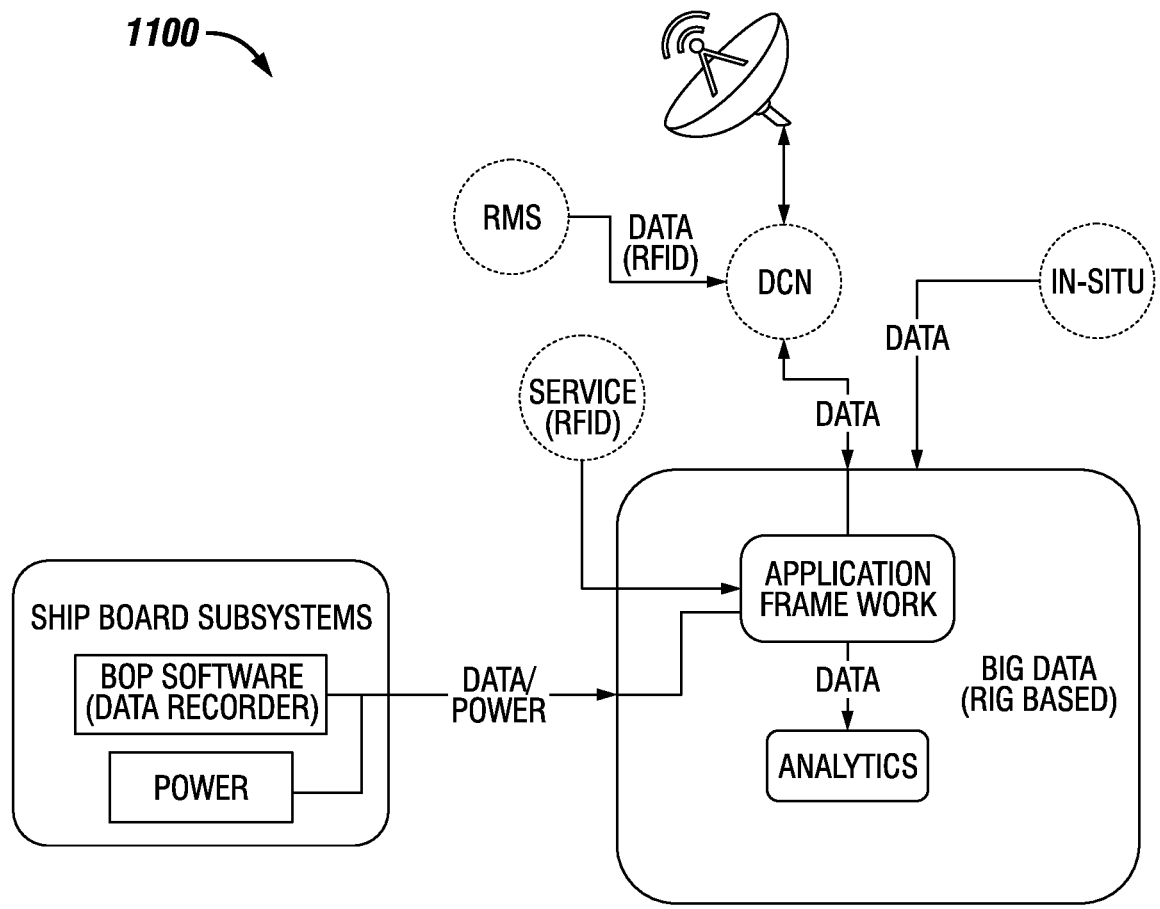
FIG. 11 is a context diagram of the data management subsystem according to an embodiment of the present technology.

In practice, the ASTS 1004 can consist of cabinets that contain testing hardware and software. The ASTS 1004 can be connected to a secondary stack via an umbilical that contains the same hardware connections as the surface control subsystem. During testing, the ASTS 1004 tracks the usage of all moving components involved in the testing, and, upon completion of the testing, the data is transmitted to a central repository (big data) for condition monitoring purposes. The data can then become part of a full life cycle tracking process. A more detailed context chart showing the big data system is shown in FIG. 11.

As shown in FIG. 10, the ASTS 1004 can require an additional cabinet 1008, such as a SIL rated system cabinet, to test the subsea safety features, such as the SIS. The cabinet 1008 can house the hardware that can provide the same functional interface as the surface control system.

In some embodiments of the present technology, the HPTU 1002 can use a computer controlled variable speed motor driving a plunger type pump. This design eliminates the need for a secondary high pressure pump. Instead, a triplex plunger pump can be used, driven by a 125 horsepower electric motor using non-slip synchronous belts. The motor speed can be varied using an electronic controller. In some embodiments, there can be up to five pressure ranges tested, including: 1) Low-pressure testing: 200-600 psi, 2)

Medium-Low-pressure testing 375-1,125 psi, 3) Medium-pressure testing 1,250-3,750 psi, 4) Medium-High-pressure testing 3,750-11,250 psi, and 5) High-pressure testing: 12,500-37,500 psi.

The HPTU 1002 can be provided with suitable connections for the pressures involved. In addition, the HPTU 1002 can be supplied with fluid from multiple different sources, including: 1) water from the rig supply, 2) glycol from the FRU glycol tank, 3) BOP mixed fluid from the FRU mixed tank, and 4) auxiliary supply such as cement unit. In some embodiments, each supply can be equipped with a pneumatically operated ball valve that can be operated remotely from the BOP test/storage area remote panel or the rig floor remote panel.

The HPTU 1002 can be mounted on a heavy-duty oilfield type skid. In some embodiments, the skid frame can be constructed of welded carbon steel, coated with a paint system suitable for marine service applications. The skid can include a stainless steel drip pan with drain valves. The exposed skid deck can be equipped with fiberglass non-skid grating that is installed over the skid drip pan.

A rig floor console can provide controls for the HPTU 1002 as well as test outputs (defined below) at various pressure ranges. The panel is designed for hazardous area installations and provides five different test circuits, of differing test pressure ranges, including: 1) Low-pressure testing: 200-600 psi, 2) Medium-Low-pressure testing 375-1,125 psi, 3) Medium-pressure testing 1,250-3,750 psi, 4) Medium-High-pressure testing 3,750-11,250 psi, and 5) High-pressure testing: 12,500-37,500 psi.

The Rig Floor console can also have a port that allows it to receive pressurized fluid from the HPU skid. This fluid can be used to supply the test system with additional fluid for fast filling up to 5000 psi, increasing the net flow rate capacity of the system.

In addition to the above, an auxiliary distribution manifold can be designed to attach to the rig floor remote panel. The auxiliary distribution manifold can be equipped with four circuits for testing: 1) Output 1 (C&K): 350 psi low pressure and 20,000 psi high pressure, 2) Output 2 (Rigid Conduit): 350 psi low pressure and 5,000 psi high pressure, 3) Output 3 (Mud Boost): 350 psi low pressure and 7,500 psi high pressure, and 4) Output 4 (Gas Handler/Diverter): 250 psi low pressure and 2000 psi high pressure.

Certain embodiments of the present technology allow the operator to simultaneously test different customer circuits at different test conditions. The overall test suite is rated to 20,000 psi. In some cases, a digital means of recording the test data can be provided in place of a chart recorder. In addition, a digital display can provide pressure readings per sampling rate. Furthermore, the rig floor console junction box is suitable for hazardous area installations.

Similar to the rig floor console, the BOP test/storage console can provide controls for the HPTU 1002 as well as test outputs at various pressure ranges. The panel is designed for hazardous area installations and provides three different test circuits. As with the rig floor console, there are test pressure ranges, including: 1) Low-pressure testing: 200-600 psi, 2) Medium-Low-pressure testing 375-1,125 psi, 3) Medium-pressure testing 1,250-3,750 psi, 4) Medium-High-pressure testing 3,750-11,250 psi, and 5) High-pressure testing: 12,500-37,500 psi.

The BOP test/storage console can also have a port that allows it to receive pressurized fluid from the HPU skid. This is used to supply the test system with additional fluid for fast filling up to 5000 psi, increasing the net flow rate capacity of the system. Additionally, it can provide a regulated test output for testing BOP operators, as well as for hotlining to BOP stack functions, and pressure testing primary and secondary BOP.

In some embodiments, the HPTU 1002 is designed to operate as a standalone unit. The panel can include the computer and software for running the HPTU system, and it can be designed for safe area installation. In addition, the HPTU 1002 can include a variable frequency drive (VFD), which can be connected to the HPTU motor, and controls the motor speed to vary pump flow rates. Furthermore, the HPTU 1002 can include a lift bar, for lifting and moving the HPTU skid assembly during installation and maintenance operations Some embodiments of the test suite 1000 can include retractable test stumps that can be delivered for connection to a wellhead connector with a standard connection. The test stumps can have a nominal size of about 18¾ inches, 20 Ksi rated working pressure, with a 30 inch diameter upper pin profile with two differential type 5½ inch full hole tool joint test adapters. The tool joint test adapters can use about a 13½ inch seal diameter and an integral hydrate test skirt. In addition, the unit can have the VX/VT profile overlaid with Inconel 625. The lower mandrel body can terminate down with about a 35$\frac{7}{16}$ inch diameter by 2.0 inch thick structural plate. The structural plate can have a 12 inch by 1$\frac{5}{16}$ inch thru holes on a 31$\frac{11}{16}$ inch bolt circle.

Two access holes (external pressure ports) can be provided in the stump body to facilitate make-up contact with the high pressure in the top cap. The test and bleed ports can consist of about a 1⅜ inch female connection. A gooseneck tube fitting can be provided that attaches to the top cap. The overall height can be about 42⅛". The unit can also include a pin profile protector.

In addition to the above, the test suite 1000 can include marine riser test caps that can be removable to allow the following test conditions: 1) simultaneous pressure testing of two C&K lines, 2) one mud boost line, and 3) two hydraulic rigid conduits.

As shown in FIGS. 1, 3-7B, and 9-11, each of which depict context diagrams of systems and subsystems, the following system interfaces exist in the embodiments of the BOP system shown and described:

- The Ship Board Subsystem supplies data to the Big Data Server.
- The Ship Board Subsystem supplies electrical power and data to the Big Data Server.
- The Ship Board Subsystem sends and receives electrical signals between the ERA of the Riser Subsystem.
- The ERA of the Ship Board Subsystem is mechanically installed onto the Riser Subsystem somewhere below the flex joint of the Diverter Flex Joint and above the water line.
- The BOP Stack is mechanically installed to the Riser Subsystem by means of a flange connection.
- The Riser Subsystem supplies hydraulics to the BOP Stack. The rigid conduits supply hydraulic power subsea and the choke, kill, and mud boost lines supply drilling fluids.
- The BOP Stack is electrically bonded to the Riser Subsystem providing continuity between the two subsystems for CP.
- The subsea components of SIS are mechanically installed on the BOP Stack.
- The BOP Stack supplies hydraulic fluid to the SIS which in turn is used to control the SIL functions on the BOP Stack.

The Gooseneck of the Umbilical System is mechanically installed on the Riser System below the Tension Ring and preferably above the water line to reduce potential damage to the MUX cables and hose. MUX Clamps of the Umbilical System are installed on the Riser Joints to secure the MUX Cables and hoses.

The MUX cables and hot line hose of the Umbilical System mechanically terminate to the BOP Stack.

The MUX cables of the Umbilical System supplies electrical power and communication to the BOP Stack.

The MUX cables of the Umbilical System supplies optical communication to the BOP Stack to send and receive data.

The Umbilical System supplies hydraulic control fluid to the BOP Stack via the hot line hose.

Mechanical interface between the Ship Board Subsystem and Umbilical System.

Ship Board Subsystem supplies electrical control and power to the Umbilical System to transmit to and from the subsea components.

Ship Board Subsystem supplies optical communication to the Umbilical System to transmit and receive data with the subsea components.

Mechanical interface between the SIS and Umbilical System.

The Umbilical System sends electrical power subsea to the SIS.

The Umbilical System sends optical control subsea via black channel communication to the SIS.

Mechanical test between the Ship Board Subsystem and BOP Stack.

The Ship Board Subsystem provides an electrical signal to the SIS at the initiation of a function with a safety backup.

The Riser Test Cap of the Test Suite can interface with both the Riser Adapter of the BOP Stack and the Riser Joints of the Riser Subsystem. This interface can be the same for both components.

In addition, the following external system interfaces have been shown and described:

The "Big Data Server" can provide an interface (identified for uploading per satellite connection) to the Drilling Control Network, to access data collected.

The Big Data Servers receive data from the Riser Management System for the purpose of tracking riser sections usage (time of deployment subsea and location within the riser string).

The Ship Board Subsystem can supply data to the Drilling Control Network.

The Ship Board Subsystem can supply a discrete contact for the initiation of an automated EDS from the Dynamic Positioning.

The Ship Board Subsystem can supply a discrete contact for the shutdown of the Mud Pumps when the Gas Handler is closed.

The Ship Board Subsystem can supply a signal to the Riser Recoil system when the LMRP is separated from the Lower Stack.

Water is supplied to the Ship Board Subsystem from the Rig Water for the FRU.

The Riser Subsystem interfaces to the Spider Automation for control and readbacks for the Spider.

The Riser Subsystem is electrically bonded to the Rig providing continuity between the two subsystems for CP.

The Riser Subsystem can interface mechanically with the RFID tags provided by the Riser Management System.

The Riser Subsystem can be mechanically installed to the Diverter via the Diverter Flex Joint.

Mechanical between the Riser Subsystem and ROV.

The Tension Ring of the Riser Subsystem can mechanically interface with the Tensioning System.

The Riser Running Tool of the Riser Subsystem can mechanically interface with the Riser Running Tool Automation system on the Rig.

The Umbilical System receives hydraulic fluid from the Rig Piping system.

The Umbilical System can be supplied pneumatics for control of the reels from the Rig Air Supply.

The Hose and Cable Sheaves of the Umbilical Subsystem can be installed mechanically to the Moon Pool Structure on the Rig.

The BOP Stack can mechanically lock to the Wellhead via the Wellhead Connector. The BOP Stack can supply adequate clearance and Guide Funnel to accommodate installation on to the Wellhead.

The Lower Stack of the BOP Stack mechanically interfaces to a Capping Stack via the mandrel connector. The Lower Stack can provide enough clearance for the Capping Stack.

The BOP Stack can have several interfaces for handling on the Rig.

The BOP Stack can supply appropriate mechanical interface for ROV intervention, including, but not limited to reaction bars, ROV operated ball valves, ROV hydraulic stab connections, etc.

The BOP Stack can receive hydraulic control from the ROV to activate functions.

The BOP Stack can supply an electrical interface to the ROV to charge the ROV display.

The Test Suite receives hydraulic fluid from the Rig Piping system.

The Test Suite can be supplied pneumatics for control of the control valves from the Rig Air Supply.

The Test Suite can receive power from the Ship Power supply. Power can be supplied to the Power Management System as well as the pump motors in the Hydraulic Power Subsystem.

Water is supplied to the Test Suite from the Rig Water for the HPTU and Riser Test Cap.

The SIS can have an isolation ball valve that can interface with the ROV.

SIL Rated System for Blowout Preventer Control

Safety Instrumented System for Use on Stack Wide Basis

Figure 12:
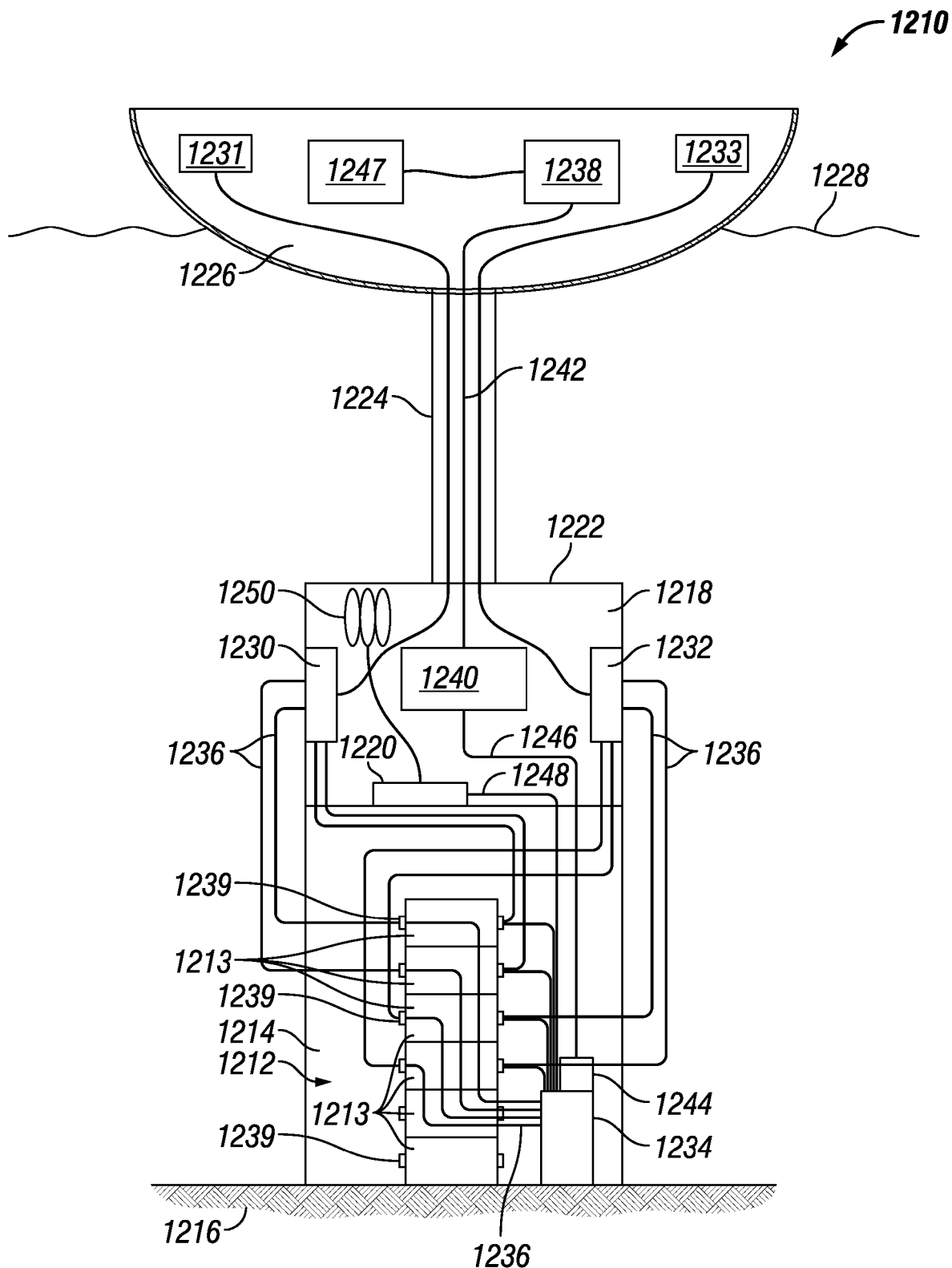
FIG. 12 shows a side schematic view of a safety instrumented system according to an embodiment of the present technology.

FIG. 12 shows a system 1210 for controlling a subsea blowout preventer (BOP) 1212. The subsea BOP 1212 is typically housed in a lower stack 1214 positioned on the sea floor 1216 below a lower marine riser package (LMRP) 1218. The subsea BOP 1212 is divided into individual BOP rams 1213, which can include sealing rams, shear rams, etc. The lower stack 1214 and the LMRP 1218 can be connected to one another by a hydraulic connector 1220, which can be controlled to allow disengagement of the LMRP 1218 from the lower stack 1214. An upper end 1222 of the LMRP 1218 is connected to a riser 1224 that extends from the upper end 1222 of the LMRP 1218 to a vessel 1226 at the surface 1228 of the sea. Also included in the system can be a first control pod 1230 (often referred to as the yellow control pod) and a second control pod 1232 (often referred to as the blue control pod). In the embodiment shown in FIG. 12, the first and second control pods 1230, 1232 are attached to the LMRP 1218. The first control pod 1230 and second control pod 1232 can be controlled by first and second control cabinets 1231, 1233, located on the vessel 1226. The vessel 1226 can be any appropriate vessel, including, for example, a drill ship or a platform.

Under normal operations, the subsea BOP rams 1213 are hydraulically controlled by the first or second pod 1230, 1232. Specifically, hydraulic lines 1236 run from each of the first and second control pods 1230, 1232 to individual rams 1213 of the BOP 1212. Typically one of the two control pods 1230, 1232 is responsible to hydraulically control the rams 1213 through its respective hydraulic lines 1236, while the other control pod 1230, 1232 remains idle. In this way, redundancy is built into the system because if the control pod 1230, 1232 actually controlling the rams 1213 becomes incapacitated, or otherwise requires maintenance or replacement, the other control pod 1230, 1232 can continue operation of the rams 1213.

One embodiment of the present technology includes a safety instrumented system for controlling the subsea BOP 1212 on a stack wide basis. One purpose of such a system is to provide the appropriate safety instrumented functions to confirm and backup the BOP control system, and comply with certain regulatory standards applicable to many systems and sub-systems in the petroleum industry. The safety instrumented system includes a surface logic solver 1238, or logic controller, located at the vessel 1226, and connected to a first subsea logic solver 1240 by a first cable 1242. The first subsea logic solver 1240 is in turn connected to a second subsea logic solver 1244 by a second cable 1246. As shown in FIG. 12, the second subsea logic solver 1244 can be connected to a hydraulic control unit 1234 located in the lower stack 1214. In some embodiments, the second subsea logic solver 1244 can be connected to a battery, so that the second subsea logic solver 1244 can continue to operate after the LMRP 1218 has been disconnected from the lower stack 1214. The surface logic solver 1238 can include a human machine interface (HMI) panel 1247 to allow an operator to communicate with the surface logic solver 1238.

In practice, the surface logic solver 1238 can generate commands, which are then transmitted to the first subsea logic solver 1240 via the first cable 1242. From the first subsea logic solver 1240, the commands are then transferred to the second subsea logic solver 1244, which communicates with, and may be attached to, the hydraulic control unit 1234. The hydraulic control unit 1234 is in turn in communication with the subsea BOP rams 1213 via hydraulic lines 1236. The second subsea logic solver 1244 can implement the commands, directing the hydraulic control unit 1234 to control the subsea BOP rams 1213 as desired by an operator. The logic solvers 1238, 1244, 1246 of any embodiment described herein can be any equipment capable of sending and receiving signals according to the requirements of the technology. For example, in some embodiments, the logic solvers can comprise or include central processing units (CPUs).

In the embodiment shown, each ram 1213 can be connected to multiple hydraulic lines 1236, each coming from a different control source, including the first control pod 1230, the second control pod 1232, and the hydraulic control unit 1234. As shown, which line controls the BOP ram 1213 at any given moment can be controlled by valves 1239 attached to the BOP rams 1213. In the drawings, hydraulic lines 1236 are shown connecting each of the first and second control pods 1230, 1232 and the hydraulic control unit 1234 to some, but not all, of the rams 1213. It is to be understood that in a functioning system, each of the control components can be connected to all of the rams 1213, and such a configuration is not shown in the drawing only to improve clarity of the figures.

One benefit of the safety instrumented system described above is that it provides additional redundancy to the system, and acts as a failsafe to enhance safety and reliability of the BOP. Although two control pods 1230, 1232 are already provided to create some redundancy in the system, in reality it can be difficult to use the second control pod 1232 if the first control pod 1230 is out of commission. This is because government regulations and best practice procedures dictate that a backup control system always be in place for the BOP. Thus, if the first control pod 1230 is unavailable, the second control pod 1232 cannot be used because there would be no redundancy. The safety instrumented system herein described helps to alleviate this problem by providing a second redundant control system.

In addition, the safety instrumented system of the present technology can serve to augment the capabilities of the overall system 1212 by providing additional means to control the BOP rams 1213, even when both control pods 1230, 1232 are functioning properly. For example, the safety instrumented system, via the hydraulic control unit 1234, can control certain rams 1213 at the same time that the control pods 1230, 1232 are controlling alternate rams 1213. Thus, the capacity of the system 1212 to control the BOP rams 1213 is increased. Furthermore, the system can provide monitoring functions, such as monitoring various states, statuses, parameters, etc., as well as information to determine whether the BOP control system is operating properly. The technology can also be designed to comply with the requirement of high pressure drilling operations, and can be used, for example, with a 20 ksi BOP system, although it is not limited to such systems, and may be used in other types of systems as well, such as 15 ksi systems. In addition, the safety instrumented system, as described herein, is a different type of control system than the primary control system, thereby providing the additional advantage of increasing the diversity of the control architecture.

Some benefits of the present technology will now be described. In order to understand the benefits, however, it is first important to understand some of the requirements of offshore drilling systems, one of which is to allow disconnection and subsequent reconnection of the LMRP 1218 from the lower stack 1214. This can be beneficial, for example, when a hurricane or other storm threatens a drilling vessel or platform. To weather such a storm, an operator may wish to disconnect the LMRP 1218 from the lower stack 1214, and move the LMRP 1218, riser 1224 and vessel 1226 out of harm's way. After the storm passes, it is necessary to then reconnect the LMRP 1218 to the lower stack 1214 to resume operations. The disconnection and subsequent reconnection of the LMRP 1218 to the lower stack 1214 can be greatly simplified by reducing the number of connections between these components, and also by controlling the types of connections made.

One way to simplify the reconnection of the LMRP 1218 and the lower stack 1214 is to provide a pair of subsea logic solvers, as shown in FIG. 12 and described above. This is because the first cable 1242, which connects the surface logic solver 1238 to the first subsea logic solver 1240 must carry power and communications between these two components. Often, the distance between the surface logic solver 1238 and the LMRP 1218 (and thus the first subsea logic solver 1240) through the riser 1224 can be very long, such as up to about 2 miles in length or more. Thus, power lines in the cable must be relatively high voltage lines, and the communications are often carried through optical lines (although copper lines may be used).

If the system were equipped with a single subsea logic solver in the lower stack, an operator would need to disconnect and reconnect both higher voltage power lines and fragile optical communications lines between the LMRP 1218 and the lower stack 1214. Such connections could be dangerous (in the case of the high voltage power lines) and could degrade the quality of the communication signals (in the case of the optical communications lines). Alternatively, if the system were equipped only with a single subsea logic solver on the LMRP 1218, multiple hydraulic lines would need to cross from the LMRP 1218 to the lower stack 1214 to connect to the rams 1213. Such a structure could be problematic because of the need to disconnect and reconnect many more lines between these components.

By providing two separate subsea logic solvers 1240, 1244, including one on the LMRP 1218 and one on the lower stack 1214, these problems can be alleviated. In practice, according to the present technology, the cable 1242 connecting the surface logic solver 1238 to the first subsea logic solver 1240 can include high voltage power lines and optical communication lines. One function of the first subsea logic solver 1240 can be to convert and lower the voltages, and to convert the optical signals to copper, thereby allowing communication between the first subsea logic solver 1240 and the second subsea logic solver 1244 to be through low voltage copper wires that make up cable 1246. Such low voltage copper wire can more easily be disconnected and reconnected as needed at the interface between the LMRP 1218 and the lower stack 1214.

In some embodiments of the invention, the hydraulic control unit 1234 can be connected to the hydraulic connector 1220 to disconnect or reconnect the LMRP 1218 from the lower stack 1214. Since the hydraulic connector 1220 is attached to the LMRP 1218, a single hydraulic line 1248 may need to cross the interface between the LMRP 1218 and the lower stack 1214 to provide hydraulic communication between the hydraulic control unit 1234 and the hydraulic connector 1220. Alternatively, use of such a line can be avoided in favor of providing power to the hydraulic connector 1220 from an accumulator 1250 which, in the embodiment shown, can be attached to the LMRP 1218.

For purposes of explanation, the following paragraphs contain explanations of how the safety instrumented system can work with other existing BOP systems to operate specific features of the BOP or other components on the LMRP and lower stack. It is to be understood that these explanations are given by way of example only, and do not represent all of the possible ways that that the present technology can be applied in practice.

The first example explains an example of the function of the safety instrumented system as it relates to a pipe ram BOP. The pipe ram function may be initiated by any contact closure input, or by an HMI panel. The need to close the ram is determined by the operator, so the initiation of the function is determined by the man-in-the-loop. When the surface logic solver 1238 on the vessel 1226 recognizes the input, it may monitor a surface flow meter. If the BOP is not successfully closed by the basic process control system (BPCS), the surface logic solver 1238 may transmit a signal to the first subsea logic solver 1240. The first subsea logic solver 1240 may in turn transmit the signal to the second subsea logic solver 1244, which may fire a function that vents the open hydraulic pressure to the pipe ram and applies close pressure to the pipe ram, thus closing the BOP.

The second example explains an example of the function of the safety instrumented system as it relates to a blind shear ram. The blind shear ram function may be initiated by a contact closure input, or by an HMI panel. The need to close the ram is determined by the operator, so initiation of the function is determined by the man-in-the-loop. When the surface logic solver 1238 on the vessel 1226 recognizes the input, it may monitor the surface flow meter. If the BOP is not successfully closed by the BPCS, the surface logic solver 1238 may transmit a signal to the first subsea logic solver 1240, which may in turn transmit the signal to the second subsea logic solver 1244. The second subsea logic solver 1244 may fire a function that vents the open hydraulic pressure to the blind shear ram and applies close pressure to the blind shear ram, thus closing the BOP.

The third example explains an example of the function of the safety instrumented system as it relates to a casing shear ram BOP. The casing shear ram function may be initiated by a contact closure input, or by an HMI panel. The need to close the ram is determined by the operator, so initiation of the function is determined by the man-in-the-loop. When the surface logic solver 1238 on the vessel 1226 recognizes the input, it may monitor the surface flow meter. If the BOP is not successfully closed by the BPCS, the surface logic solver 1238 may transmit a signal to the first subsea logic solver 1240, which in turn may transmit a signal to the second subsea logic solver 1244. The second subsea logic solver 1244 may fire a function that vents the open hydraulic pressure to the casing shear ram and applies close pressure to the casing shear ram, thus closing the BOP.

The fourth example explains an example of the function of the safety instrumented system as it relates to the hydraulic connector 1220. The hydraulic connector 1220 function may be initiated by a contact closure input, or by an HMI panel. The need to release the LMRP is determined by the operator, so initiation of the function is determined by the man-in-the-loop. When the surface logic solver 1238 on the vessel 1226 recognizes the input, it may monitor the surface flow meter. If the hydraulic connector 1220 is not successfully released by the BPCS, the surface logic solver 1238 may transmit a signal to the first subsea logic solver 1240, which may in turn transmit a signal to the second subsea logic solver 1244. The second subsea logic solver 1244 may fire a function that vents the latch hydraulic pressure to the hydraulic connector 1220 and applies unlatch pressure to both the primary and secondary unlatch functions.

The fifth example explains an example of the function of the safety instrumented system as it relates to an emergency disconnect sequence. The EDS function may be initiated by a contact closure input, or by an HMI panel. The need to disconnect is determined by the operator, so initiation of the function is determined by the man-in-the-loop. When the surface logic solver 1238 on the vessel 1226 recognizes the input, it may monitor the surface flow meter, or other sensors on the stack, for each function sequentially. If the EDS function is not successfully completed by the BPCS, the surface logic solver 1238 may transmit a signal to the first subsea logic solver 1240, which in turn may transmit a signal to the second subsea logic solver 1244. The subsea logic solver may then fire the following, or another similar sequence, of functions:

Vent the open pressure and apply close pressure to the pipe ram function

Vent the open pressure and apply close pressure to the CSR ram function

Vent the open pressure and apply close pressure to the BSR ram function

Vent the extend pressure and apply the retract pressure to the stab function

Vent the latch pressure and apply primary and secondary unlatch pressure to the LMRP connector function.

Safety Instrumented System for Use on a Pod by Pod Basis

Figure 13:
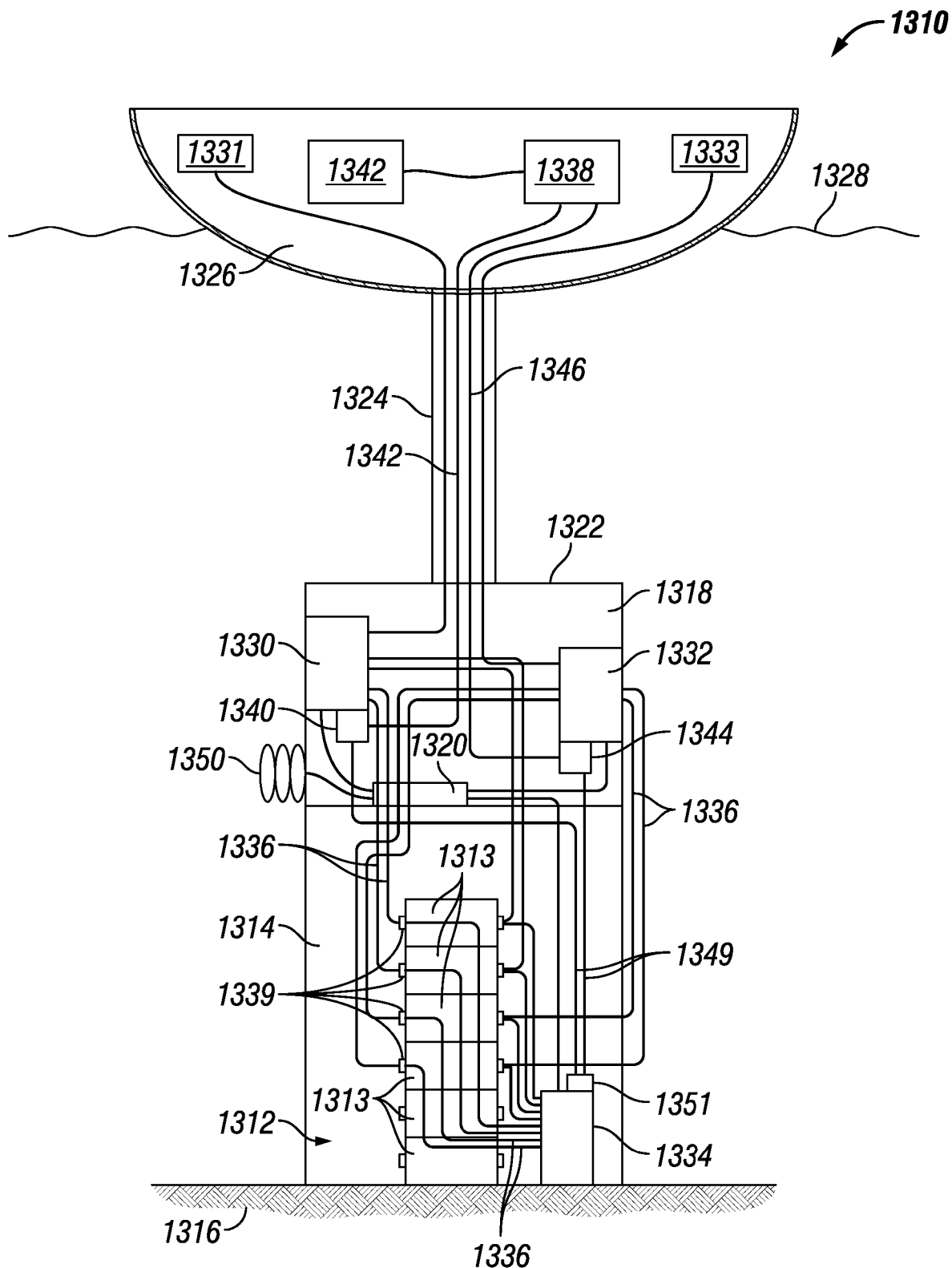
FIG. 13 shows a side schematic view of a safety instrumented system according to an alternate embodiment of the present technology.

Referring now to FIG. 13, there is shown an alternate system 1310 for controlling a subsea blowout preventer (BOP) 1312. The subsea BOP 1312 is typically housed in a lower stack 1314 positioned on the sea floor 1316 below a lower marine riser package (LMRP) 1318. The subsea BOP 1312 is divided into individual BOP rams 1313, which can include sealing rams, shear rams, etc. The lower stack 1314 and the LMRP 1318 can be connected to one another by a hydraulic connector 1320, which can be controlled to allow disengagement of the LMRP 1318 from the lower stack 1314. An upper end 1322 of the LMRP 1318 is connected to a riser 1324 that extends from the upper end 1322 of the LMRP 1318 to a vessel 1326 at the surface 1328 of the sea. Also included in the system can be a first control pod 1330 (often referred to as the yellow control pod) and a second control pod 1332 (often referred to as the blue control pod), and a hydraulic control unit 1334. In the embodiment shown in FIG. 13, the first and second control pods 1330, 1332 are attached to the LMRP 1318. The first control pod 1330 and second control pod 1332 can be controlled by first and second control cabinets 1331, 1333, located on the vessel 1326. The vessel 1326 can be any appropriate vessel, including, for example, a drill ship or a platform.

Under normal operations, the subsea BOP rams 1313 are hydraulically controlled by the first or second pod 1330, 1332. Specifically, hydraulic lines 1336 run from each of the first and second control pods 1330, 1332 to individual rams 1313 of the BOP 1312. Typically one of the two control pods 1330, 1332 is responsible to hydraulically control the rams 1313 through its respective hydraulic lines 1336, while the other control pod 1330, 1332 remains idle. In this way, redundancy is built into the system because if the control pod 1330, 1332 actually controlling the rams 1313 becomes incapacitated, or otherwise requires maintenance or replacement, the other control pod 1330, 1332 can continue operation of the rams 1313.

The embodiment of FIG. 13 is an alternate safety instrumented system for controlling the subsea BOP 1312 that operates on a pod by pod basis. The safety instrumented system includes a surface logic solver 1338, or logic controller, located at the vessel 1326, and connected to a first subsea logic solver 1340 by a first cable 1342, and a second subsea logic solver 1344 by a second cable 1346. As shown in FIG. 13, the first subsea logic solver 1340 and the second subsea logic solver 1344 can each be connected to an extended input/output (I/O) extension 1351 by cables 1349, which I/O extension 1351 is in communication with a hydraulic control unit 134 located in the lower stack 1314. The surface logic solver 1338 can include HMI panel 1347 to allow an operator to communicate with the surface logic solver 1338. In one embodiment, the HMI panel 1347 can be a panel with push buttons and lit indicators, while other embodiments can include a touch screen display.

In practice, the surface logic solver 1338 can generate commands, which are then transmitted to the first subsea logic solver 1340 via the first communications cable 1342, and/or to the second subsea logic solver 1344 via the second cable 1346. From the first subsea logic solver 1340 and/or the second subsea logic solver 1344, the commands are then transferred to the I/O extension 1351, which communicates with, and may be attached to, the hydraulic control unit 1334. The hydraulic control unit 1334 is in turn in communication with the subsea BOP rams 1313 via hydraulic lines 1336. The I/O extension 1351 can implement the commands, directing the hydraulic control unit 1334 to control the subsea BOP rams 1313 as desired by an operator.

In the embodiment shown in FIG. 13, each ram 1313 can be connected to multiple hydraulic lines 1336, each coming from a different control source, including the first control pod 1330, the second control pod 1332, and the hydraulic control unit 1334. As shown, which line controls the BOP ram 1313 at any given moment can be controlled by valves 1339 attached to the BOP rams 1313. In the drawings, hydraulic lines 1336 are shown connecting each of the first and second control pods 1330, 1332 and the hydraulic control unit 1334 to some, but not all, of the rams 1313. It is to be understood that in a functioning system, each of the control components can be connected to all of the rams 1313, and such a configuration is not shown in the drawing only to improve clarity of the figures.

As discussed in more detail above with respect to the embodiment of FIG. 12, allowing disconnection and subsequent reconnection of the LMRP 1218 from the lower stack 1214 can be very advantageous, such as to provide the ability to move the vessel 1326, riser 1324, and LMRP 1318 out of the path of a storm. The disconnection and subsequent reconnection of the LMRP 1218 to the lower stack 1214 can be greatly simplified by reducing the number of connections between these components, and also by controlling the types of connections made.

One way to simplify the reconnection of the LMRP 1318 and the lower stack 1314 is to provide a pair of subsea logic solvers corresponding to the control pods 1330, 1332, and providing an I/O extension 1351, as shown in FIG. 13 and described above. This is because the first and second cables 1342, 1346, which connect the surface logic solver 1338 to the first and second subsea logic solvers 1340, 1344, respectively, must carry power and communications between the LMRP 1318 and the lower stack 1314. Often, the distance between the surface logic solver 1338 and the LMRP 1318 (and thus the first and second subsea logic solvers 1340, 1344) through the riser 1324 can be very long, such as up to about 2 miles in length or more. Thus, power lines in the cable must be very high voltage lines, and the communications are often carried through optical lines.

If the system were equipped with a subsea logic solver in the lower stack, an operator would need to disconnect and reconnect both high voltage power lines and fragile optical communications lines between the LMRP 1318 and the lower stack 1314. Such connections could be dangerous (in the case of the high voltage power lines) and could degrade the quality of the communication signals (in the case of the optical communications lines). Alternatively, if the system were equipped only with single subsea logic solvers on the LMRP 1318, without an I/O extension near the hydraulic control unit 1334, multiple hydraulic lines would need to cross from the LMRP 1318 to the lower stack 1314 to connect to the rams 1313. Such a structure could be problematic because of the need to disconnect and reconnect many more lines between these components.

By providing subsea logic solvers 1340, 1344 on the LMRP 1318 and a separate I/O extension 1334 on the lower stack 1314, these problems can be alleviated. In practice, according to the present technology, the cables 1342, 1346 connecting the surface logic solver 1338 to the first and second subsea logic solvers 1340, 1346 can include high voltage power lines and optical communication lines. One function of the first and second subsea logic solvers 1340, 1346 can be to convert and lower the voltages, and to convert the optical signals to copper, thereby allowing communication between the first and second subsea logic solvers 1340, 1346 and the I/O extension 1334 to be through low voltage copper wires that make up cables 1349. Such low voltage copper wire can more easily be disconnected and reconnected as needed at the interface between the LMRP 1318 and the lower stack 1314.

In some embodiments of the invention, the hydraulic control unit 1334 can be connected to the hydraulic connector 1320 to disconnect or reconnect the LMRP 1318 from the lower stack 1314. Since the hydraulic connector 1320 is attached to the LMRP 1318, a single hydraulic line 148 may need to cross the interface between the LMRP 1318 and the lower stack 1314 to provide hydraulic communication between the hydraulic control unit 1334 and the hydraulic connector 1320. Alternatively, use of such a line can be avoided in favor of providing power to the hydraulic connector 1320 from an accumulator 1350 which, in the embodiment shown, can be attached to the LMRP 1318.

Control System for Safety Instrumented System of Present Technology

Figure 14:
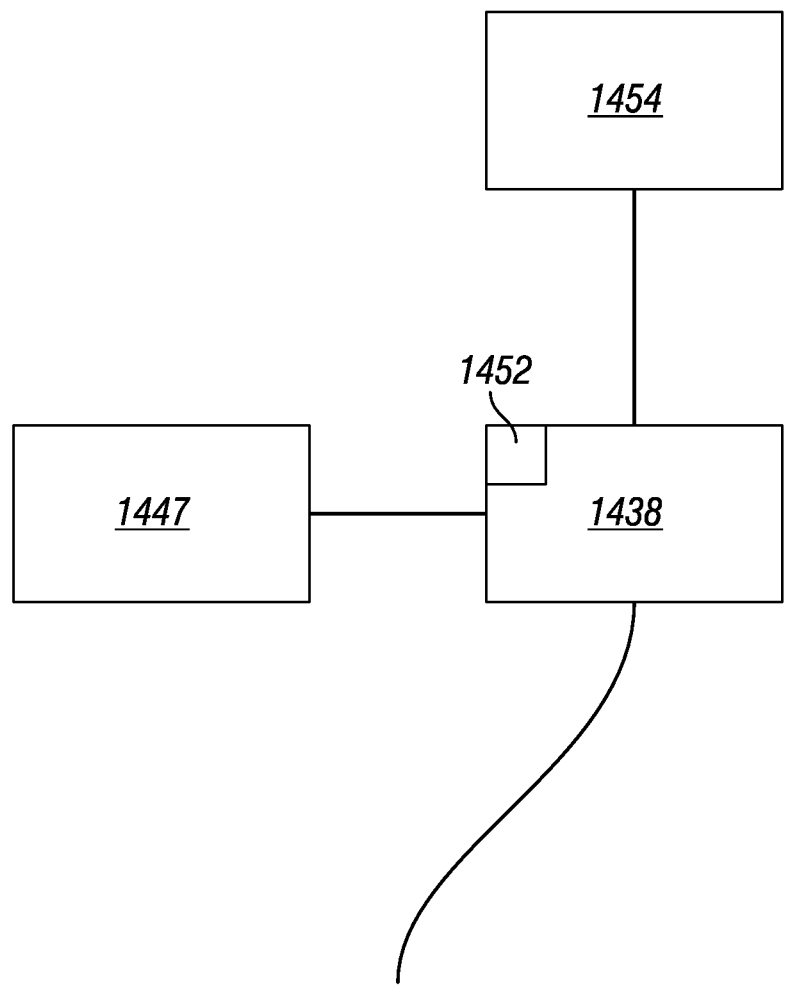
FIG. 14 shows a control system, including automatic and man-in-the loop controls, for the safety instrumented system of embodiments of the present technology.

FIG. 14 shows another aspect of the present technology, including the ability to alternate between a man-in-the-loop and an automatic configuration for controlling the surface logic solver 1438, and hence the safety instrumented systems for controlling a subsea BOP described above. More particularly, the present technology provides a surface logic controller 1438, which, among other things, can monitor the basic processes and controls of the BOP system, including the performance of the subsea logic solvers, the operation of the BOP rams, the operation of shuttle valves, pressure sensors, temperature sensors, and other components of the subsea system. To monitor the operation of the BOP rams, the surface logic controller 1438 can monitor the operation of the control pods.

According to the embodiment of FIG. 14, the surface logic controller can be equipped with a key switch 1452 capable of alternating between a man-in-the-loop state and an automatic state. The key switch can be a physical switch or can be software code integrated into the code of the logic solver.

When the key switch 1452 is in the man-in-the-loop state, the surface logic solver 1438, and hence the safety instrumented systems for controlling the subsea BOP, can be controlled by an operator who issues commands to the surface logic solver 1438 through an HMI panel 1447 or by other appropriate means. Thus, the operator will have full control over whether to initiate action using the safety instrumented system or not to initiate action.

Alternatively, when the key switch 1452 is in the automatic state, an automatic controller 1454 can used to control the subsea BOP through the safety instrumented systems described above. The automatic controller can act without prompting by the operator.

Figure 15:
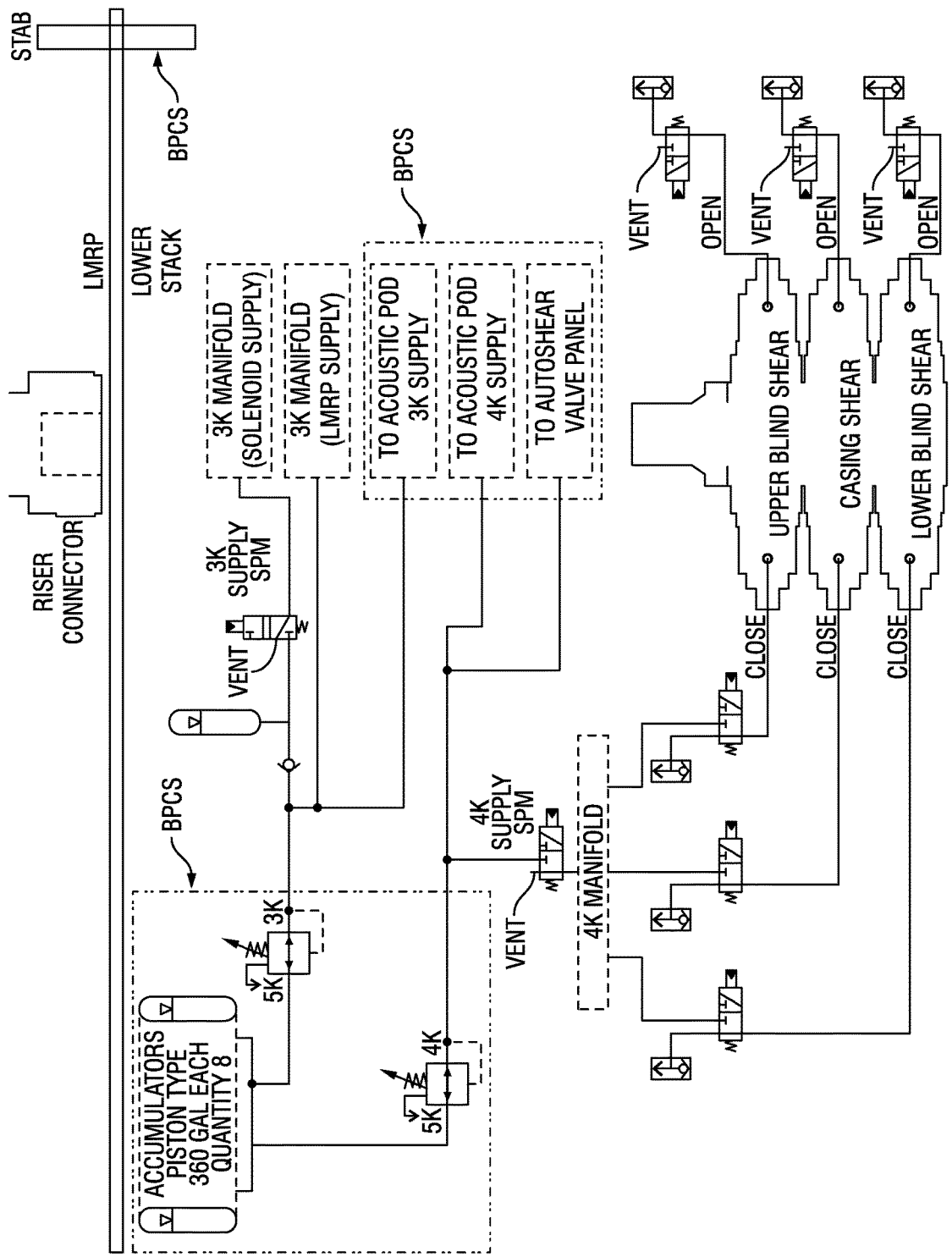
FIG. 15 is a schematic of a BOP hydraulic drive circuit with uniquely placed safety valves and manifolds.

Proof Testing Apparatus and Method for Reducing the Probability of Failure on Demand of Safety Rated Hydraulic Components Referring now to FIG. 15, a schematic is shown of a BOP hydraulic drive circuit with uniquely placed safety valves and manifolds. The hydraulic drive circuit of FIG. 15 is described in more detail with regard to FIG. 16. FIG. 15 shows one example placement of valves that enable the redundancy required to achieve a safety rated system. As noted previously, one issue with attaining a safety rating for subsea hydraulic equipment is the lack of ability to test each valve in the system and ascertain its functionality without retrieving the valves from the sea floor. Advantageously, the present disclosure allows BOP safety systems to be tested during the period the system is being pressure tested while it is subsea. Such a solution alleviates the problem of adding many redundant valves and sensors, and avoids requiring the BOP stack to be pulled to the surface for testing on a periodic basis.

However, FIG. 15 lacks a sufficient number sensors to determine whether the valves are operating sufficiently subsea. In the embodiment of FIG. 15, one way to fully determine if the valves are all working is to fire the BOP shear rams. One potential problem with the system of FIG. 15 is that firing a BOP tends to degrade the system and increase the required rebuild frequency of the device. One solution to this problem is to leverage the pressure test frequency that already occurs on the rig, as required by American Petroleum Institute (API) regulations for high-pressure high-temperature (HPHT) equipment.

Figure 16:
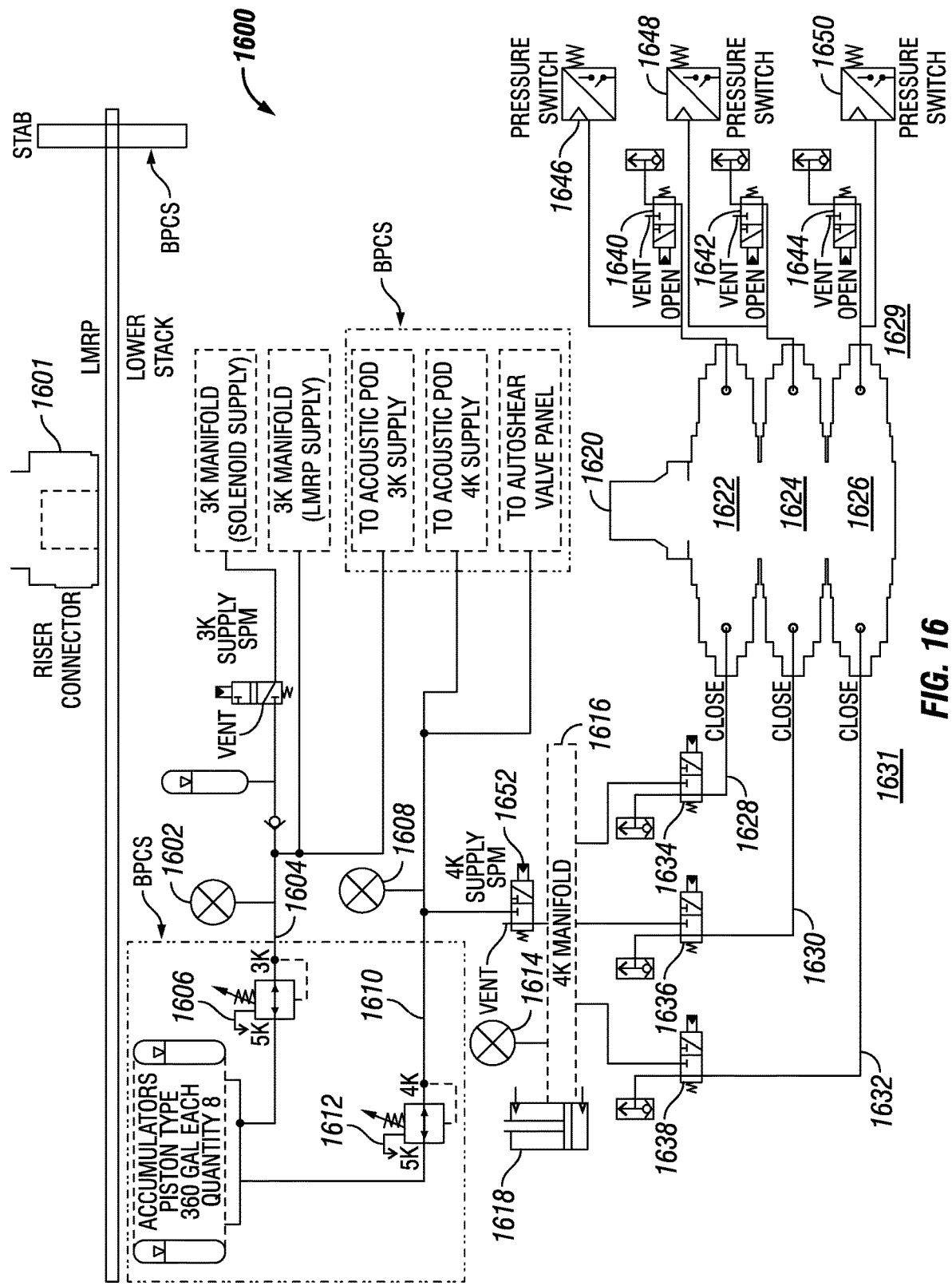
FIG. 16 is a schematic of the BOP hydraulic drive circuit of FIG. 1 including proof test sensors.

Referring now to FIG. 16, a schematic is shown of a BOP hydraulic drive circuit with proof test sensors. In BOP safety system 1600, several pressure sensors and valves, unique to the embodiments of the present disclosure, are utilized to allow proof testing from the surface. FIG. 16 largely shows a lower stack portion of a blowout preventer, disposed beneath a LMRP, or lower marine riser package. A riser connector 1601 is disposed proximate the LMRP above the lower stack.

Certain example sensors and sensor placements are described as follows. While example sensors will be referred to, such as, for example, pressure gauges and pressure switches, one of ordinary skill in the art will understand that other suitable gauges, switches, and/or sensors could be used, such as flow meters, flow detectors, and/or acoustic sensors. Moreover, one of ordinary skill in the art will realize alternative placements and combinations of proof sensors are possible in a BOP hydraulic drive circuit. In the embodiments of FIGS. 2 and 3, BPCS signifies a basic process control system.

BOP safety system 1600 includes a transducer or transmitter 1602 to measure characteristics, such as pressures, at an output 1604 of a 3,000 psi (3K) regulator 1606 for continuous diagnostics. Transducer or transmitter 1602, in some embodiments, is a pressure gauge or a pressure switch. BOP safety system 1600 further includes a transducer or transmitter 1608 to measure pressures at an output 1610 of a 4,000 psi (4K) regulator 1612 for continuous diagnostics. Transducer or transmitter 1608, in some embodiments, is a pressure gauge or a pressure switch. While the regulators discussed in the figures include 3K and 4K regulators, any other regulators can be used in systems and methods of the present disclosure including for example, but not limited to, 1.5K, 5K, and/or 7K regulators.

BOP safety system 1600 further includes a transducer or transmitter 1614 to measure characteristics, such as the pressure or presence of fluid, in a 4K manifold 1616. Transducer or transmitter 1614, in some embodiments, is a pressure gauge or a pressure switch. Also shown in FIG. 16 is a valve 1618, for example a dump valve, disposed proximate to and in fluid communication with the 4K manifold 1616. Valve 1618 is in fluid communication with the 4K manifold 1616 to relieve pressure in the 4K manifold 1616 during testing methods of the present disclosure, described as follows herein.

In FIG. 16, a BOP 1620 includes BOP upper blind shear ram 1622, BOP casing shear ram 1624, and BOP lower blind shear ram 1626. BOP upper blind shear ram 1622 is in fluid communication with circuit 1628, BOP casing shear ram 1624 is in fluid communication with circuit 1630, and BOP lower blind shear ram 1626 is in fluid communication with circuit 1632. As shown, each circuit 1628, 1630, 1632 has an open side 1629 and a close side 1631. Sub-plate mounted (SPM) valves 1634, 1636, 1638 are shown on the close side 1631 of the circuits 1628, 1630, 1632. SPM valves 1640, 1642, 1644 are shown on the open side 1629 of the circuits 1628, 1630, 1632. Pressure switches 1646, 1648, 1650 are disposed proximate to and in fluid communication with the open side 1629 of each circuit 1628, 1630, 1632 to detect pressure. As mention previously, other sensors in addition to or alternative to pressure switches 1646, 1648, 1650 could be used in other embodiments.

Processes for using sensor units, such as for example, units 1602, 1608, 1614, 1646, 1648, 1650 in FIG. 16, to determine if valves in BOP safety system 1600 are operating properly and safely is one advantage provided by embodiments of the present disclosure. Certain advantageously placed sensor units are used for continuous diagnostics, such as transducers or transmitters 1602, 1608, and provide the ability of the system to alarm if either of the regulators 1606, 1612 fail.

Figure 17:
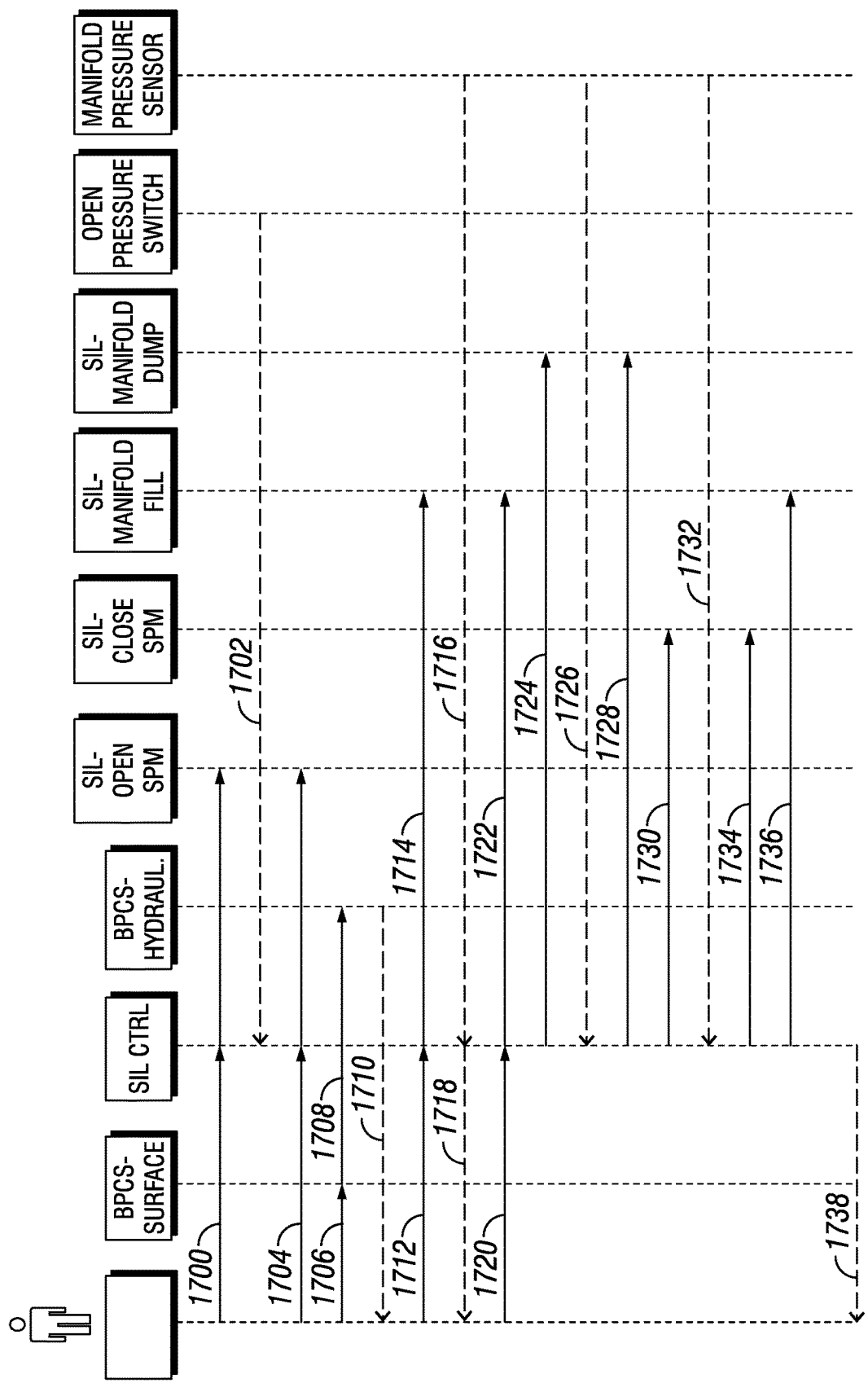
FIG. 17 is a sequence diagram for proof testing in an example method, optionally carried out on the BOP hydraulic drive circuit of FIGS. 1-2.

Referring now to FIG. 17, a sequence diagram is shown for proof testing in an example method, optionally carried out on the BOP hydraulic drive circuit of FIG. 16. Pressure switches 1646, 1648, 1650 on the open side 1629 of circuits 1628, 1630, 1632 are uniquely applied in embodiments of subsea testing methods. At a first step 1700 in an example testing method exemplified by FIG. 17, pressure on the open side 1629 is dumped or released by opening one or more valves to test the one or more valves on the open side 1629. As represented by step 1700, an SPM valve can be opened, such as SPM valve 1640. For example, for testing SPM valve 1640 on circuit 1628, when the basic process control system has BOP 1620 open, including BOP upper blind shear ram 1622, pressure is applied to the open side 1629 of circuit 1628. To test a safety valve in circuit 1628, such as SPM valve 1640, a safety open valve can be operated while the BOP 1620 is open.

At step 1702, a pressure switch, such as pressure switch 1646, will transition from seeing elevated pressure to not seeing elevated pressure after the pressure is released or dumped at step 1700 by opening SPM valve 1640, and the pressure switch 1646 will provide feedback that the valve actually moved from a closed position to an open position. At step 1704, the valve, such as SPM valve 1640, can then be returned to its normal operational state, which will reapply pressure to the open side 1629, also referred to as an open port, of BOP upper blind shear ram 1622. This process allows verification that the open side safety valve actually moved, without modifying the valve itself to have additional diagnostic equipment and without removing the valve from the BOP safety system 1600 or sea floor. This process does not apply any hydraulic closing pressure to the BOP safety system 1600, so the BOP 1620 itself does not move during the proof test and no wear is caused on the BOP.

Testing a valve set on the close side of a BOP requires an interaction with a basic process control system. Shearing BOP's in general have low pressure and high pressure closing circuits. Normally, to close a BOP when the system is not shearing, any material low pressure (for example about 1,500 psi) can be applied. The low pressure is used because it reduces the wear on the components and extends the life of the BOP. When a BOP is closed during a shearing event, the high pressure (for example about 4,000 psi) circuit can be used. High pressure increases the force on the shearing blades, thereby improving the likelihood that the BOP will shear (when a pipe is present during operation) and close. Safety systems, such as BOP safety system 1600, apply only a high pressure circuit. There is no low pressure circuit included in the design of safety systems.

API standards for high-pressure high-temperature (HPHT) equipment require that basic process control systems and BOP's be pressure tested at intervals of 3 weeks or less. One solution for proof testing the safety systems on BOP's is to integrate the proof test with the API-required pressure testing, as described herein. API-required testing uses the basic process control system to close the BOP with a low pressure close circuit. The BOP, such as BOP 1620, is then pressured up. When the test is complete, the BOP is opened and the system is put back in service. For example, in FIG. 17 at step 1706 the API test begins when BOP upper blind shear ram 1622 is closed, and at step 1708 a high pressure test is run according to API standards. At step 1710, the API test is complete, and further testing according to methods of the present disclosure is carried out.

To proof test sub-plate mounted (SPM) valves in the close side of the safety circuit, the 21 day (3 week) API pressure test is modified as follows. Here, referring to BOP upper blind shear ram 1622 by example, after the API test, BOP upper blind shear ram 1622 remains closed, having been closed by the low pressure circuit through the basic process control system during step 1706 of the API test. As explained above with regard to steps 1706, 1708, 1710, BOP safety system 1600 is pressured up, and the test is passed. Afterward at step 1712, BOP safety system 1600 begins a test for a manifold fill valve 1652 by opening the manifold fill valve 1652 at step 1714 and uses transducer or transmitter 1614, such as, for example a pressure sensor such as a pressure gauge or pressure switch, to confirm the manifold 1616 pressures up to 4K psi at step 1716. Once the manifold pressures up to 4K psi at step 1716, a test passed message is displayed at step 1718. In the method exemplified by FIG. 17, method steps can be automated and carried out by a computer readable medium or carried out by a user. Results can be applied to carry out subsequent steps and/or can be displayed to a user at the surface.

In certain embodiments of BOP safety systems, there are three logic solvers, one on the surface and two sub-sea. A user interface will be provided on the surface that would allow the user to run safety and testing processes. Alternatively, the process could be documented in a maintenance manual and the user interface could allow the user control over individual valves. In both cases, there is some initiation from the surface to run the test or parts of the test.

At step 1720, a test for a BOP SIL close valve, such as SPM valve 1634 begins. At step 1722, the manifold fill valve 1652 is closed by BOP safety system 1600, and at step 1724, valve 1618, for example a dump valve or vent valve, dumps the pressure from the manifold 1616. The pressure in manifold 1616 drops to about atmospheric pressure. At step 1726, a pressure drop in the manifold 1616 is confirmed by transducer or transmitter 1614, and at step 1728, valve 1618 is returned to a closed state. At this point in the process the BOP close circuit side of circuit 1628 still has about 1,500 psi in the bonnet of BOP upper blind shear ram 1622, and is being held closed by the combination of this pressure and the multi-position lock that is integral to the BOP. As noted, the manifold 1616 has been returned to about ambient pressure after the pressure was dumped at step 1724.

For shearing, BOP's typically contain two blades, which are pushed together by two pistons (sometimes referred to as piston operators). Bonnets are housings for the pistons where the hydraulic fluid enters and exits a BOP assembly. In certain embodiments, when a BOP is closed, the control system maintains hydraulic pressure on the close side of the piston operator(s). However, a mechanical locking mechanism (sometimes referred to as an "MPL") is also present to hold the BOP closed in the event of hydraulic pressure loss.

At step 1730, the safety system opens the SPM valve 1634 on the close side 1631 of circuit 1628 for BOP upper blind shear ram 1622. Since the bonnet of BOP upper blind shear ram 1622 has 1,500 psi and the manifold 1616 is at ambient pressure, opening the SPM valve 1634 will create a reverse flow from the BOP upper blind shear ram 1622 bonnet to the manifold 1616. At step 1732, the transducer or transmitter 1614 disposed proximate to and in fluid communication with the manifold 1616 can be used to confirm that the SPM valve 1634 moved by sensing a change in pressure. At step 1734, SPM valve 1634 on the close side 1631 of circuit 1628 can then be returned to the operational (closed) state. At step 1736, the manifold fill valve 1652 is opened, and the basic process control system can return the BOP upper blind shear ram 1622 to the open position. This allows the system to return to the drilling mode of operation. At step 1738, a pass or fail test message is displayed to a user. One advantage of this methodology over simply driving the bonnet of BOP upper blind shear ram 1622 up to 4K psi to test safety valves is that the additional stress of the high pressure is never applied to the BOP bonnet extending the life and improving the maintenance cycle.

Proof tests of the present disclosure are enabled, in part, by the MPL. As noted, the bonnet of BOP upper blind shear ram 1622 has 1,500 psi and the manifold 1616 is at ambient pressure, so opening the SPM valve 1634 will create a reverse flow from the BOP upper blind shear ram 1622 bonnet to the manifold 1616. Testing a close side valve, such as SPM valve 1634, intentionally dumps the pressure from the closed side of the bonnet. During that process, the MPL holds the BOP closed until hydraulic pressure is reapplied to the bonnet.

While the method of FIG. 17 was described largely with regard to FIG. 16 and the BOP upper blind shear ram 1622 along with circuit 1628, the methodology can be modified by one of ordinary skill in the art to apply backpressure testing to other systems and other BOP rams, such as, for example, BOP casing shear ram 1624 and BOP lower blind shear ram 1626.

Moreover, while certain figures and claims recite embodiments of the present invention with regard to BOP rams, one of ordinary skill in the art could apply the proof testing algorithm to an annular BOP. The proof testing algorithm for an annular is slightly modified. As noted above, ram preventers have a multi-position lock (MPL) that keeps them closed when the closed side pressure is vented. Annular BOP's do not have this feature. Using a manifold of sufficiently small volume compared to the hydraulic chamber volume of an annular BOP, one of ordinary skill can implement a substantially similar process in an annular. By sizing the manifold with respect to the annular BOP volume, one of ordinary skill could measure a pressure change in the manifold without risk of venting all the pressure holding the annular closed.

In the various embodiments of the disclosure described, a person having ordinary skill in the art will recognize that various types of memory are readable by a computer, such as the memory described in reference to various computers and servers, e.g., computer, computer server, web server, or other computers with embodiments of the present disclosure.

The singular forms "a," "an," and "the" include plural referents, unless the context clearly dictates otherwise.

Examples of computer-readable medium can include but are not limited to: one or more nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described previously and can operate on a computer. It will be understood by those skilled in the art that such media can be at other locations instead of, or in addition to, the locations described to store computer program products, e.g., including software thereon. It will be understood by those skilled in the art that the various software modules or electronic components described previously can be implemented and maintained by electronic hardware, software, or a combination of the two, and that such embodiments are contemplated by embodiments of the present disclosure.

While the present disclosure has been described with respect to a limited number of embodiments, those skilled in the art, having benefit of this disclosure, can appreciate that other embodiments may be devised which do not depart from the scope of the disclosure as described herein. Accordingly, the scope of the disclosure should be limited only by the attached claims.

What is claimed is:

1. A blowout preventer system comprising:
   a lower blowout preventer stack comprising a number of hydraulic components;
   a lower marine riser package comprising a first control pod and a second control pod adapted to provide, during use, redundant control of the hydraulic components of the lower blowout preventer stack where the first and the second control pods are adapted to being connected, during use, to a surface control system and to be controlled, during use, by the surface control system;
   wherein the lower blowout preventer stack further comprises an additional control pod connected to an additional surface control system separate from the surface control system and to be controlled, during use, by the additional surface control system to provide control of the same hydraulic components of the lower blowout preventer stack;
   wherein the blowout preventer system further comprises an additional subsea control unit;
   wherein the additional subsea control unit is connected to the additional control pod, and adapted to control, during use, the additional control pod; and
   wherein the additional subsea control unit is further connected to the additional surface control system.

2. The blowout preventer system according to claim 1, wherein the first and second control pods are each capable of performing a number of functions and the additional control pod is capable of performing a fewer number of functions compared to the number of functions supported by the first and second control pods.

3. The blowout preventer system according to claim 1, wherein the first and second control pods are each capable of performing a number of functions and the additional control pod is capable of performing a number of fewer functions that is 50% or less of the number of functions supported by the first and second control pods.

4. The blowout preventer system according to claim 1, wherein the blowout preventer system further comprises an acoustic control pod and the additional control pod comprises or is integrated with the acoustic control pod.

5. The blowout preventer system according to claim 1, wherein the additional subsea control unit is adapted, during use, to monitor one or more functions of the lower blowout preventer stack.

6. The blowout preventer system according to claim 1, wherein the additional subsea control unit is adapted to receive one or more input signals, during use, from one or more selected from the group consisting of:
 a power hub of the lower marine riser package;
 a communication hub of the lower marine riser package;
 a position and pressure sensor of the lower blowout preventer stack;
 a pressure transmitter of the lower blowout preventer stack;
 a pressure transmitter of an autoshear hydraulic circuit;
 a pressure transmitter of a deadman hydraulic circuit;
 one or more pressure transmitters of a closing shear ram circuit; and
 one or more pressure transmitters of a blind shear ram circuit.

7. The blowout preventer system according to claim 1, wherein the additional subsea control unit is adapted to receive, during use, one or more input signals representing:
 one or more signals of the lower marine riser package;
 one or more values of one or more blowout preventer system functions;
 a feedback close signal for an autoshear hydraulic circuit;
 a feedback close signal for a deadman hydraulic circuit;
 one or more feedback close signals for at least one closing shear ram circuit; and
 one or more feedback close signals for at least one blind shear ram.

8. The blowout preventer system according to claim 1, wherein the additional subsea control unit is adapted to initiate, during use, one or more safety instrumented functions in response to one or more of a control signal received from the additional surface control system and a control logic of the additional subsea control unit.

9. The blowout preventer system according to claim 1, wherein the additional control pod is controllable to enter one or more of a lower blowout preventer stack test mode and a test mode for the additional control pod.

10. The blowout preventer system according to claim 1, wherein one or more of the following, are SIL rated as a connected system:
 the additional surface control system; and
 the additional control pod.

11. The blowout preventer system according to claim 1, wherein one or more of the following, are SIL rated as a connected system:
 the additional subsea control unit;
 the additional surface control system; and
 the additional control pod.

12. The blowout preventer system according to claim 1, the additional surface control system is adapted to activate, during use, at least one safety instrumented function in response to one or more predetermined conditions.

13. The blowout preventer system according to claim 12, wherein the predetermined conditions is selected from the group of:
 a lower marine riser package disconnect feedback signal;
 a combination of:
  one or more values of one or more blowout preventer system functions as obtained by one or more of a position sensor, and pressure sensor and a pressure transmitter of the lower blowout preventer stack; and
  a feedback close signal for an autoshear hydraulic circuit;
  a feedback close signal for a deadman hydraulic circuit;
  a feedback close signals for at least one closing shear ram circuit; or
  a feedback close signals for at least one blind shear ram.

14. The blowout preventer system according to claim 1, wherein the additional subsea control unit is adapted to activate, during use, at least one safety instrumented function in response to one or more predetermined conditions.

15. The blowout preventer system according to claim 14, wherein the predetermined conditions are selected from the group of:
 a lower marine riser package disconnect feedback signal;
 a combination of:
  one or more values of one or more blowout preventer system functions as obtained by one or more of a position sensor, and pressure sensor and a pressure transmitter of the lower blowout preventer stack; and
  a feedback close signal for an autoshear hydraulic circuit;
  a feedback close signal for a deadman hydraulic circuit;
  a feedback close signals for at least one closing shear ram circuit; or
  a feedback close signals for at least one blind shear ram.

16. The blowout preventer system according to claim 1, wherein communication lines between the surface control system and the first and second control pods are independent of a communication line between the additional control pod and the additional surface control system.

17. A blowout preventer system comprising:
 a lower blowout preventer stack comprising a number of hydraulic components;
 a lower marine riser package comprising a first control pod and a second control pod adapted to provide, during use, redundant control of the hydraulic components of the lower blowout preventer stack where the first and the second control pods are adapted to being connected, during use, to a surface control system and to be controlled, during use, by the surface control system;
 wherein the lower blowout preventer stack further comprises an additional control pod connected to an additional surface control system separate from the surface control system and to be controlled, during use, by the additional surface control system to provide control of the same hydraulic components of the lower blowout preventer stack;
 wherein the blowout preventer system comprises:
  a first cable connecting at least the first control pod with a first surface control system, adapted to control the first control pod; and
  a second cable connecting at least the second control pod with a second surface control system, adapted to control the second control pod;
 wherein the first and second cables are connected to the additional control pod; and
 wherein the additional surface control system is connected to one or more of the first cable, the second cable, the first surface control system and the second surface control system.

18. The blowout preventer system according to claim 17, wherein:
- the first cable is connected to a first subsea junction box being connected to the first control pod and the additional control pod; and
- the second cable is connected to a second subsea junction box being connected to the second control pod and the additional control pod, wherein the first and second subsea junction boxes are connected and further adapted to cross connect signals of one or more conductors of the first and second cables, respectively, and to cross connect one or more of:
  - signals of one or more conductors between the first junction subsea box and the additional control pod; and
  - signals of one or more conductors between the second subsea junction box and the additional control pod.

19. The blowout preventer system according to claim 17, wherein the first surface control system is further adapted to control the second control pod, the second surface control system is further adapted to control the first control pod, and the additional surface control system is adapted to control the additional control pod selectively via the first or second cables.

20. The blowout preventer system according to claim 17, wherein communication lines between the surface control system and the first and second control pods are independent of a communication line between the additional control pod and the additional surface control system.

* * * * *